US010562218B2

(12) United States Patent
Chang et al.

(10) Patent No.: US 10,562,218 B2
(45) Date of Patent: *Feb. 18, 2020

(54) METHOD FOR SETTING UP A MOLDING SYSTEM

(71) Applicant: CORETECH SYSTEM CO., LTD., Chupei, Hsinchu County (TW)

(72) Inventors: Yuing Chang, Chupei (TW); Rong-Yeu Chang, Chupei (TW); Chia-Hsiang Hsu, Chupei (TW); Chuan-Wei Chang, Chupei (TW); Ching-Chang Chien, Chupei (TW)

(73) Assignee: CORETECH SYSTEM CO., LTD., Chupei, Hsinchu County (TW)

(*) Notice: Subject to any disclaimer, the term of this patent is extended or adjusted under 35 U.S.C. 154(b) by 0 days.

This patent is subject to a terminal disclaimer.

(21) Appl. No.: 16/055,382

(22) Filed: Aug. 6, 2018

(65) Prior Publication Data

US 2019/0152114 A1 May 23, 2019

Related U.S. Application Data

(63) Continuation-in-part of application No. 15/821,834, filed on Nov. 23, 2017, now Pat. No. 10,076,862.

(51) Int. Cl.
B29C 45/77 (2006.01)
B29C 45/76 (2006.01)
B29C 45/78 (2006.01)

(52) U.S. Cl.
CPC ........ B29C 45/77 (2013.01); B29C 45/7693 (2013.01); B29C 45/78 (2013.01);
(Continued)

(58) Field of Classification Search
CPC .......... B29C 45/77; B29C 2945/76254; B29C 2945/76996; B29C 2945/76498;
(Continued)

(56) References Cited

U.S. PATENT DOCUMENTS 7,585,166 B2 9/2009 Buja
9,044,891 B2 6/2015 Murata
(Continued)

FOREIGN PATENT DOCUMENTS

TW 201618929 A 6/2016
WO 2009129230 A2 10/2009
(Continued)

OTHER PUBLICATIONS

Rong-yeu Chang and Wen-hsien Yang, Numerical simulation of mold filling in injection molding using a three-dimensional finite volume approach, International Journal for Numerical Methods in Fluids vol. 37, Issue 2, pp. 125-148, Sep. 30, 2001.
(Continued)

Primary Examiner — Robert J Grun
(74) Attorney, Agent, or Firm — Juan Carlos A. Marquez; Marquez IP Law Office, PLLC

(57) ABSTRACT

The present disclosure provides a method for operating a molding system. The molding system includes a molding machine and a mold disposed on the molding machine, wherein the mold has a mold cavity for being filled with a molding material from the molding machine. The method comprises a step of obtaining a predetermined state waveform expressing a predetermined volumetric variation of the molding material. Next, the method further comprises obtaining a measured pressure and a measured temperature of the molding material in the mold cavity while performing a molding process for filling the molding material into the mold cavity. Next, the method includes obtaining a detected volumetric property of the molding material corresponding to the measured pressure and the measured temperature. Subsequently, the method comprises displaying the detected volumetric property of the molding material with the predetermined state waveform.

16 Claims, 45 Drawing Sheets

(52) U.S. Cl.
CPC ............ *B29C 2045/7606* (2013.01); *B29C 2945/7604* (2013.01); *B29C 2945/76006* (2013.01); *B29C 2945/76257* (2013.01); *B29C 2945/76381* (2013.01); *G05B 2219/37399* (2013.01); *G05B 2219/37431* (2013.01); *G05B 2219/45244* (2013.01); *G06F 2217/16* (2013.01); *G06F 2217/41* (2013.01)

(58) Field of Classification Search
CPC .. B29C 2945/76006; B29C 2945/7604; B29C 2945/76939; B29C 45/7693; B29C 2945/76434; G05B 17/02; G05B 19/042; G05B 19/4097; G05B 2219/45244; Y02P 90/265
See application file for complete search history.

(56) References Cited

U.S. PATENT DOCUMENTS

| | | | |
|---|---|---|---|
| 9,684,295 B2 * | 6/2017 | Chang | ............ B29C 45/7693 |
| 10,076,862 B1 * | 9/2018 | Chang | ............ B29C 45/77 |
| 10,078,862 B2 * | 9/2018 | Deats | ............ G06Q 30/0635 |
| 2017/0015040 A1 | 1/2017 | Chang et al. | |

FOREIGN PATENT DOCUMENTS

| | | |
|---|---|---|
| WO | 2015019721 A1 | 2/2015 |
| WO | WO2017171044 A1 | 10/2017 |

OTHER PUBLICATIONS

Taiwan office action and search report dated Jul. 3, 2019, from R.O.C. counterpart application 108109102, 12 pages in Chinese and English summary, 1 page.

Taiwan office action and search report dated Feb. 14, 2019, from R.O.C. counterpart application 107136336, 4 pages in Chinese and English summary,1 page.

Taiwan office action and search report dated Oct. 3, 2019, from R.O.C. counterpart application 108109102, 14 pages in Chinese and English summary, 1 page.

* cited by examiner

| | | |
|---|---|---|
| Polymer | ABS | |
| Grade Name | POLYFLAM R ABS 90000 UV5 | |
| Producer | A. Schulman | |
| Comment | MVR(220,10)=30 cm3/10min, D=1.2 g/cc | |
| Last modified date | 2010/08/03 | |
| | | |
| | | |
| Process condition | Process condition | |
| Melt temperature (minimum) | 220 | oC |
| Melt temperature (normal) | 235 | oC |
| Melt temperature (maximum) | 250 | oC |
| Mold temperature (minimum) | 40 | oC |
| Mold temperature (normal) | 50 | oC |
| Mold temperature (maximum) | 60 | oC |
| Ejection temperature | 99.85 | oC |
| Freeze temperature | 119.85 | oC |

FIG. 7

METHOD FOR SETTING UP A MOLDING SYSTEM

CROSS-REFERENCE TO RELATED APPLICATION

This application is a continuous-in-part application of U.S. application Ser. No. 15/821,834, filed on Nov. 23, 2017, which is incorporated herein by reference in its entirety.

TECHNICAL FIELD

The present disclosure relates to a method for setting up a molding system, and more particularly, to a method for fine-tuning a molding system using multiple in-mold PVT (Pressure-Specific Volume-Temperature) waveforms of the molding material.

DISCUSSION OF THE BACKGROUND

Injection molding is a technology commonly used for high-volume manufacturing of parts made of synthetic resin, most commonly thermoplastic polymers. During a repetitive injection molding process, a plastic resin, most often in the form of small beads or pellets, is introduced to an injection molding machine that melts the resin beads under heat, pressure, and shear. The resulting molten resin is forcefully injected into a mold cavity having a particular cavity shape. The injected plastic is held under pressure in the mold cavity, cooled, and then removed as a solidified part having a shape that essentially duplicates the shape of the mold cavity.

A typical injection molding procedure comprises four basic operations: (1) heating the plastic in the injection molding machine to allow it to flow under pressure; (2) injecting the melted plastic into a mold cavity or cavities defined between two mold halves that have been closed; (3) allowing the plastic to cool and harden in the cavity or cavities while under pressure; and (4) opening the mold halves to cause the part to be ejected from the mold. During the conventional injection molding of synthetic resin by an injection molding machine, the weight of the injected synthetic resin varies with the molten resin pressure, the molten resin specific volume, the molten resin temperature or other molten resin conditions. Therefore, it is difficult to form products of a consistent quality.

In general, the setting of molding parameters of the injection molding machine requires a large number of trial molding operations and a lengthy set-up period because the set-up work greatly depends on the knowledge and experience of an operator of the injection molding machine, and because various parameters affect one another.

Therefore, a virtual molding process, i.e., computer-implemented simulation, using CAE (Computer-Aided Engineering), is performed for the injection molding process, and the molding parameters are then set based on the virtual molding. During virtual molding using CAE, phenomena will occur in a mold cavity within a short period of time. That is, the effects of resin temperature, pressure, shear rate, etc. on molded products can be simulated using CAE. Therefore, if the molding phenomena occurring within a mold cavity can be accurately determined, use of CAE may enable optimization of molding parameters and a stable molding of non-defective products.

This Discussion of the Background section is for background information only. The statements in this Discussion of the Background are not an admission that the subject matter disclosed in this section constitutes a prior art to the present disclosure, and no part of this section may be used as an admission that any part of this application, including this Discussion of the Background section, constitutes prior art to the present disclosure.

SUMMARY

The present disclosure provides a method for operating a molding system. The molding system comprises a molding machine and a mold disposed on the molding machine, wherein the mold includes a mold cavity for being filled with a molding material from the molding machine. The method comprises: obtaining a predetermined state waveform expressing a predetermined volumetric variation of the molding material; obtaining a measured pressure and a measured temperature of the molding material in the mold cavity while performing a molding process for filling the molding material into the mold cavity; obtaining a detected volumetric property of the molding material corresponding to the measured pressure and the measured temperature; and displaying the detected volumetric property of the molding material with the predetermined state waveform.

In some embodiments, the method further comprises: obtaining a plurality of measured pressures and a plurality of measured temperatures of the molding material in the mold cavity while performing the molding process to form a detected state waveform expressing a detected volumetric variation of the molding material; and displaying the detected state waveform with the predetermined state waveform.

In some embodiments, the method further comprises obtaining a volumetric difference between the detected volumetric property and a predetermined volumetric property of the predetermined state waveform at the measured pressure and the measured temperature.

In some embodiments, the method further comprises generating an alarm signal when the volumetric difference is greater than a predetermined value.

In some embodiments, the method further comprises increasing a packing pressure of the molding machine if the detected volumetric property is greater than the predetermined volumetric property.

In some embodiments, the method further comprises decreasing a packing pressure of the molding machine if the detected volumetric property is less than the predetermined volumetric property.

In some embodiments, the predetermined state waveform is obtained from a former molding system comprising a former molding machine and a former mold, and at least one of the former molding machine and the former mold is changed to form the molding system.

In some embodiments, the method further comprises: obtaining the predetermined state waveform from a former molding system comprising a former molding machine and a former mold; changing at least one of the former molding machine and the former mold to form the molding system; obtaining a plurality of measured pressures and a plurality of measured temperatures of the molding material in the mold cavity while performing the molding process to form a detected state waveform expressing a detected volumetric variation of the molding material; and displaying the detected state waveform with the predetermined state waveform.

In some embodiments, the method further comprises adjusting a packing pressure profile of the molding machine to reduce a volumetric difference between the detected state waveform and the predetermined state waveform.

In some embodiments, the step of obtaining a detected volumetric property of the molding material corresponding to the measured pressure and the measured temperature is performed using a pressure-specific volume-temperature state model.

The present disclosure also provides a method for operating a molding system, wherein the molding system comprises a molding machine and a mold disposed on the molding machine, and the mold has a first mold cavity and a second mold cavity for being filled with a molding material from the molding machine. The method comprises: obtaining a first measured pressure and a first measured temperature of the molding material in the first mold cavity while performing a is molding process for filling the molding material into the first mold cavity; obtaining a first detected volumetric property of the molding material corresponding to the first measured pressure and the first measured temperature; obtaining a second measured pressure and a second measured temperature of the molding material in the second mold cavity while performing the molding process for filling the molding material into the second mold cavity; obtaining a second detected volumetric property of the molding material corresponding to the second measured pressure and the second measured temperature; and displaying the first detected volumetric property with the second detected volumetric property of the molding material.

In some embodiments, the method further comprises: obtaining a plurality of first measured pressures and a plurality of first measured temperatures of the molding material in the first mold cavity while performing the molding process to form a first detected state waveform expressing a first volumetric variation of the molding material in the first mold cavity; obtaining a plurality of second measured pressures and a plurality of second measured temperatures of the molding material in the second mold cavity while performing the molding process to form a second detected state waveform expressing a second volumetric variation of the molding material in the second mold cavity; and displaying the first detected state waveform with the second detected state waveform.

In some embodiments, the method further comprises adjusting a packing pressure profile of the molding machine to reduce a volumetric difference between the first detected state waveform and the second detected state waveform.

In some embodiments, the step of obtaining a first detected volumetric property of the molding material corresponding to the first measured pressure and the first measured temperature is performed using a pressure-specific volume-temperature state model.

The present disclosure also provides a method for operating a molding system, comprising: obtaining a predetermined state waveform from a first molding system comprising a first molding machine and a first mold; changing at least one of the first molding machine and the first mold to form a second molding system; obtaining a plurality of measured pressures and a plurality of measured temperatures while performing a molding process on the second molding system to form a detected state waveform expressing a detected volumetric variation of the molding material; and displaying the detected state waveform with the predetermined state waveform.

In some embodiments, the method further comprises adjusting a packing pressure profile of the second molding machine to reduce a volumetric difference between the detected state waveform and the predetermined state waveform.

In some embodiments, the step of obtaining a detected volumetric property of the molding material corresponding to the measured pressure and the measured temperature is performed using a pressure-specific volume-temperature state model.

The foregoing has outlined rather broadly the features and technical advantages of the present disclosure in order that the detailed description of the disclosure that follows may be better understood. Additional features and advantages of the disclosure will be described hereinafter, and form the subject of the claims of the disclosure. It should be appreciated by those skilled in the art that the conception and specific embodiment disclosed may be readily utilized as a basis for modifying or designing other structures or processes for carrying out the same purposes of the present disclosure. It should also be realized by those skilled in the art that such equivalent constructions do not depart from the spirit and scope of the disclosure as set forth in the appended claims.

BRIEF DESCRIPTION OF THE DRAWINGS

Aspects of the present disclosure are best understood from the following detailed description when read with the accompanying figures. It is emphasized that, in accordance with the standard practice in the industry, various features are not drawn to scale. In fact, the dimensions of the various features may be arbitrarily increased or reduced for clarity of discussion.

FIG. 7 shows a data sheet of the molding material in accordance with some embodiments of the present disclosure.

DETAILED DESCRIPTION

The following description of the disclosure accompanies drawings, which are incorporated in and constitute a part of this specification, and illustrate embodiments of the disclosure, but the disclosure is not limited to the embodiments. In addition, the following embodiments can be properly integrated to complete another embodiment.

References to "some embodiments of the present disclosure," "an embodiment," "exemplary embodiment," "other embodiments of the present disclosure," "another embodiment," etc. indicate that the embodiment(s) of the disclosure so described may include a particular feature, structure, or characteristic, but not every embodiment necessarily includes the particular feature, structure, or characteristic. Further, repeated use of the phrase "in the embodiment" does not necessarily refer to the same embodiment, although it may.

The present disclosure is directed to a molding system capable of setting molding parameters using multiple in-mold PVT (Pressure-Specific Volume-Temperature) waveforms of the molding material. It should be understood that interchange between the specific volume and the density (i.e., an inverse of the specific volume) can be made herein without departing from the spirit and scope of the disclosure. In order to make the present disclosure completely comprehensible, detailed steps and structures are provided in the following description. Obviously, implementation of the present disclosure does not limit special details known by persons skilled in the art. In addition, known structures and steps are not described in detail, so as not to limit the present disclosure unnecessarily. Preferred embodiments of the present disclosure will be described below in detail. However, in addition to the detailed description, the present disclosure may also be widely implemented in other embodiments. The scope of the present disclosure is not limited to the detailed description, and is defined by the claims.

Figure 1:
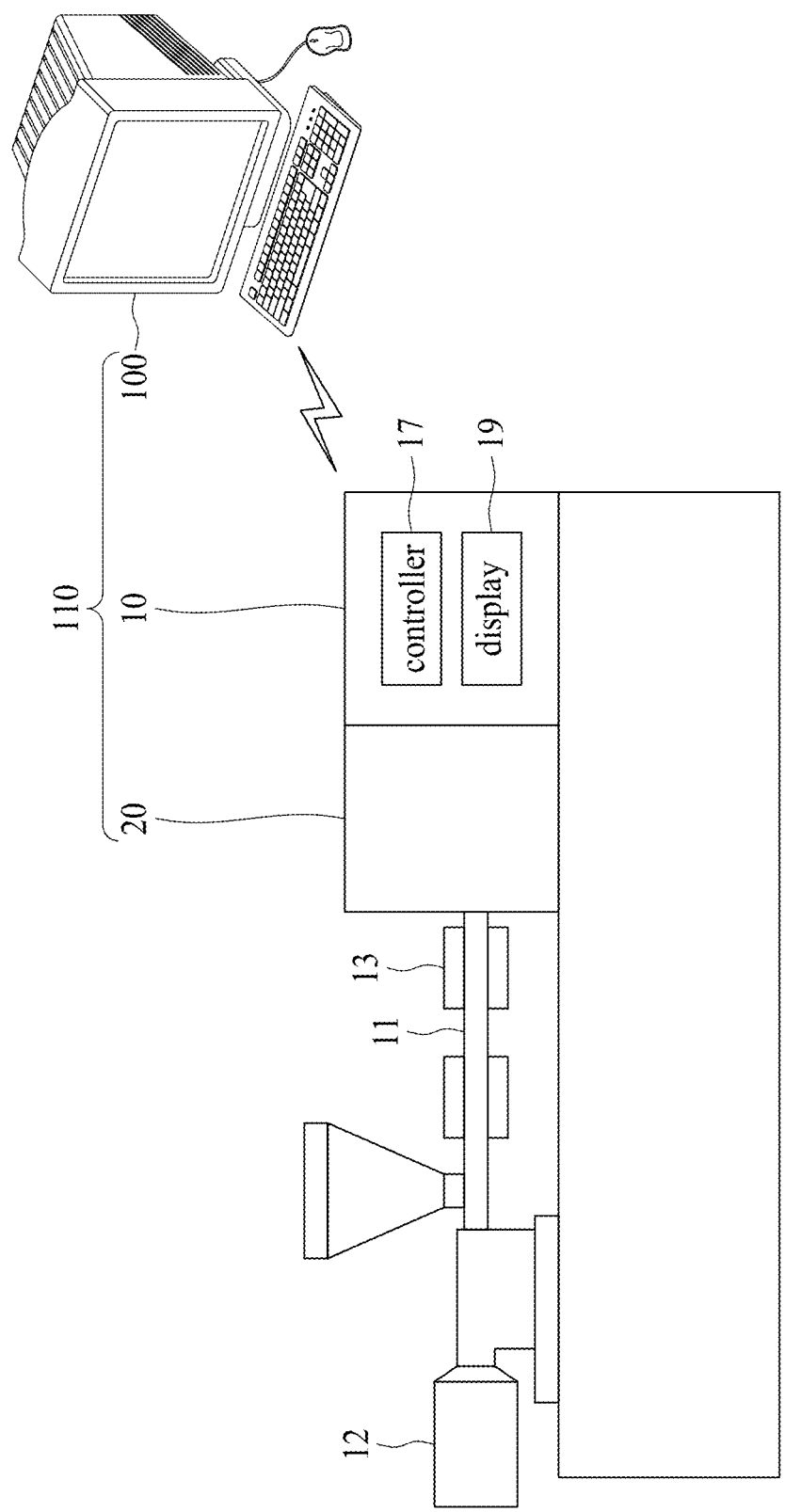
FIG. 1 is a schematic view of an injection molding system in accordance with various embodiments of the present disclosure.
Figure 2:
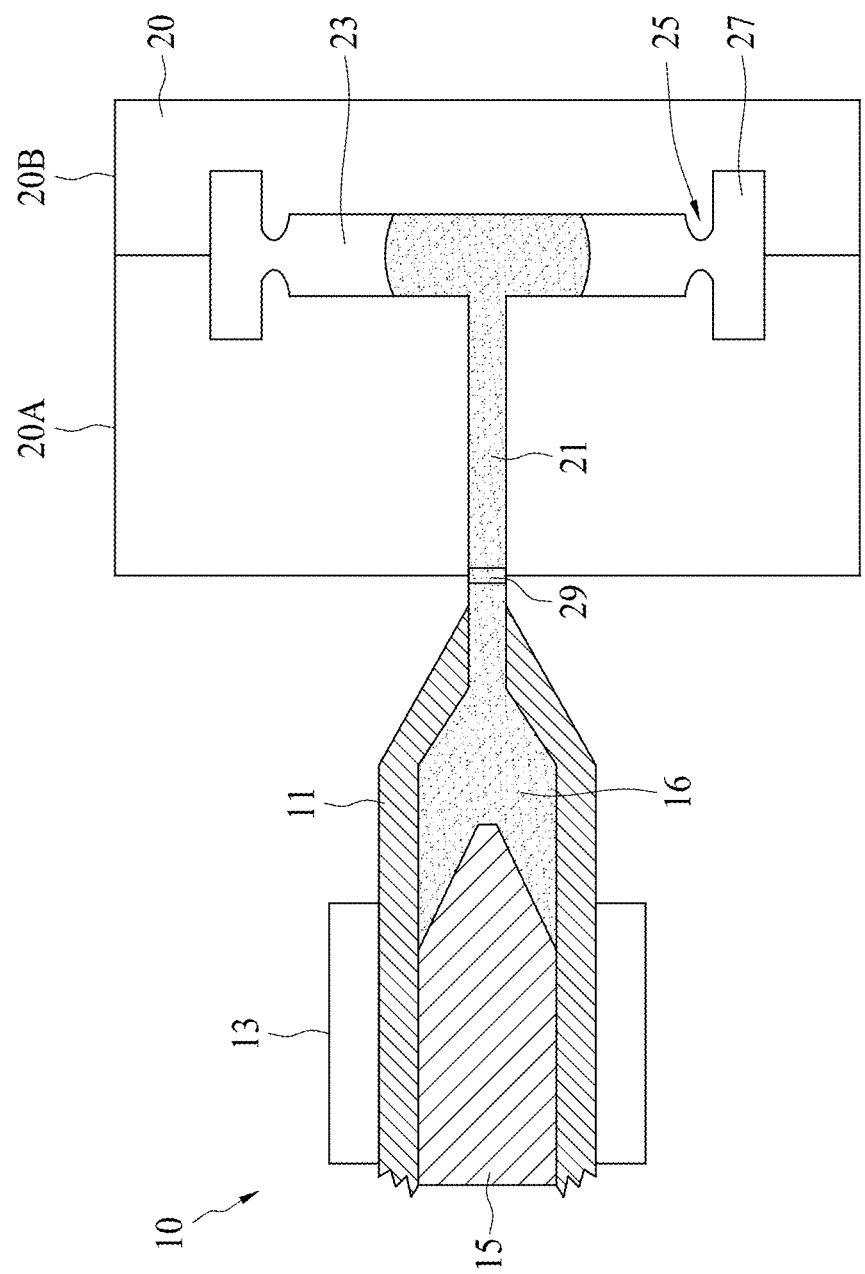
FIG. 2 is a schematic view of a mold in FIG. 1.

FIG. 1 is a schematic view of an injection molding system 110 in accordance with various embodiments of the present disclosure, and FIG. 2 is a schematic view of a mold 20 in FIG. 1. The injection molding system 110 comprises a molding machine 10 such as an injection molding machine and a computing apparatus 100 connected to the injection molding machine 10, wherein the mold 20 is disposed on the molding machine 10. In some embodiments of the present disclosure, the injection molding machine 10 includes a barrel 11 having a screw chamber, heating elements 13 configured to heat the barrel 11, and a screw 15 positioned in the screw chamber in the barrel 11 and driven by a screw-driving motor 12 for feeding a molding material 16, such as thermoplastics, into a mold cavity 25 of the metal mold 20. In some embodiments of the present disclosure, the molding machine 10 has a controller 17 configured to control the operation of the injection molding machine 10 and a display 19 such as a screen configured to display information of the injection molding process.

In some embodiments of the present disclosure, the injection molding machine 10 is equipped with sensors for sensing the velocity of the screw 15, the pressure of the molding material 16 in the barrel 11 during the filling stage (filling pressure) and the temperature of the molding material 16 in the barrel 11 during the filling stage (filling temperature); and the computing apparatus 100 is connected to the controller 17 and programmed to acquire information such as velocity and pressure data from the controller 17 through a connection such as a hardwire connection or a wireless connection therebetween.

In some embodiments of the present disclosure, the metal mold 20 is constituted by a fixed-side metal mold 20A and a movable-side metal mold 20B. Inside the metal mold 20, a sprue portion 21, a runner portion 23, a gate portion 25 and a mold cavity 27 are formed so as to be arranged in the above-mentioned order from the injection molding machine 10. The sprue portion 21 of the metal mold 20 is connected to the barrel 11 of the molding machine 10 via a nozzle 29.

Figure 3:
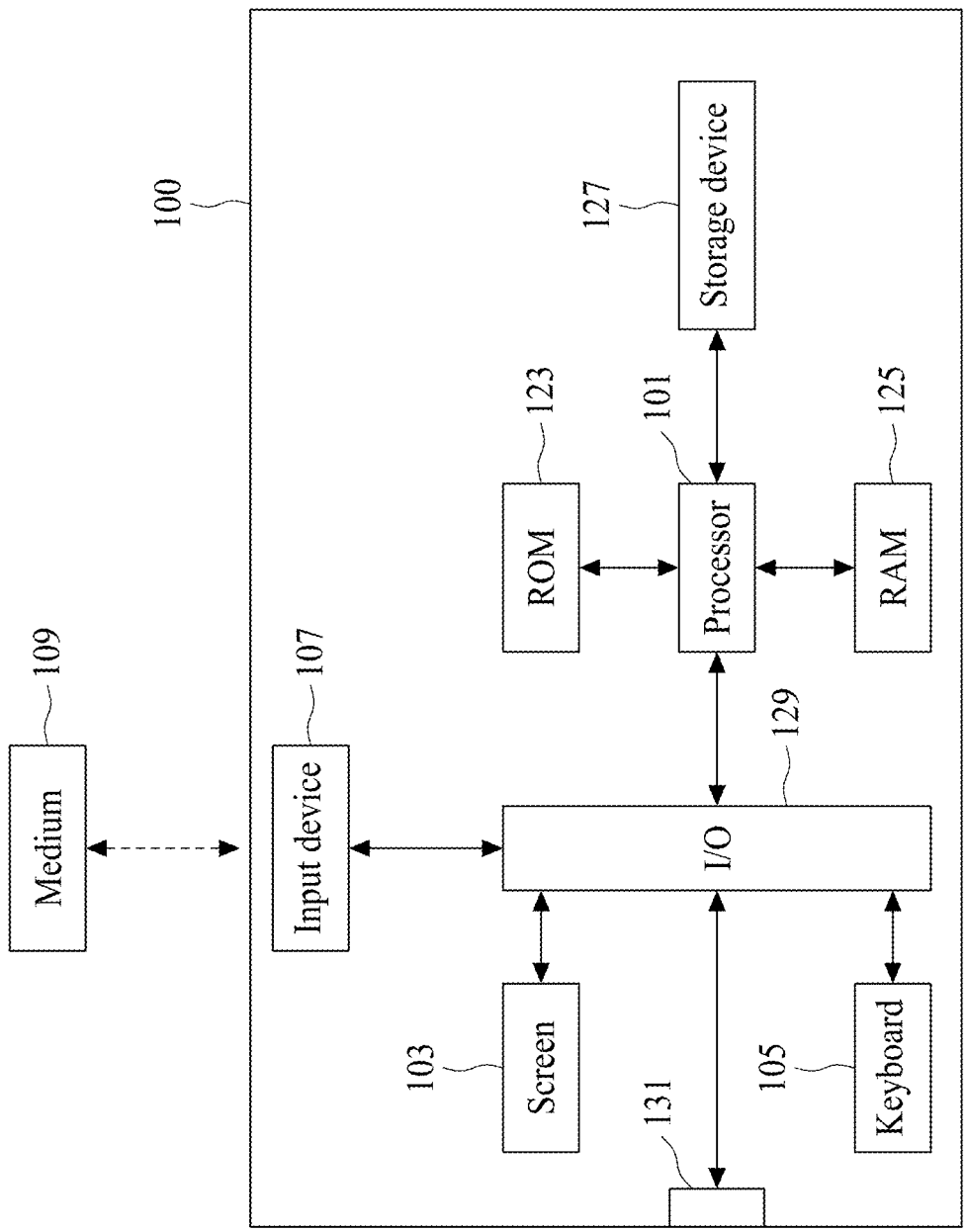
FIG. 3 is a functional block diagram of a computing apparatus in accordance with some embodiments of the present disclosure.

FIG. 3 is a functional block diagram of a computing apparatus 100 in accordance with some embodiments of the present disclosure. In some embodiments of the present disclosure, the computing apparatus 100 comprises a processing module 100' for performing a computer-implemented injection molding simulation method, such as executing CAE simulation software. In some embodiments of the present disclosure, the processing module 100' includes a processor 101, a read-only memory (ROM) 123, and a random access memory (RAM) 125. In some embodiments of the present disclosure, the computing apparatus 100 further includes a storage device 127, and an input/output (I/O) interface 129. The computer processor 101 operably communicates with the ROM 123, the RAM 125, the storage device 127, and the I/O interface 129.

In some embodiments of the present disclosure, the computing apparatus 100 may further include a screen 103, a keyboard 105, and an input device 107 such as a card reader or an optical disk drive. The input device 107 is configured to input computer instructions (software algorithms) stored in a non-transitory computer-readable medium 109, and the computer processor 101 is configured to execute operations for performing a computer-implemented injection molding simulation method according to the computer instructions. The computer processor 101 reads software algorithms from the input device 107 or the storage device 127, executes the calculation steps, and stores the calculated result in the RAM 125. In some embodiments of the present disclosure, the memory devices, i.e., the ROM 123 and the RAM 125, can be programmed to store codes for performing the computer-implemented injection molding simulation method. In some embodiments of the present disclosure, the computing apparatus further comprises a connector 131 configured to form a connection with the controller 17 of the injection molding machine 10.

Figure 4:
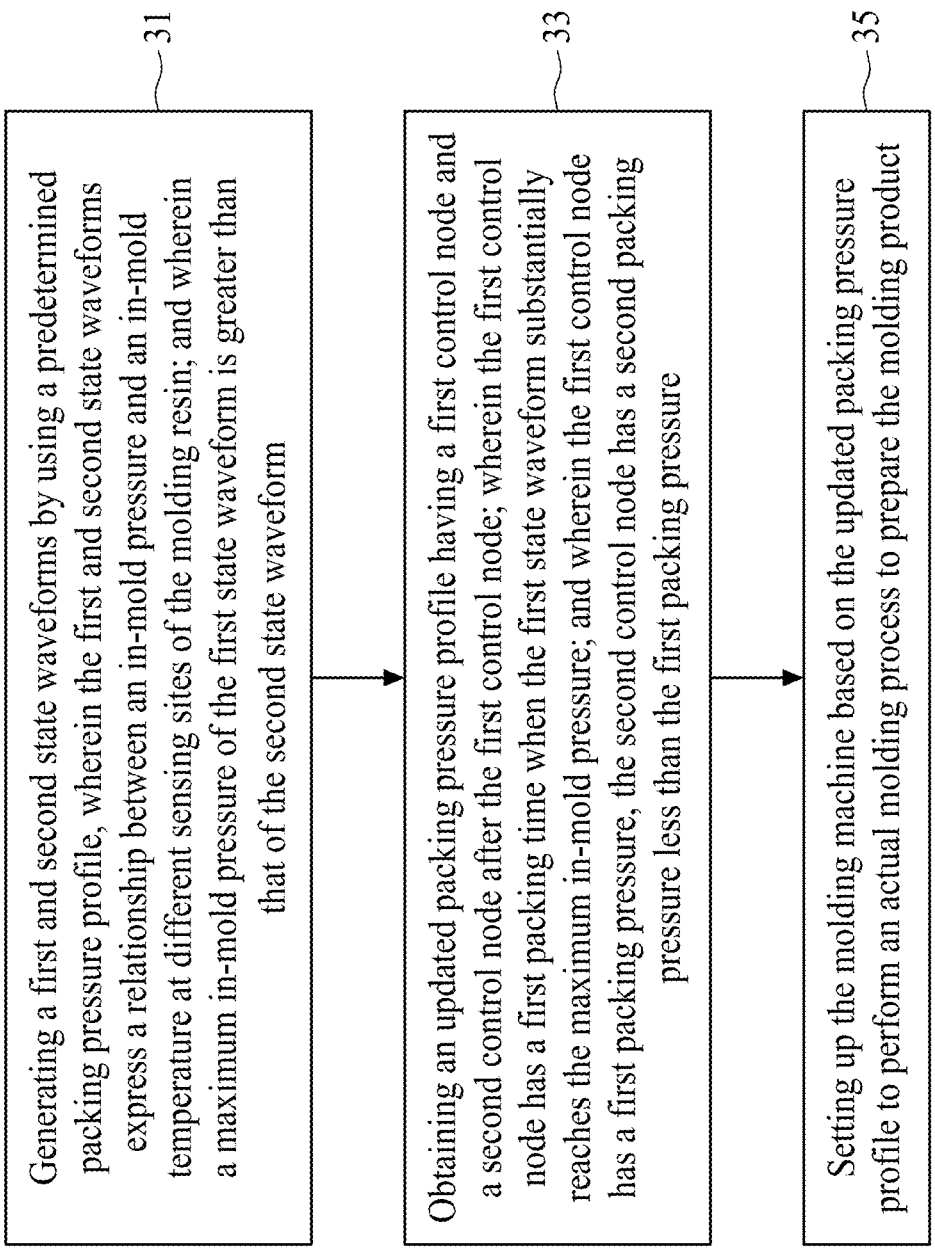
FIG. 4 is a flowchart of a method for operating a molding machine in accordance with some embodiments of the present disclosure.

FIG. 4 is a flowchart of a method 30 for operating a molding machine in accordance with some embodiments of the present disclosure. The method 30 can be considered a molding parameter setting method for the molding machine, and comprises a step 31 of generating first and second state waveforms using a predetermined packing pressure profile, wherein the first and the second state waveforms express a relationship between an in-mold pressure and an in-mold temperature at different sensing sites of the molding material, and wherein a maximum in-mold pressure of the first state waveform is greater than that of the second state waveform; a step 33 of obtaining an updated packing pressure profile having a first control node and a second control node after the first control node, wherein the first control node has a first packing time at which the first state waveform substantially reaches the maximum in-mold pressure, and wherein the first control node has a first packing pressure and the second control node has a second packing pressure less than the first packing pressure; and a step 35 of setting up the molding machine based on the updated packing pressure profile to perform an actual molding process to prepare the molding product.

The following describes an exemplary process flow of the method 30 in accordance with some embodiments of the present disclosure.

Figure 5:
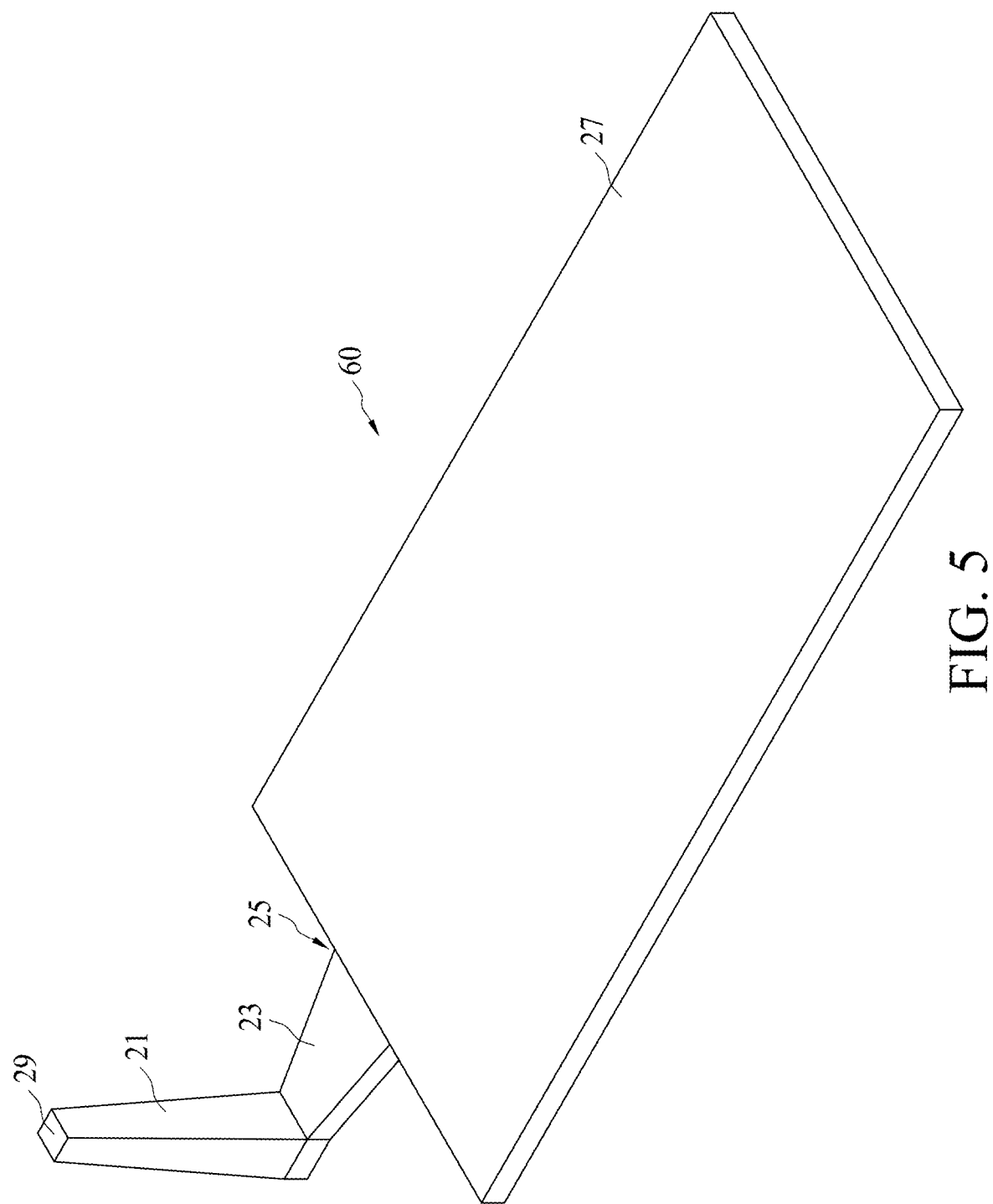
FIG. 5 is a schematic view of a genuine domain in accordance with some embodiments of the present disclosure.
Figure 6:
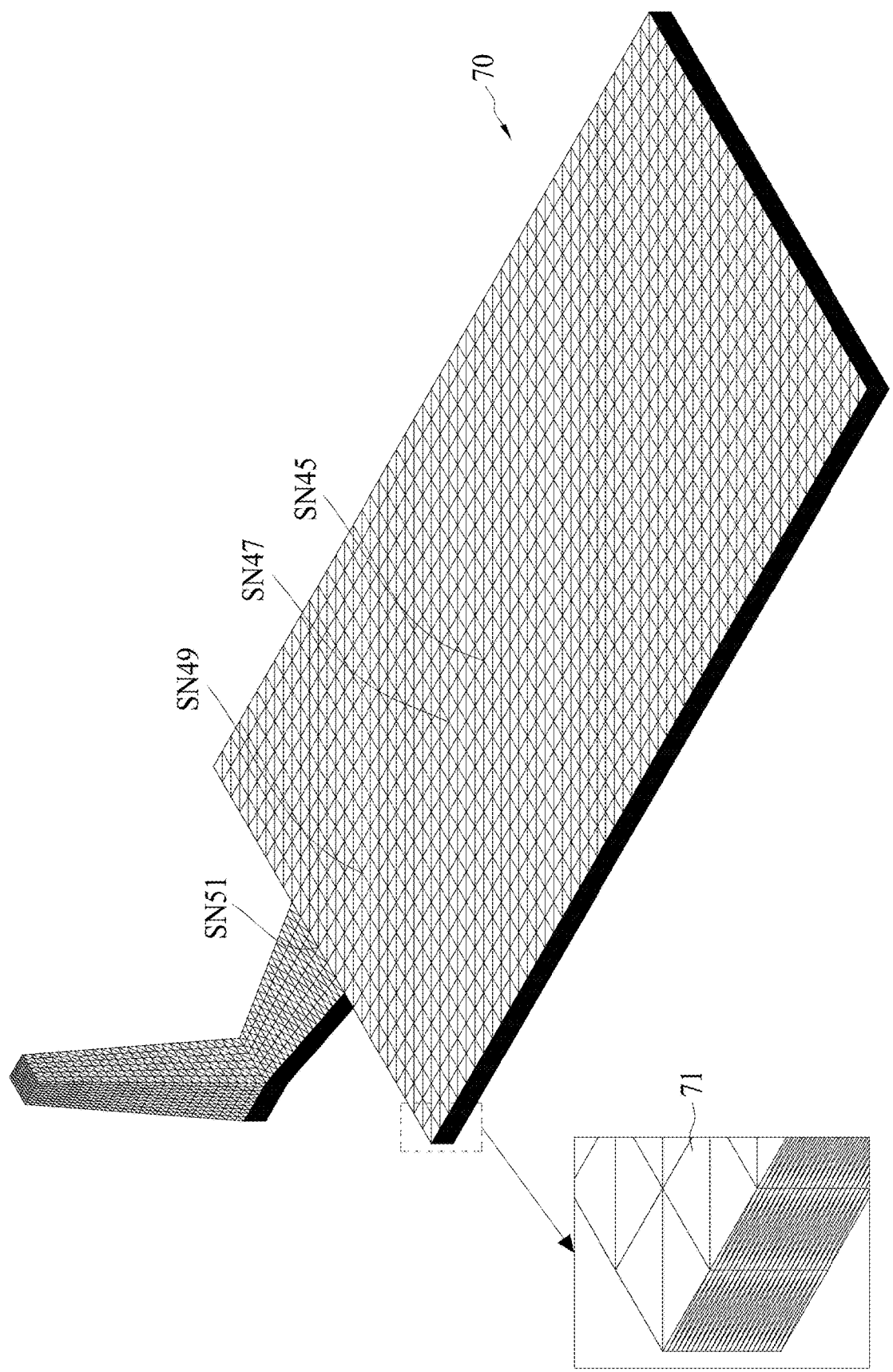
FIG. 6 is a schematic view of a simulated domain corresponding to the genuine domain in FIG. 5 in accordance with some embodiments of the present disclosure.

FIG. 5 is a schematic view of a genuine domain 60 in accordance with some embodiments of the present disclosure, and FIG. 6 is a schematic view of a simulated domain 70 corresponding to the genuine domain 60 in accordance with some embodiments of the present disclosure. Referring back to FIG. 2, the metal mold 20 may be divided into two parts: a metal part and space part defined by the metal part. The genuine domain 60 is an example of the space part of the metal mold 20. In some embodiments of the present disclosure, the simulated domain 70 is obtained from a CAD (Computer Aided Design) model used in design and development of a product.

In some embodiments of the present disclosure, a mesh is created by dividing at least part of the simulated domain 70 before actually applying a numerical analysis, such as an FEM (finite element method), an FDM (finite difference method) or an FVM (finite volume method), to the simulated domain 70. The creation of the mesh for the simulated domain 70 is a technique of modeling an object or fluid region (i.e., the simulated domain 70 of the present embodiment) to be analyzed with a set of elements 71, such as rectangular mesh, hexahedral mesh or tetrahedral mesh, in order to perform the subsequent numerical analysis.

FIG. 7 shows a data sheet of the molding material in accordance with some embodiments of the present disclosure. In some embodiments of the present disclosure, the molding material is acrylonitrile butadiene styrene (ABS) resin having an ejection temperature of 99.85° C. and a melting temperature of 119.85° C.

Figure 8:
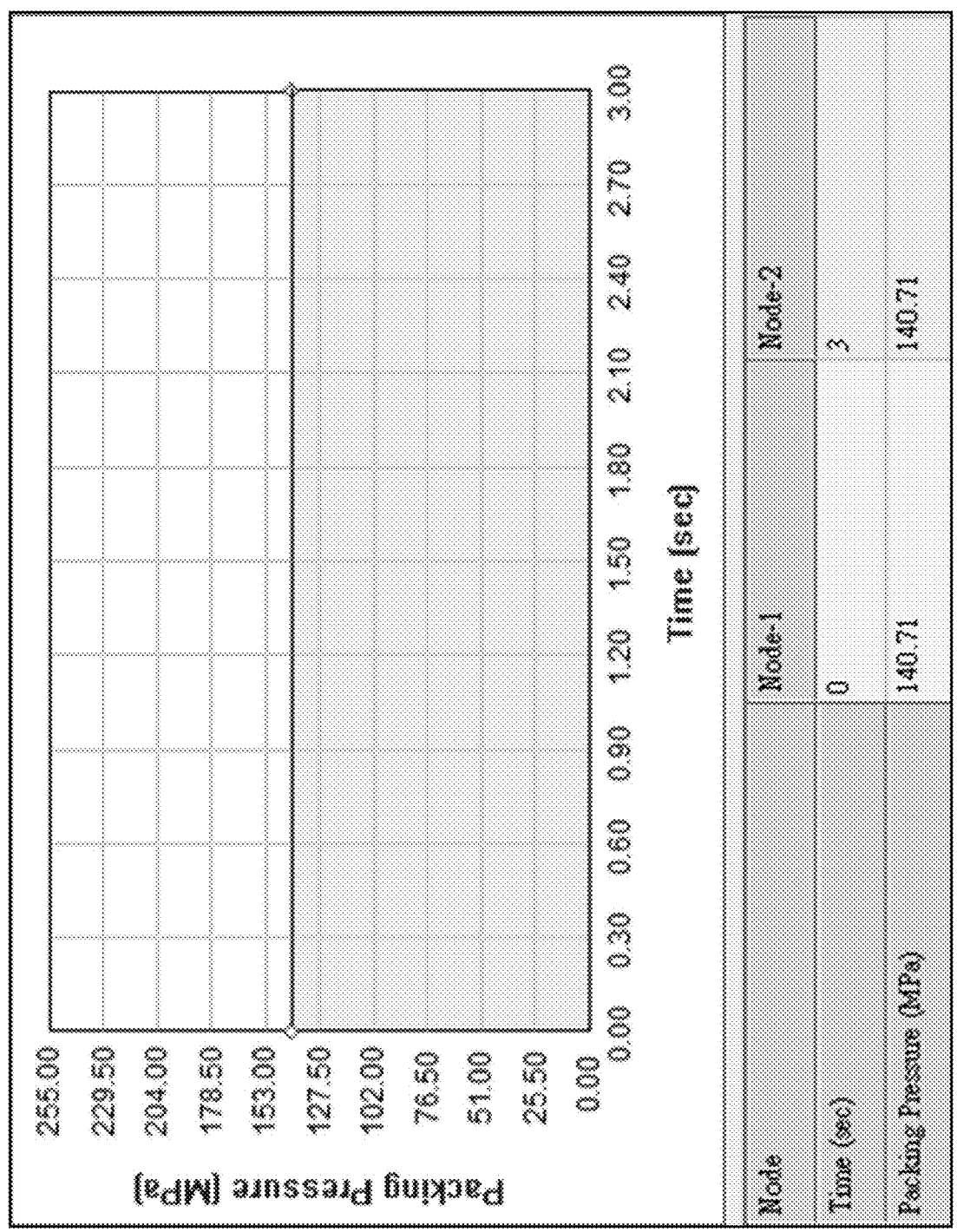
FIG. 8 is a schematic plot showing a predetermined packing pressure profile in accordance with some embodiments of the present disclosure.
Figure 9:
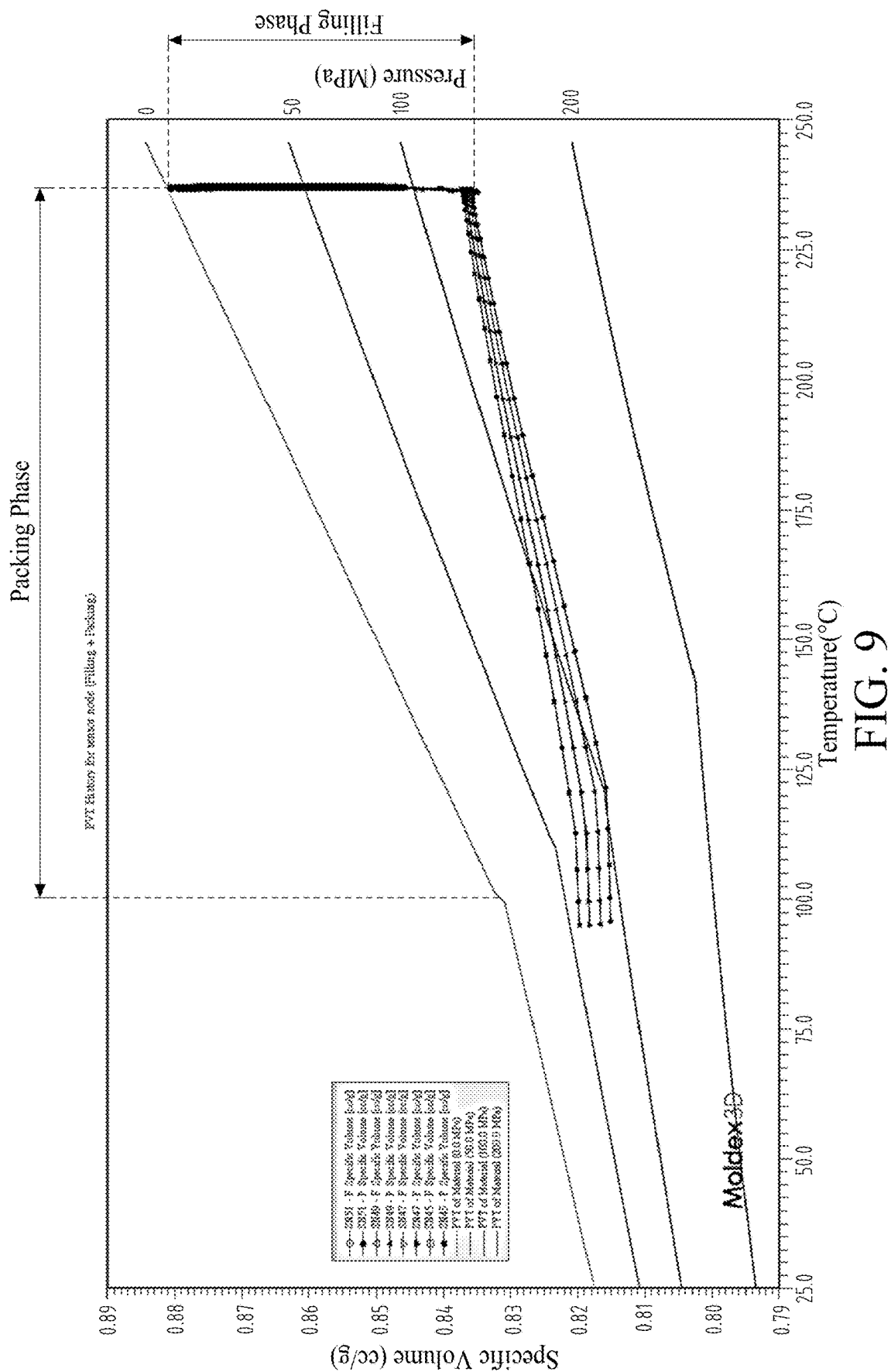
FIG. 9 and FIG. 10 are schematic plots showing a plurality of state waveforms at different sensing sites of the molding material in the simulated domain using the predetermined packing pressure profile in FIG. 8 in accordance with some embodiments of the present disclosure.
Figure 10:
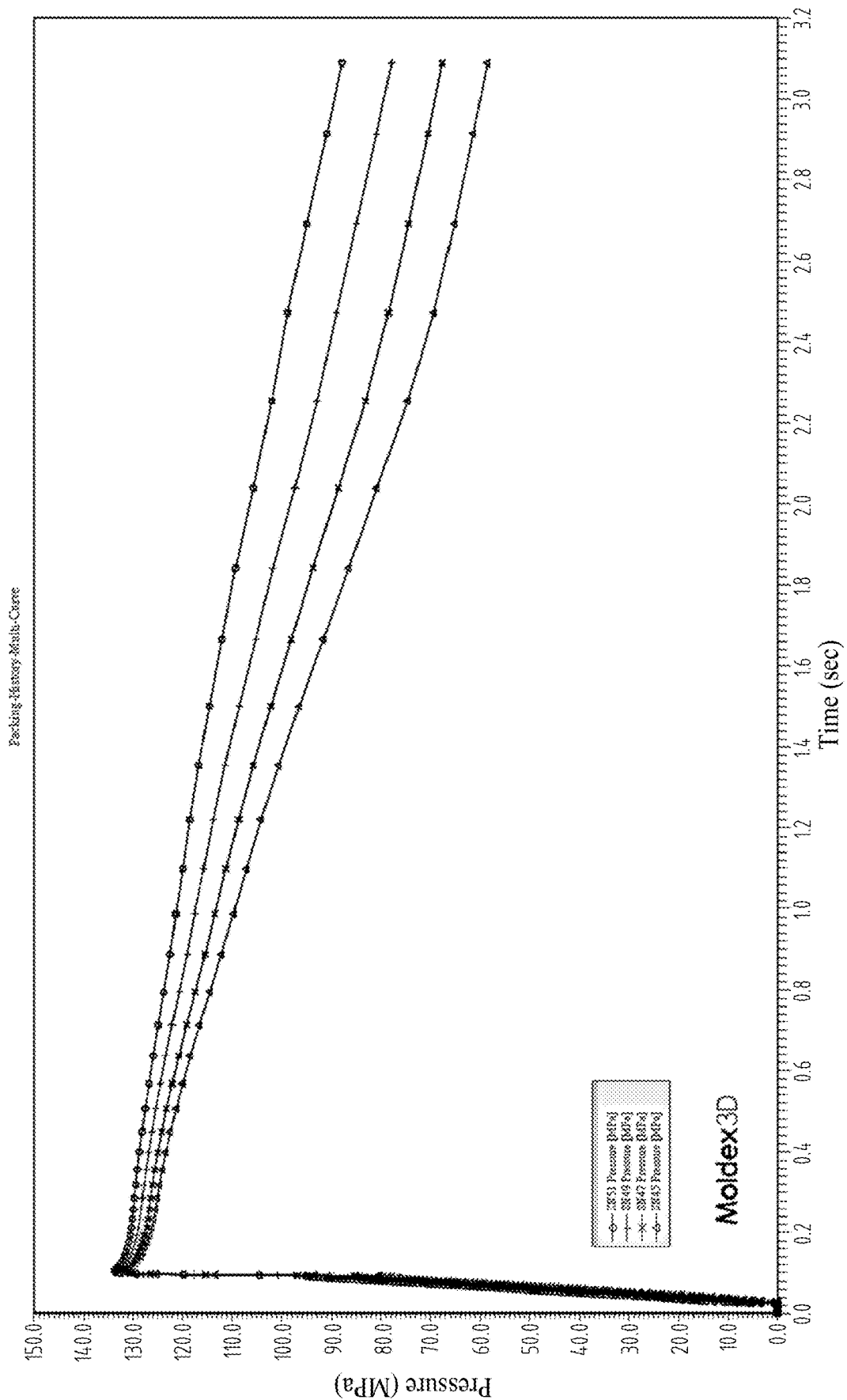

FIG. 8 is a schematic plot showing a predetermined packing pressure profile to be applied to at least a portion of the genuine domain 60 in accordance with some embodiments of the present disclosure. FIG. 9 and FIG. 10 are schematic plots showing a plurality of state waveforms at different sensing sites of the molding material 16 in the simulated domain 70 using the predetermined packing pressure profile in FIG. 8 in accordance with some embodiments of the present disclosure. In some embodiments of the present disclosure, the method 30 can begin with step 31, wherein first and second state waveforms are generated using the predetermined packing pressure profile in FIG. 8. In some embodiments of the present disclosure, the state waveforms are generated by a virtual molding process as described below.

In some embodiments of the present disclosure, the virtual molding process includes performing a simulation process to simulate an injection molding process of a molding material that is injected into the simulated domain 70, so as to generate the state waveforms expressing a relationship between an in-mold pressure, an in-mold temperature, and a specific volume of the molding material. In some embodiments of the present disclosure, the simulation process uses the packing pressure profile for simulating the application of a packing pressure to the nozzle 29 of the genuine domain 60 by the screw 15 of the molding machine. In some embodiments of the present disclosure, the packing pressure profile may be a single pressure value (e.g., the initial packing pressure, 140.71 MPa, in FIG. 8), which can be an ending pressure of the filling stage.

In some embodiments of the present disclosure, the packing pressure profile may be a waveform with varying pressure values, which can be obtained from the injection molding machine 10 after a trial molding operation. In some embodiments of the present disclosure, the packing pressure profile may be a waveform with varying pressure values, wherein the packing pressure profile is obtained from a trial simulation process of the injection molding operation.

The molding phenomena of the molding material 16 can be simulated using the following governing equations (1)-(4):

$$\frac{\partial \rho}{\partial t} + \nabla \cdot \rho u = 0 \tag{1}$$

$$\frac{\partial}{\partial t}(\rho u) + \nabla \cdot (\rho u u + \tau) = -\nabla p + \rho g \tag{2}$$

$$\frac{\partial}{\partial t}(T\rho C_P) + \nabla \cdot (\rho u C_P T) = k\nabla^2 T + \eta \dot{\gamma}^2 \tag{3}$$

$$\tau = -\eta(T, \dot{\gamma}) \cdot (\nabla u + \nabla u^T) \tag{4}$$

where u represents the velocity vector (flow velocity), T represents temperature, t represents time, P represents pressure, τ represents the total stress tensor, β represents density, η represents viscosity, k represents thermal conductivity, $C_P$ represents specific heat, and $\dot{\gamma}$ represents shear rate.

In one embodiment of the present disclosure, the governing equations (1)-(4) are solved using the pressure of the packing pressure profile in FIG. 8 to determine the boundary parameters of the governing equations (1)-(4)$_a$t the nozzle 29 of the genuine domain 60. Solving the governing equations (1)-(4) requires the transient state analysis (virtual molding), which can be performed numerically using a computing apparatus. See, e.g., Rong-yeu Chang and Wen-hsien Yang, Numerical simulation of mold filling in injection molding using a three-dimensional finite volume approach, International Journal for Numerical Methods in Fluids Volume 37, Issue 2, pages 125-148, Sep. 30, 2001, the entirety of which is incorporated herein by reference. During the transient state analysis, the process variables that change with time are not zero; i.e., the partial derivatives (∂/∂t) in the governing equations (1)-(4) are not considered zero.

Figure 11:
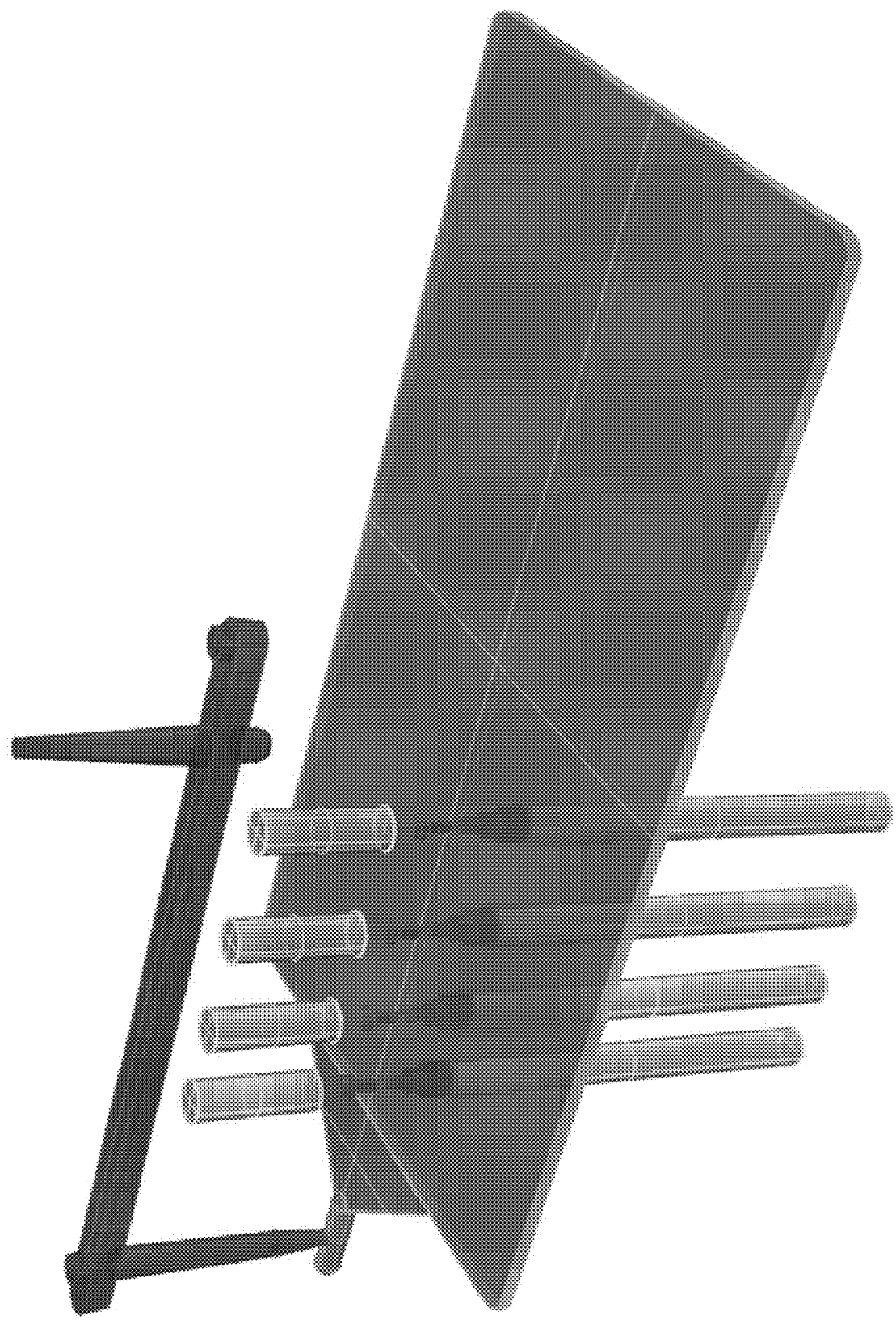
FIG. 11 is a schematic diagram showing a plurality of sensors (pressure sensors and temperature sensors) disposed at different sensing sites of the mold in accordance with some embodiments of the present disclosure.

FIG. 11 is a schematic diagram showing a plurality of sensors (pressure sensors and temperature sensors) disposed at different sensing sites of the mold in accordance with some embodiments of the present disclosure. In some embodiments of the present disclosure, instead of using the virtual molding process, the state waveforms in FIG. 9 and FIG. 10 are generated by a plurality of sensors (pressure sensors and temperature sensors) disposed at different sensing sites of the mold.

In some embodiments of the present disclosure, the state waveforms express the relationship between the in-mold pressure (P), the in-mold specification volume (V), and the in-mold temperature (T) of the molding material 16 at the plurality of sensing sites SN51, SN49, SN47 and SN45 of the simulated domain 70 shown in FIG. 6. In some embodiments of the present disclosure, the state waveforms may optionally express the relationship between the in-mold pressure (P), the in-mold specification volume (V), and the in-mold temperature (T) of the molding material 16 at any portion of the mold cavity 27.

Referring back to FIG. 9, in some embodiments of the present disclosure, each of the state waveforms includes a filling phase and a packing phase following the filling phase, and a transition node $T_t$ immediately after the filling phase and before the packing phase. Referring back to FIG. 10, in some embodiments of the present disclosure, a maximum in-mold pressure of the state waveform SN51 is greater than that of the other state waveforms SN49, SN47 and SN45.

Figure 12:
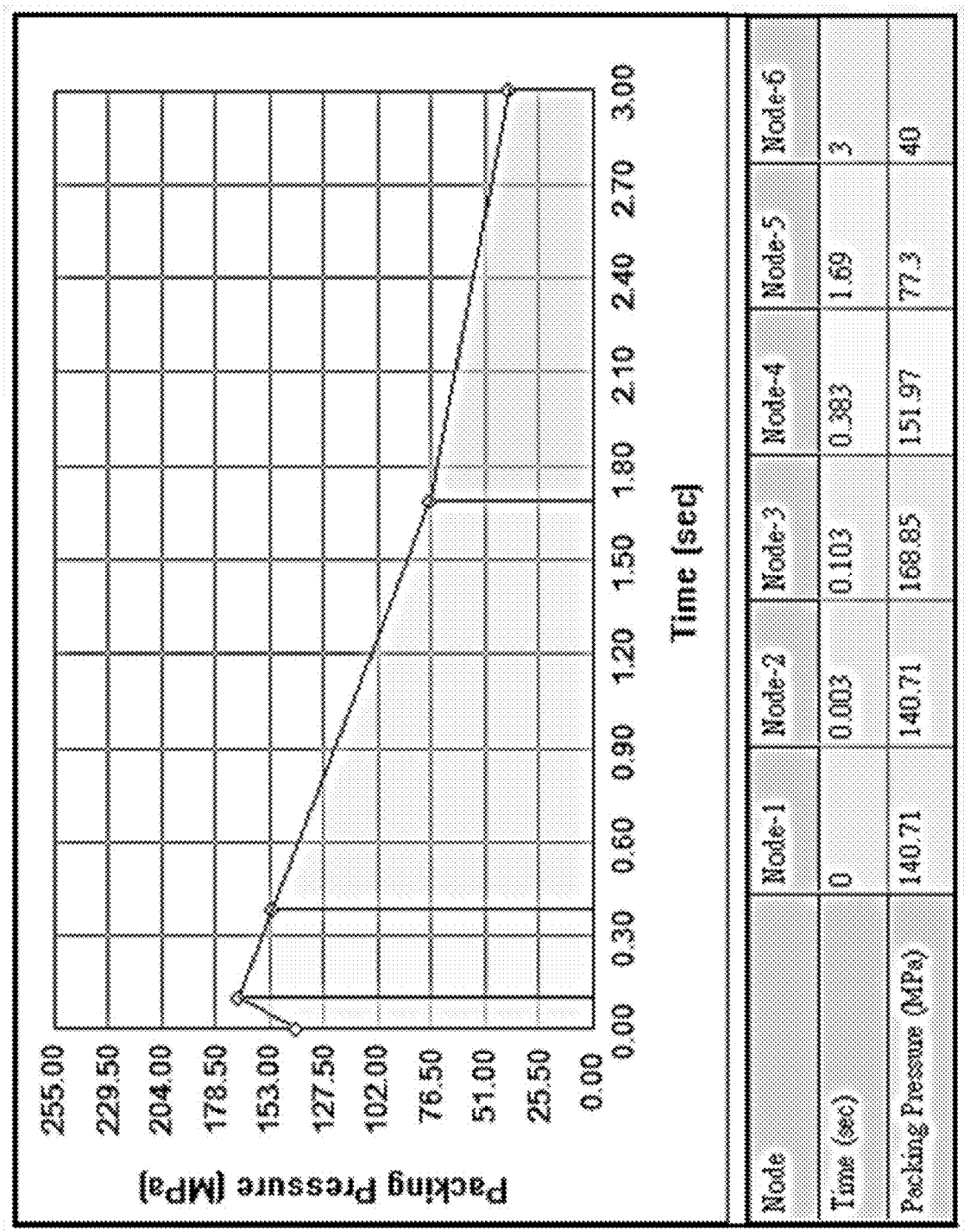
FIG. 12 is a schematic plot showing an updated packing pressure profile in accordance with some embodiments of the present disclosure.

FIG. 12 is a schematic plot showing an updated packing pressure profile in accordance with some embodiments of the present disclosure. In step 33 of the method 30 in FIG. 4, an updated packing pressure profile is obtained. In some embodiments of the present disclosure, the updated packing pressure profile includes a control node (Node-2), which is the initial control node of the packing phase; in addition, the updated packing pressure profile also includes a control node (Node-3) and a control node (Node-4) after the control node (Node-3), wherein the control node (Node-3) has a packing time at which the state waveform SN51 substantially reaches the maximum in-mold pressure in FIG. 10. In some embodiments of the present disclosure, the control node (Node-3) has a packing pressure (e.g., 168.85 MPa), and the control node (Node-4) has a packing pressure (e.g., 151.97 MPa) less than the packing pressure of the control node (Node-3).

In some embodiments of the present disclosure, the predetermined packing pressure profile in FIG. 8 has an initial packing pressure (e.g., 140.71 MPa), and the computing apparatus is configured to obtain the packing pressure of the control node (Node-3) based on the initial packing pressure. In some embodiments of the present disclosure, the packing pressure of the control node (Node-3) is determined by multiplying the initial packing pressure by a positive constant (e.g., 140.71*1.2=168.85 MPa), so as to apply a greater pressure on the molding material in the mold cavity to reduce the deviation of the state waveforms when the state waveform SN51 substantially reaches the maximum in-mold pressure in FIG. 10.

In some embodiments of the present disclosure, the updated packing pressure profile in FIG. 12 also includes a control node (Node-6) with a packing pressure, which is a designated ejection pressure (40 MPa) rather than the normal pressure. In some embodiments of the present disclosure, the updated packing pressure profile further includes a control node (Node-5), which functions as a buffering node between the control node (Node-4) and the control node (Node-6), and the packing time and the packing pressure of the third control node (Node-5) are designed to be the averages of those of the control node (Node-4) and the control node (Node-6).

Figure 13:
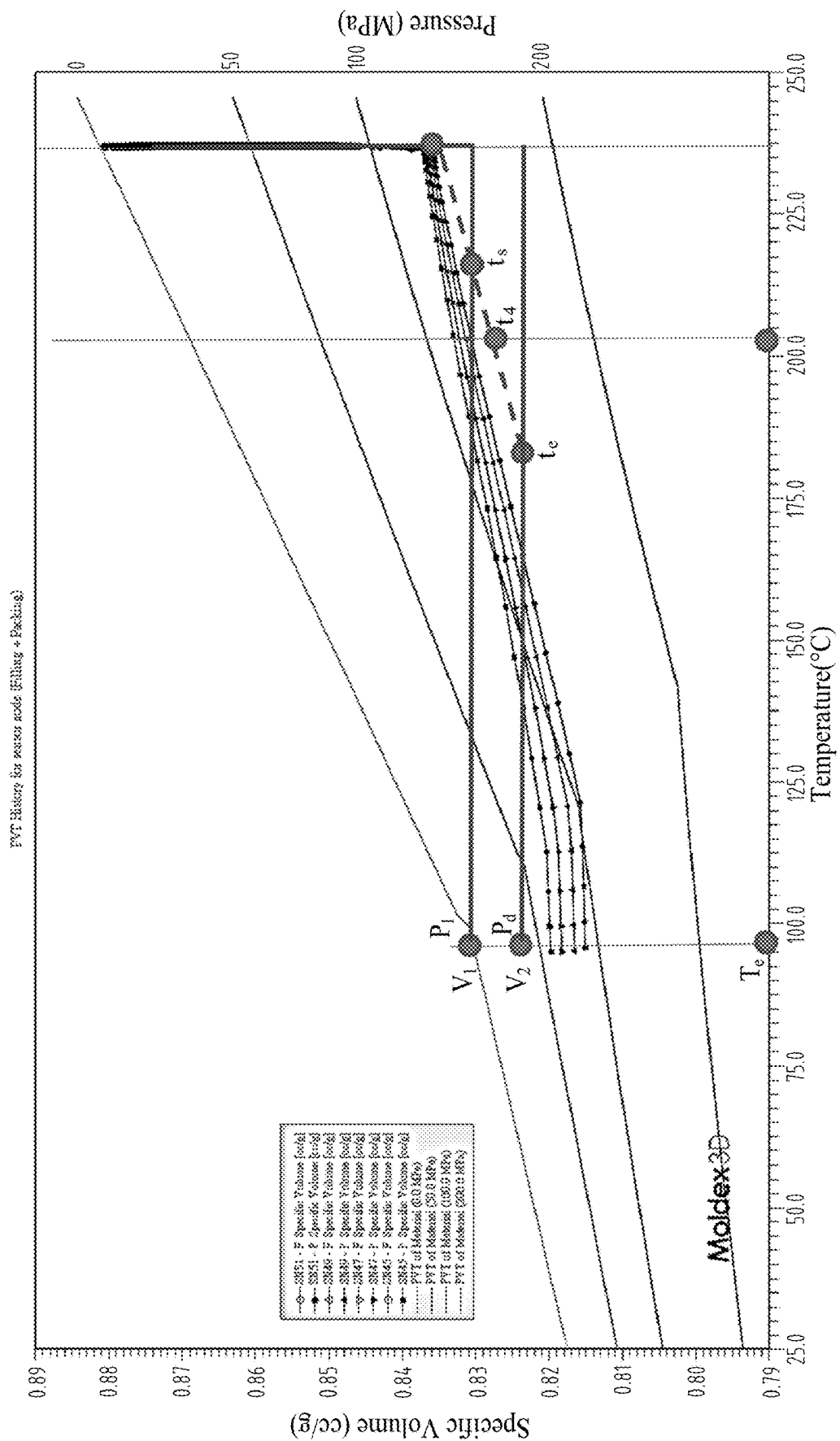
FIG. 13 is a schematic plot showing the setting of the control node (Node-4) in FIG. 12 in accordance with some embodiments of the present disclosure.

FIG. 13 is a schematic plot showing the setting of the control node (Node-4) in FIG. 12 in accordance with some embodiments of the present disclosure. In some embodiments of the present disclosure, the molding material has a first specific volume $V_1$ at a predetermined ejection temperature $T_e$ (e.g., 99.85° C. for the present embodiment) and a normal pressure $P_0$, and a second specific volume $V_2$ at the predetermined ejection temperature and a designated pressure $P_d$; the control node (Node-4) has a packing time $t_4$ between a starting time $t_s$ and an ending time $t_e$; the starting time $t_s$ corresponds to a time at which the molding material is isobarically cooled at the maximum in-mold pressure to reach the first specific volume $V_1$; and the ending time $t_e$ corresponds to a time at which the molding material is isobarically cooled at the maximum in-mold pressure to reach the second specific volume $V_2$. In some embodiments of the present disclosure, the computing apparatus is configured to obtain the packing pressure of the control node (Node-4) based on the packing pressure of the control node (Node-3), e.g., 168.85 MPa*0.9=151.97 MPa.

Figure 14:
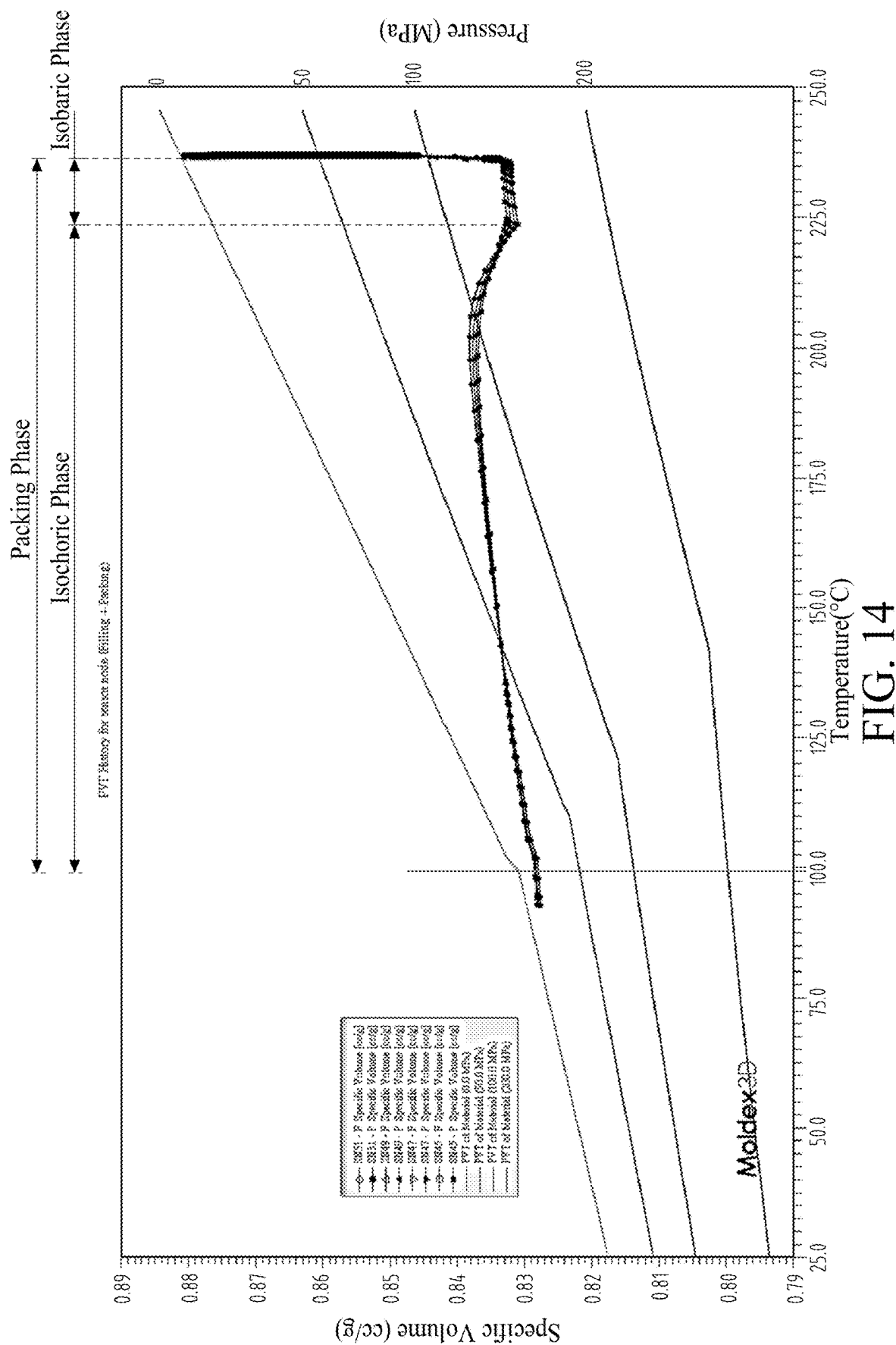
FIG. 14 and FIG. 15 are schematic plots showing a plurality of state waveforms at different sensing sites of the molding material in the simulated domain using the updated packing pressure profile in FIG. 12 in accordance with some embodiments of the present disclosure.
Figure 15:
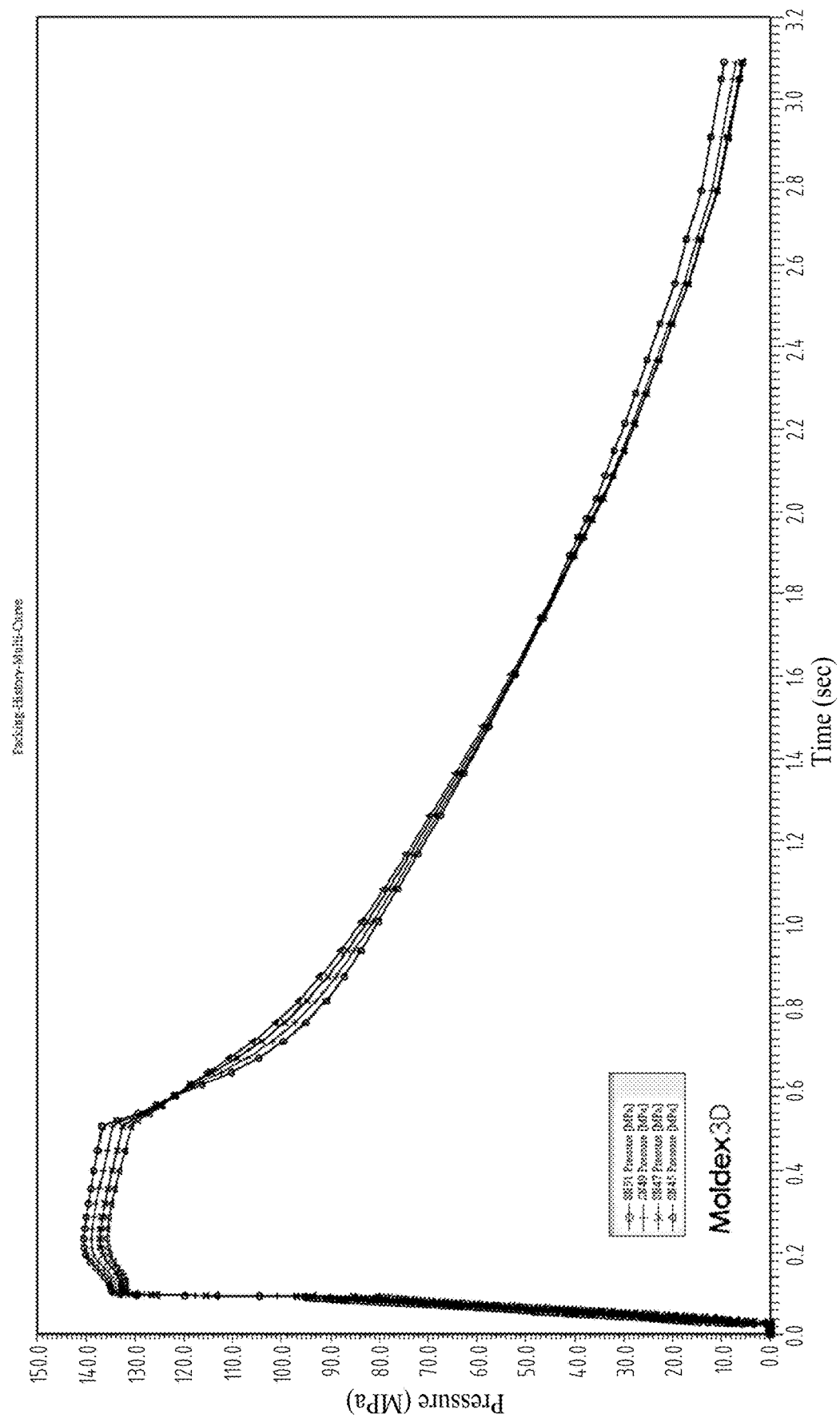

FIG. 14 and FIG. 15 are schematic plots showing a plurality of state waveforms at different sensing sites of the molding material in the simulated domain 70 using the updated packing pressure profile in FIG. 12 in accordance with some embodiments of the present disclosure. Comparing FIG. 9 to FIG. 14, it can be seen that the updated packing pressure profile in FIG. 12 clearly changes the variation of the state waveforms. In some embodiments of the present disclosure, the updated packing pressure profile in FIG. 12 is used to generate an isobaric phase and an isochoric phase following the isobaric phase in FIG. 14. Referring back to FIG. 14, the state waveforms deviate from each other in terms of the in-mold pressure at the predetermined ejection temperature $T_e$ (e.g., 99.85° C. for the present embodiment). In some embodiments of the present disclosure, the state waveform SN45 has the smallest ejection pressure (11.94 MPa), which is still greater than a predetermined ejection pressure Pe (e.g., 10 MPa). In other words, the packing pressure applied to the genuine domain 60 is too high and needs to be reduced to decrease the deviation ($\Delta P/Pe$) of the state waveforms.

Figure 16:
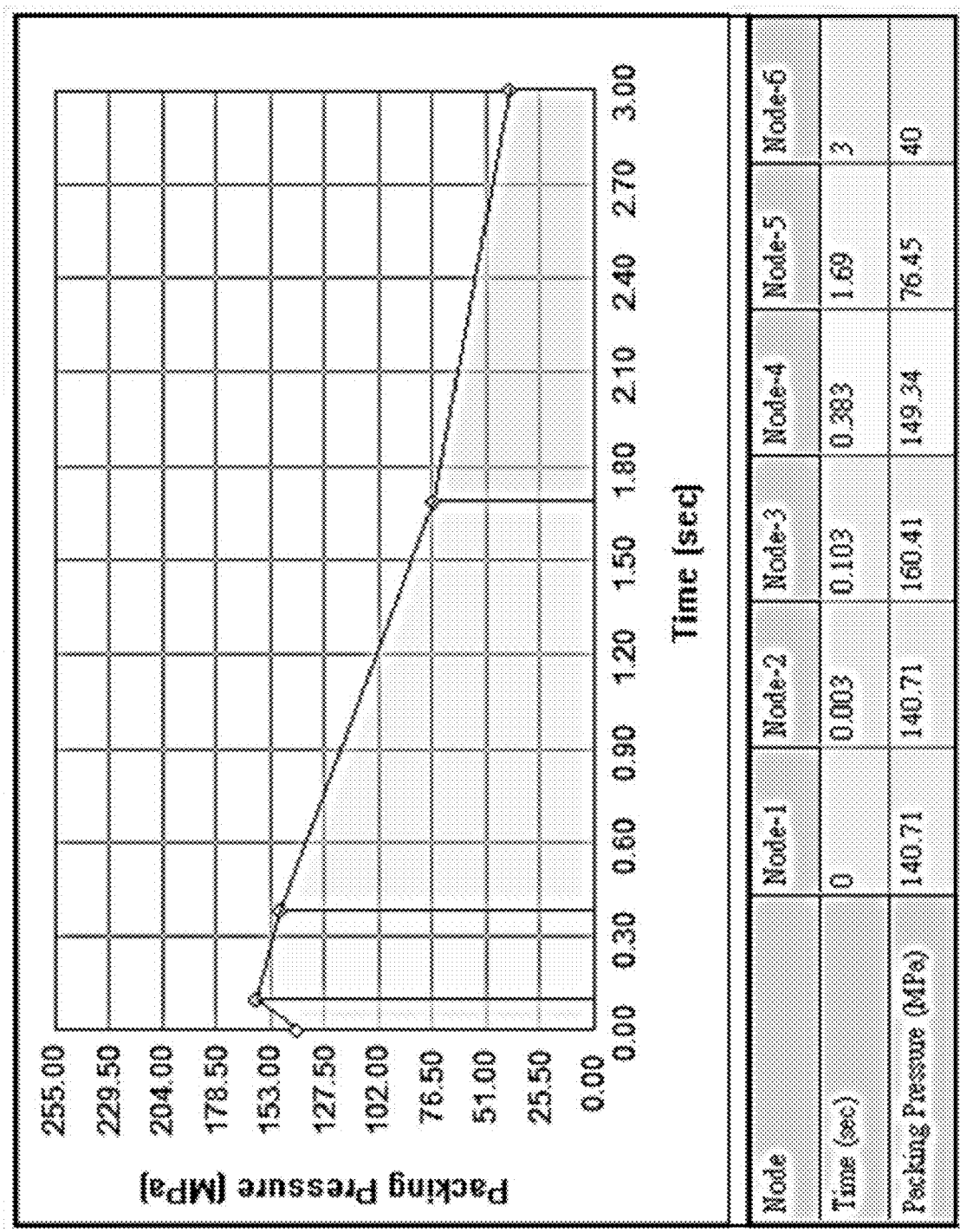
FIG. 16 is a schematic plot showing an updated packing pressure profile in accordance with some embodiments of the present disclosure.

FIG. 16 is a schematic plot showing an updated packing pressure profile in accordance with some embodiments of the present disclosure. In some embodiments of the present disclosure, the computing apparatus is configured to calculate a first pressure deviation between the ejection pressure of one state waveform and an expected ejection pressure (e.g., the predetermined ejection pressure, 10 MPa) and a second pressure deviation between the ejection pressure of another state waveform and the expected ejection pressure, and, if the first pressure deviation is greater than the second pressure deviation, to adjust the packing pressure of the control node (Node-3) based on the first pressure deviation. In some embodiments of the present disclosure, the packing pressure of the control node (Node-3) in FIG. 16 is reduced, e.g., by 5% to 160.41 MPa. In some embodiments of the present disclosure, the packing pressure of the control node (Node-4) is also reduced, e.g., by 5% to 149.34 MPa.

Figure 17:
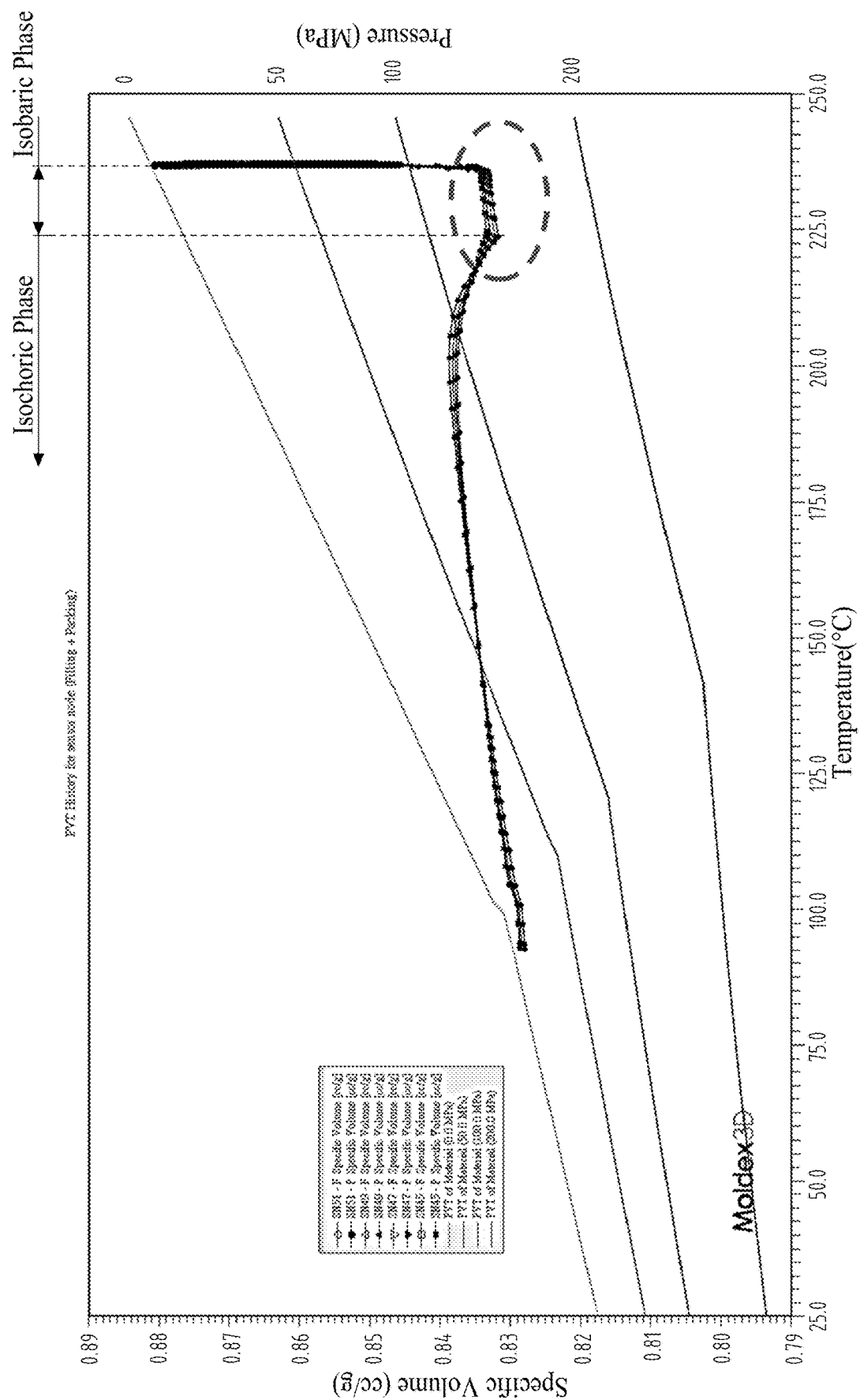
FIG. 17 is a schematic plot showing a plurality of state waveforms at different sensing sites of the molding material in the simulated domain using the updated packing pressure profile in FIG. 16 in accordance with some embodiments of the present disclosure.

FIG. 17 is a schematic plot showing a plurality of state waveforms at different sensing sites of the molding material in the simulated domain 70 using the updated packing pressure profile in FIG. 16 in accordance with some embodiments of the present disclosure. In actual molding, the in-mold pressure in the isobaric phase, indicated by a dashed line, is expected to be substantially constant, i.e., the variation should be negligible. However, as the temperature declines, the in-mold pressure during the isobaric phase decreases. In other words, the packing pressure of the isobaric phase is too low to keep the in-mold pressure substantially constant as the packing phase progresses from the control node (Node-3 with 160.41 MPa) through the control node (Node-4 with 149.34 MPa) to the control node (Node-5 with 76.45 MPa) in FIG. 16.

Figure 18:
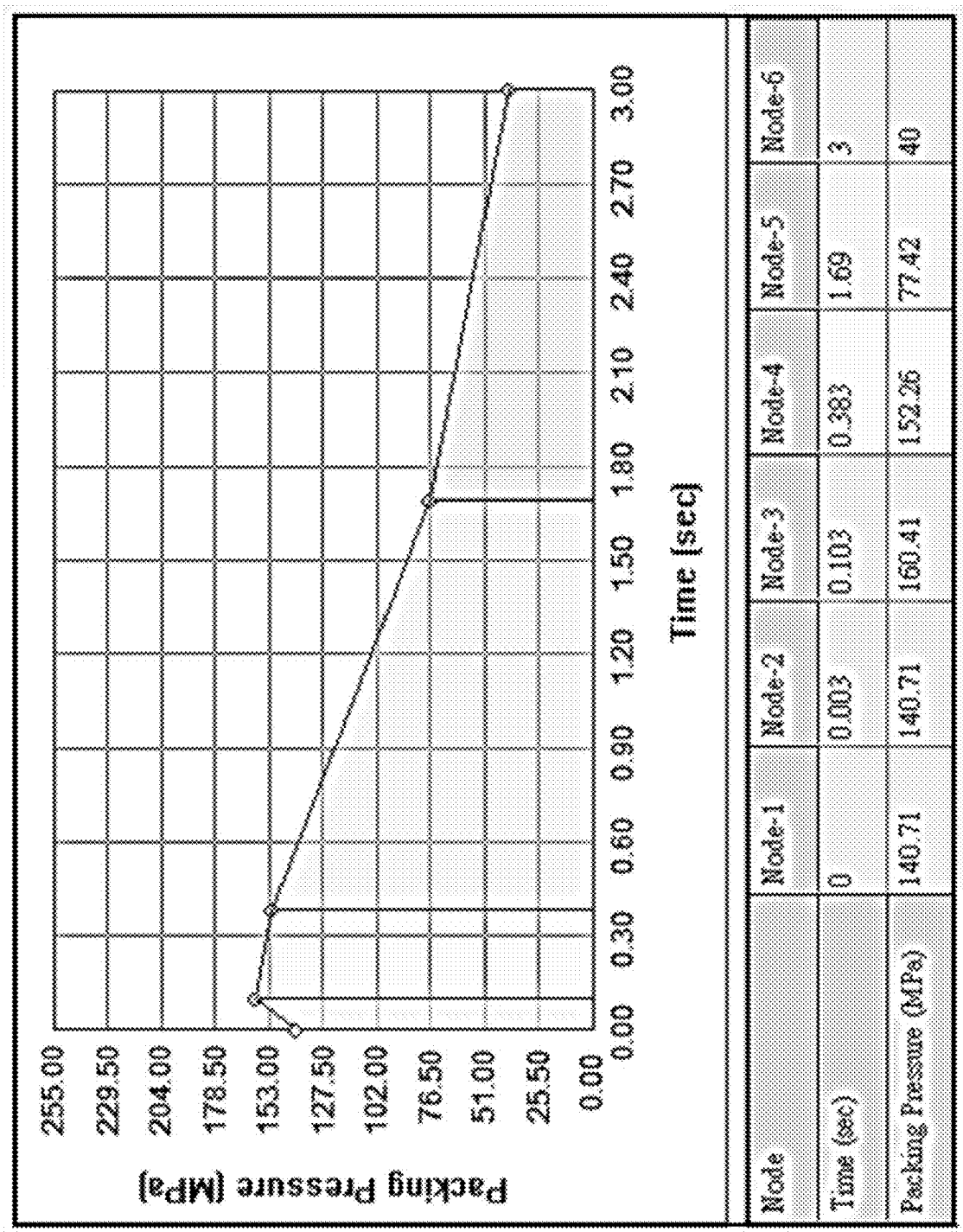
FIG. 18 is a schematic plot showing an updated packing pressure profile in accordance with some embodiments of the present disclosure.

FIG. 18 is a schematic plot showing an updated packing pressure profile in accordance with some embodiments of the present disclosure. In some embodiments of the present disclosure, the packing pressure (149.34 MPa) of the control node (Node-4) in FIG. 16 is increased to an increased packing pressure (152.26 MPa) in FIG. 18 to reduce the pressure difference between the control node (Node-3) and the control node (Node-4) so as to keep the in-mold pressure substantially constant during the isobaric phase. In some embodiments of the present disclosure, the packing pressure of the control node (Node-5) is also increased correspondingly.

Figure 19:
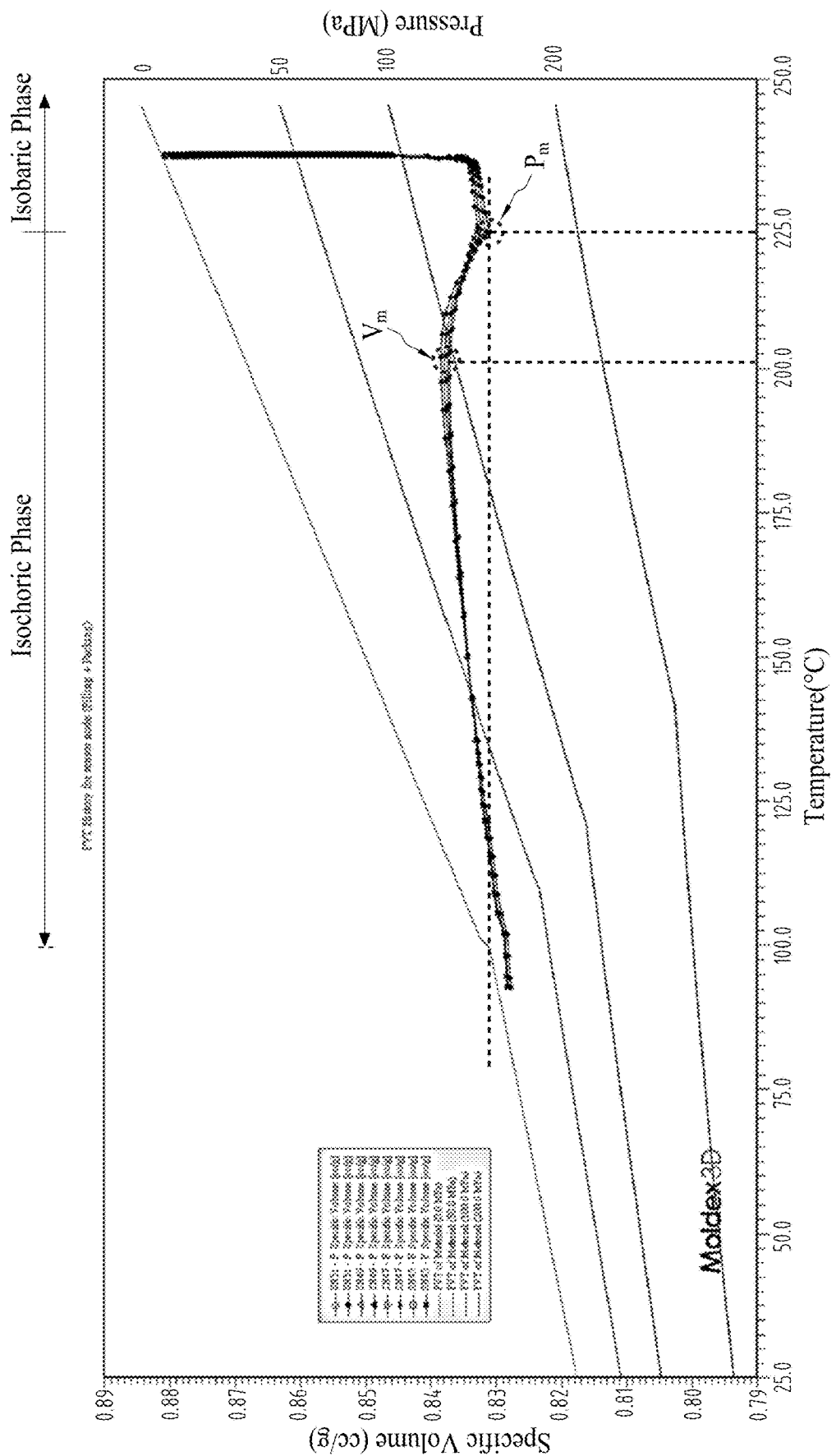
FIG. 19 is a schematic plot showing a plurality of state waveforms at different sensing sites of the molding material in the simulated domain using the updated packing pressure profile in FIG. 18 in accordance with some embodiments of the present disclosure.

FIG. 19 is a schematic plot showing a plurality of state waveforms at different sensing sites of the molding material in the simulated domain 70 using the updated packing pressure profile in FIG. 18 in accordance with some embodiments of the present disclosure. It is expected that, in actual molding, the in-mold specific volume in the isochoric phase is not greater than that in the isobaric phase. To meet this expectation, the packing pressure profile in FIG. 19 needs to be further updated, e.g., by adding a new control node having a packing time at which the state waveform substantially reaches a maximum in-mold specific volume $V_m$ in order to increase the packing pressure so as to reduce the in-mold specific volume during the isochoric phase.

In some embodiments of the present disclosure, the state waveform substantially reaches the maximum in-mold specific volume $V_m$ (0.8383 cc/g) when the packing time is 0.802 second, which is set to be the packing time of the newly added control node; the corresponding in-mold temperature and in-mold pressure are 201.88° C. and 92.88 MPa, respectively. In some embodiments of the present disclosure, a designated pressure is obtained based on the in-mold temperature (e.g., 201.88° C.) at which the state waveform substantially reaches the maximum in-mold specific volume $V_m$ and the in-mold specific volume (0.831 cc/g) at which the state waveform substantially reaches the maximum in-mold pressure $P_m$, using a state model, as shown in the following table:

| Modified Tait Model | variable | value | unit |
|---|---|---|---|
| $V = V_0[1 - C\ln(1 + P/B)] + V_t$ | $b_{1L}$ | 0.832 | cc/g |
|  | $b_{2L}$ | 0.000359 | cc/(g · K) |
| $V_0 = \begin{cases} b_{1s} + b_{2s}\overline{T}, & \text{if } T \leq T_t \\ b_{1L} + b_{2L}\overline{T}, & \text{if } T > T_t \end{cases}$ | $b_{3L}$ | 2.98e+009 | dyne/cm$^2$ |
|  | $b_{4L}$ | 0.00417 | 1/K |
|  | $b_{1S}$ | 0.831 | cc/g |
| $B = \begin{cases} b_{3s}\exp(-b_{4s}\overline{T}), & \text{if } T \leq T_t \\ b_{3L}\exp(-b_{4L}\overline{T}), & \text{if } T > T_t \end{cases}$ | $b_{2S}$ | 0.00018 | cc/(g · K) |
|  | $b_{3S}$ | 3.83e+009 | dyne/cm$^2$ |
|  | $b_{4S}$ | 0.00395 | 1/K |
| $V_1 = \begin{cases} b_7\exp(b_8\overline{T} - b_9P), & \text{if } T \leq T_t \\ 0, & \text{if } T > T_t \end{cases}$ | $b_5$ | 373 | K |
|  | $b_6$ | 2e-008 | cm$^2$ · K/(dyne) |
| $\overline{T} = T - b_5$ | $b_7$ | 0 | cc/g |
|  | $b_8$ | 0 | 1/K |
| $T_1 = b_5 + b_6 P$ | $b_9$ | 0 | cm$^2$/(dyne) |
| $C = 0.0894$ |  |  |  |

Figure 20:
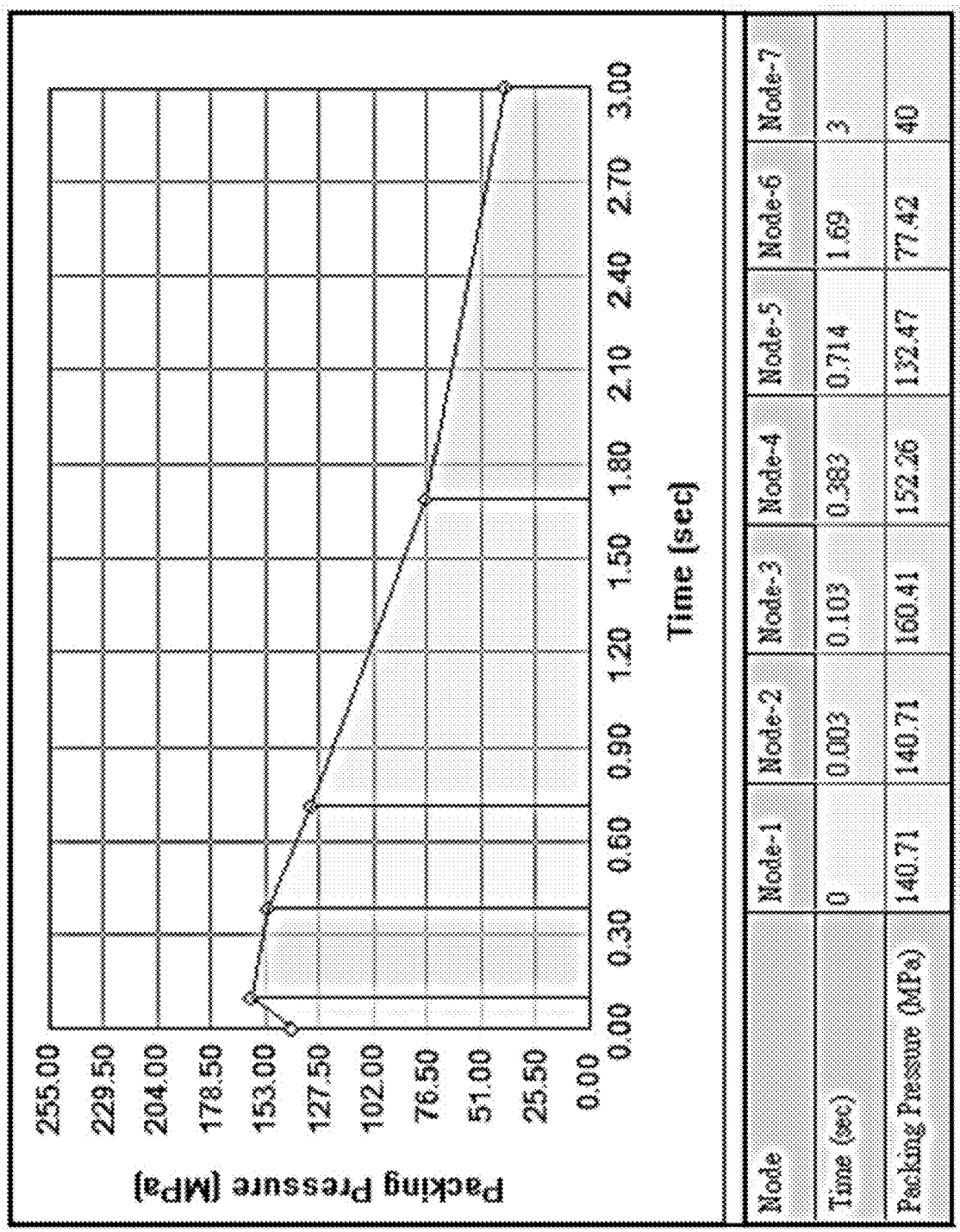
FIG. 20 is a schematic plot showing an updated packing pressure profile in accordance with some embodiments of the present disclosure.

FIG. 20 is a schematic plot showing an updated packing pressure profile in accordance with some embodiments of the present disclosure. In some embodiments of the present disclosure, compared to the packing pressure profile in FIG. 18, the updated packing pressure profile in FIG. 20 has the newly added control node (Node-5) after the control node (Node-4), wherein the control node (Node-5) and the control node (Node-6) in FIG. 18 are renamed to be the control node (Node-6) and the control node (Node-7), respectively, in FIG. 20. In some embodiments of the present disclosure, a plurality of control nodes may be added in the updated packing pressure profile to replace the newly added control node (Node-5), in order to increase the packing pressure so as to reduce the in-mold specific volume during the isochoric phase.

In some embodiments of the present disclosure, the new control node (Node-5) in FIG. 20 has the packing time at which one of the state waveform substantially reaches the maximum in-mold specific volume in FIG. 19, and the computing apparatus is configured to obtain the packing pressure of the new control node (node-5) based on the designated pressure and the maximum in-mold pressure. In some embodiments of the present disclosure, the packing pressure (P5) of the new control node (Node-5) is obtained using a formula (P5=P4*$P_d/P_m$), where $P_d$ is the designated packing pressure (e.g., Pd=121.1 MPa), $P_m$ is the maximum in-mold pressure (e.g., Pm=139.39 MPa), and P4 is the packing pressure of the control node (Node-4).

Figure 21:
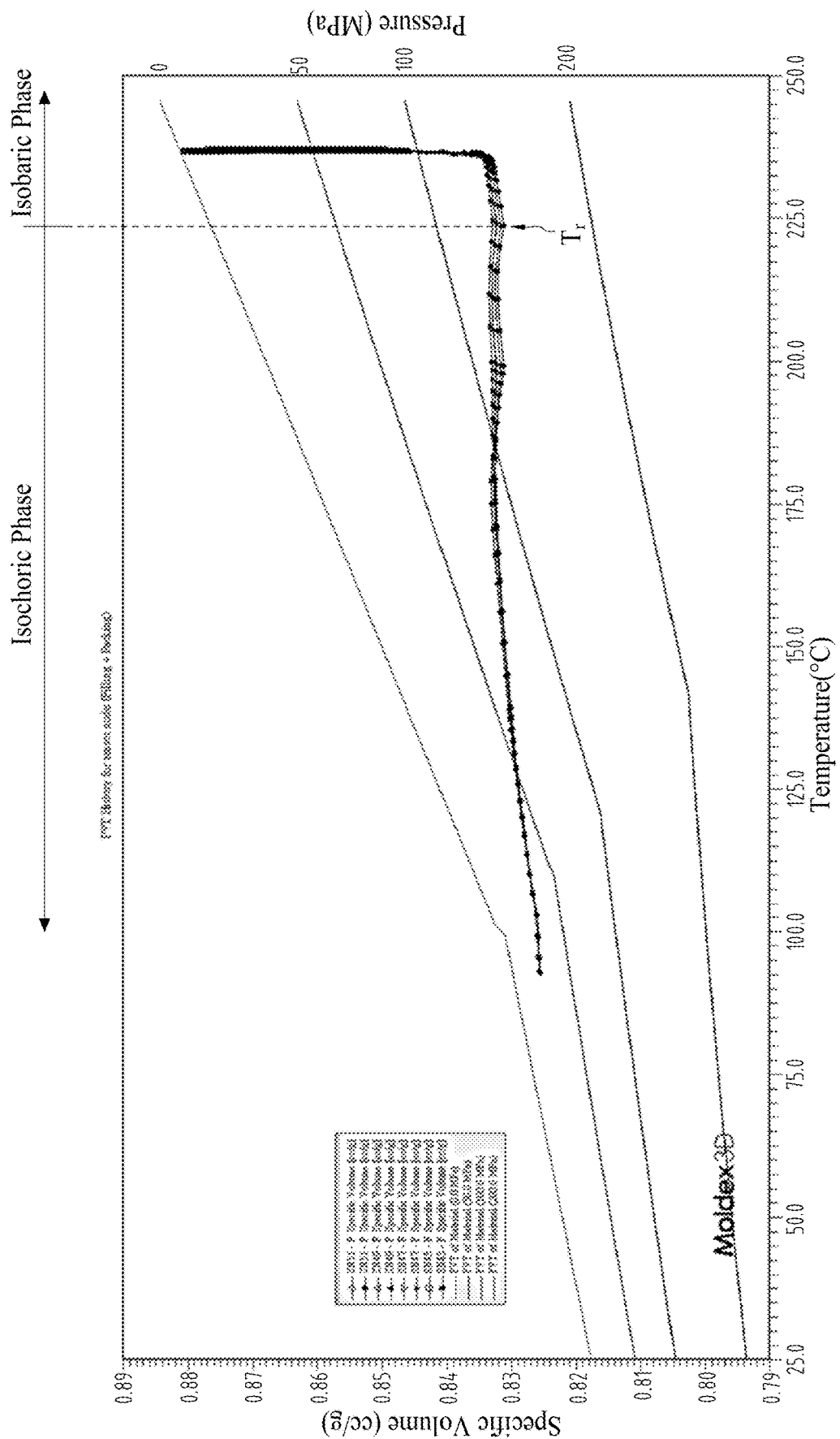
FIG. 21 is a schematic plot showing a plurality of state waveforms at different sensing sites of the molding material in the simulated domain using the updated packing pressure profile in FIG. 20 in accordance with some embodiments of the present disclosure.

FIG. 21 is a schematic plot showing a plurality of state waveforms at different sensing sites of the molding material in the simulated domain 70 using the updated packing pressure profile in FIG. 20 in accordance with some embodiments of the present disclosure. Comparing the state waveform in FIG. 19 to that in FIG. 21, it can be seen that the in-mold specific volume of the state waveform in FIG. 20 clearly decreases, which results in the newly added control node (Node-5) in FIG. 20. In some embodiments of the present disclosure, the state waveform in FIG. 21 includes an isobaric phase and an isochoric phase following the isobaric phase, and the packing time of the control node (Node-3) in FIG. 21 corresponds to the transition ($T_r$) between the isobaric phase and the isochoric phase.

In some embodiments of the present disclosure, in step 35 of the method 30 in FIG. 4, the molding machine is set up based on the updated packing pressure profile in FIG. 20 to perform an actual molding process to prepare the molding product, and the conditions (PVT) of the molding material remain substantially the same as those shown in FIG. 21. In some embodiments of the present disclosure, referring back to FIG. 1 and FIG. 2, the updated packing pressure profile in FIG. 21 is used to set the screw-driving motor 12 of the molding machine 10 to apply the packing pressure to the sprue portion 21 of the metal mold 20 so as to perform an actual molding process to prepare the molding product.

Figure 22:
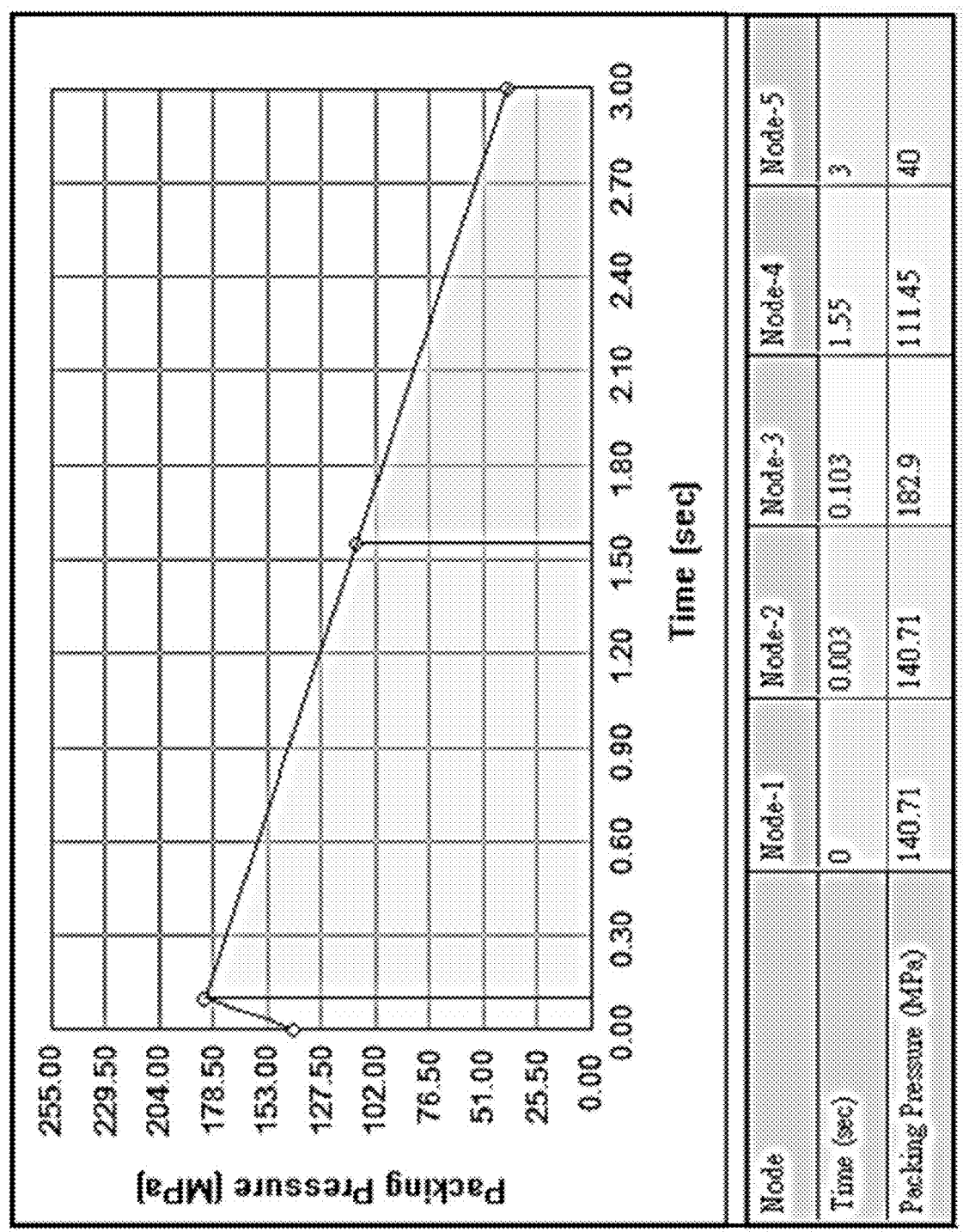
FIG. 22 and FIG. 23 are schematic plots showing a packing pressure profile and an updated packing pressure profile in accordance with some embodiments of the present disclosure.
Figure 23:
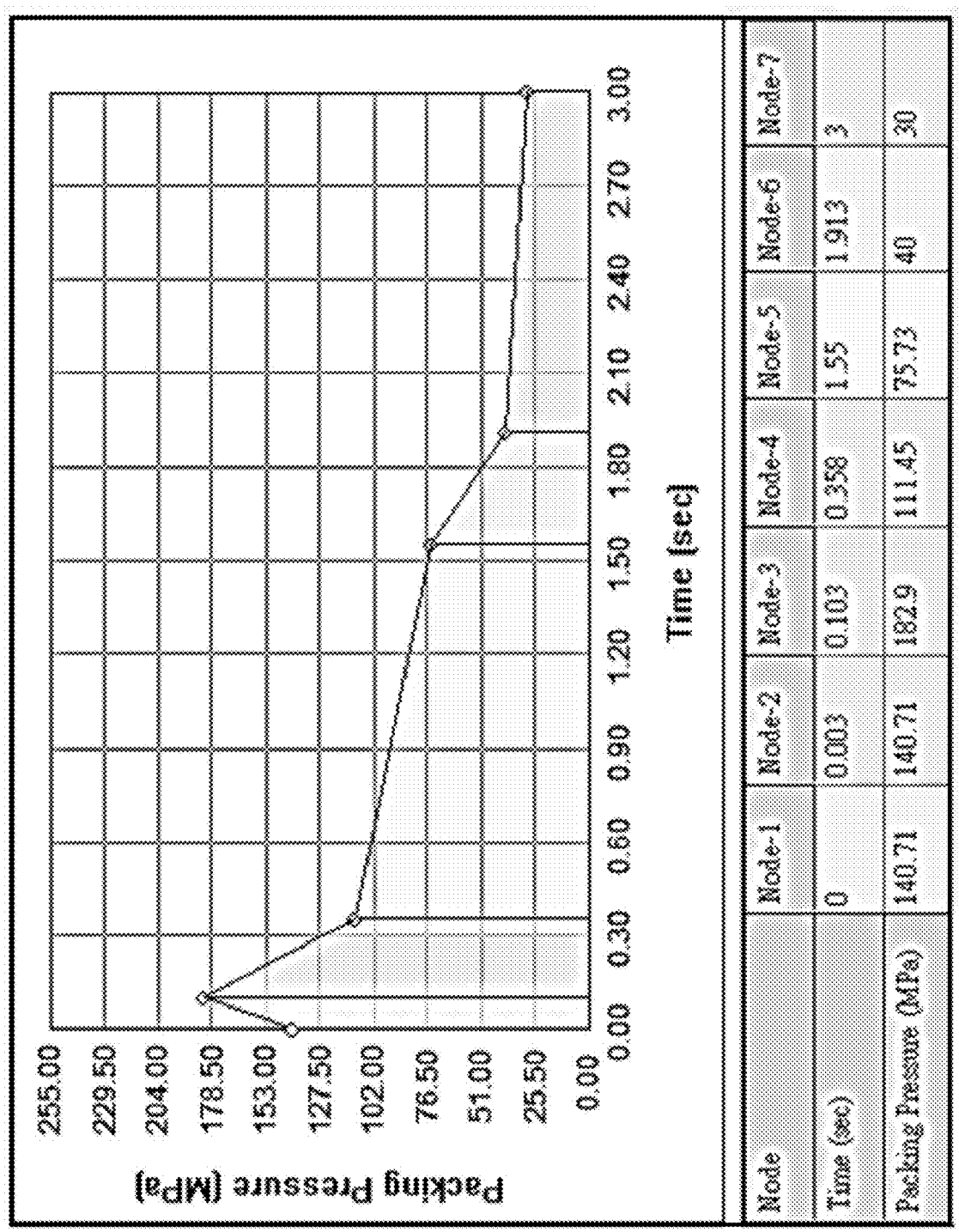

FIG. 22 and FIG. 23 are schematic plots showing a packing pressure profile and an updated packing pressure profile, respectively, in accordance with some embodiments of the present disclosure. In some embodiments of the present disclosure, it is expected that, in actual molding, the molding material is not transferred from the molding machine into the mold cavity after the state waveform substantially reaches the maximum in-mold pressure, so as to prevent the molding material from flowing out of the mold cavity to the outside through the interface of the fixed-side metal mold 20A and the movable-side metal mold 20B. In some embodiments of the present disclosure, the computing apparatus is configured to add at least one control node in the updated packing pressure profile if the molding material is transferred from the molding machine into the mold cavity after the state waveform substantially reaches the maximum in-mold pressure.

In some embodiments of the present disclosure, solving the governing equations (1)-(4) obtains the flow velocity of the molding material. It can then be seen whether the molding material is transferred from the molding machine into the mold cavity after the first state waveform substantially reaches the maximum in-mold pressure.

Referring to FIG. 22, assuming the packing pressure profile in FIG. 22 results in transferring of the molding material from the molding machine into the mold cavity at packing times (0.358 second and 1.913 seconds) after the state waveform substantially reaches the maximum in-mold pressure, the computing apparatus is configured to add two control nodes (Node-5 and Node-6 at 0.358 second and 1.913 seconds, respectively) in the updated packing pressure profile in FIG. 23; in addition, the control node (Node-5) in FIG. 22 is renamed as the control node (Node-7) with a reduced packing pressure in FIG. 23.

Figure 24:
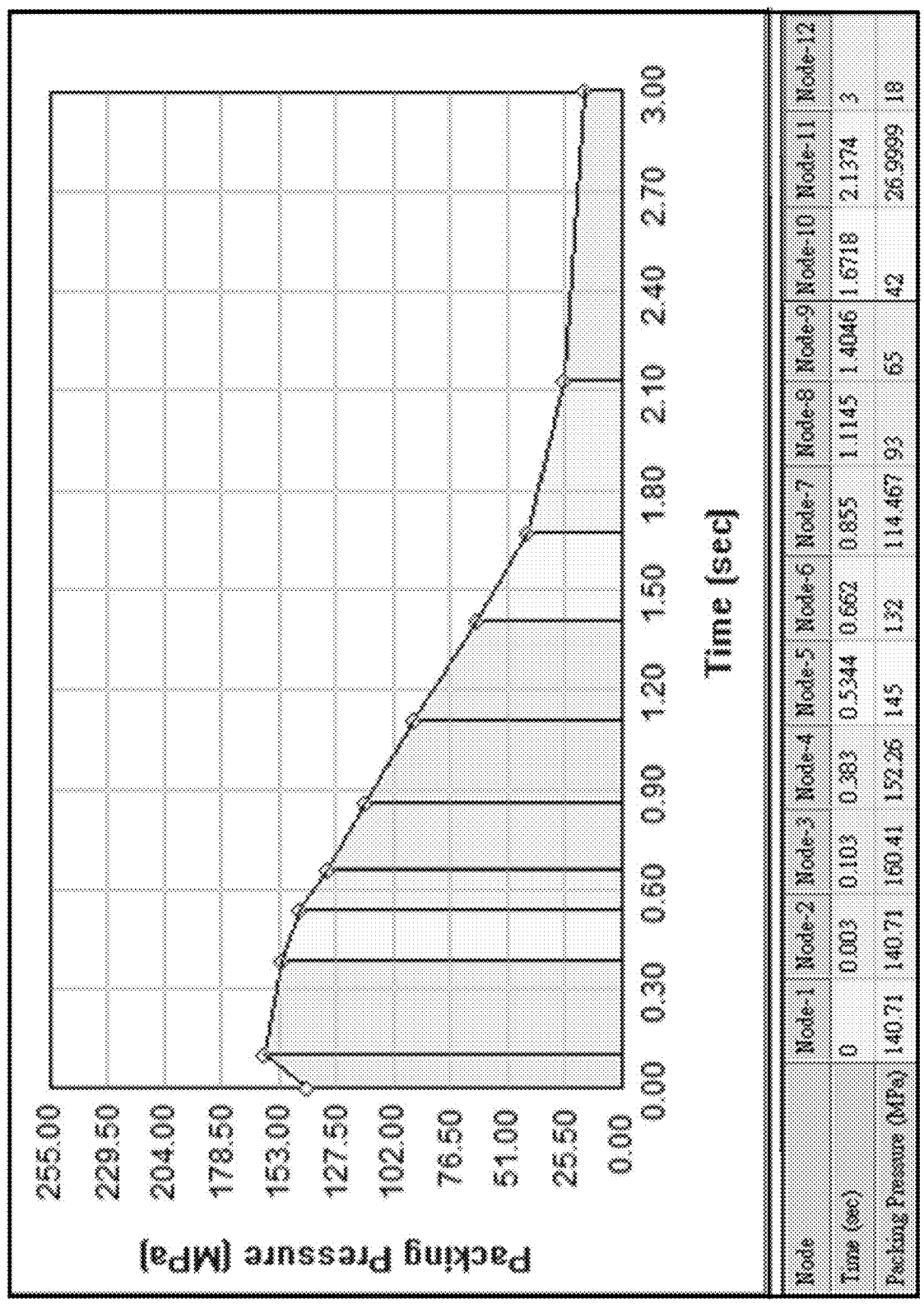
FIG. 24 is a schematic plot showing a packing pressure profile in accordance with some embodiments of the present disclosure.
Figure 25:
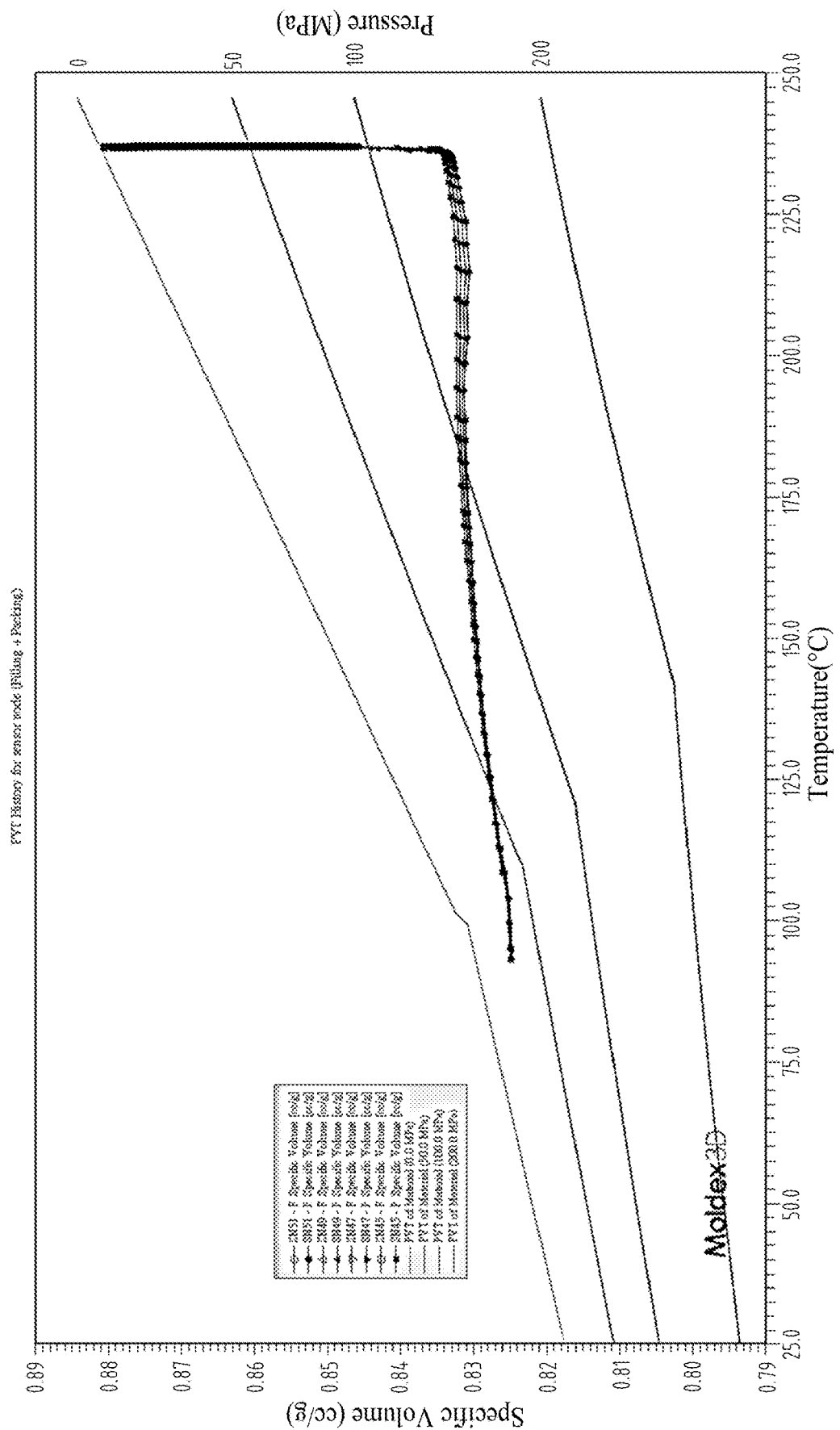
FIG. 25 is a schematic plot showing a plurality of state waveforms at different sensing sites of the molding material in the simulated domain using the updated packing pressure profile in FIG. 24 in accordance with some embodiments of the present disclosure.

FIG. 24 is a schematic plot showing a packing pressure profile in accordance with some embodiments of the present disclosure, and FIG. 25 is a schematic plot showing a plurality of state waveforms at different sensing sites of the molding material in the simulated domain 70 using the updated packing pressure profile in FIG. 24 in accordance with some embodiments of the present disclosure. The ejection pressure (specific volume) at the ejection temperature $T_e$ (e.g., 99.85° C. for the present embodiment) in FIG. 23 can be obtained by either the virtual molding or actual measurement (e.g., about 26.96 MPa and 0.8248 cc/g, respectively).

Figure 26:
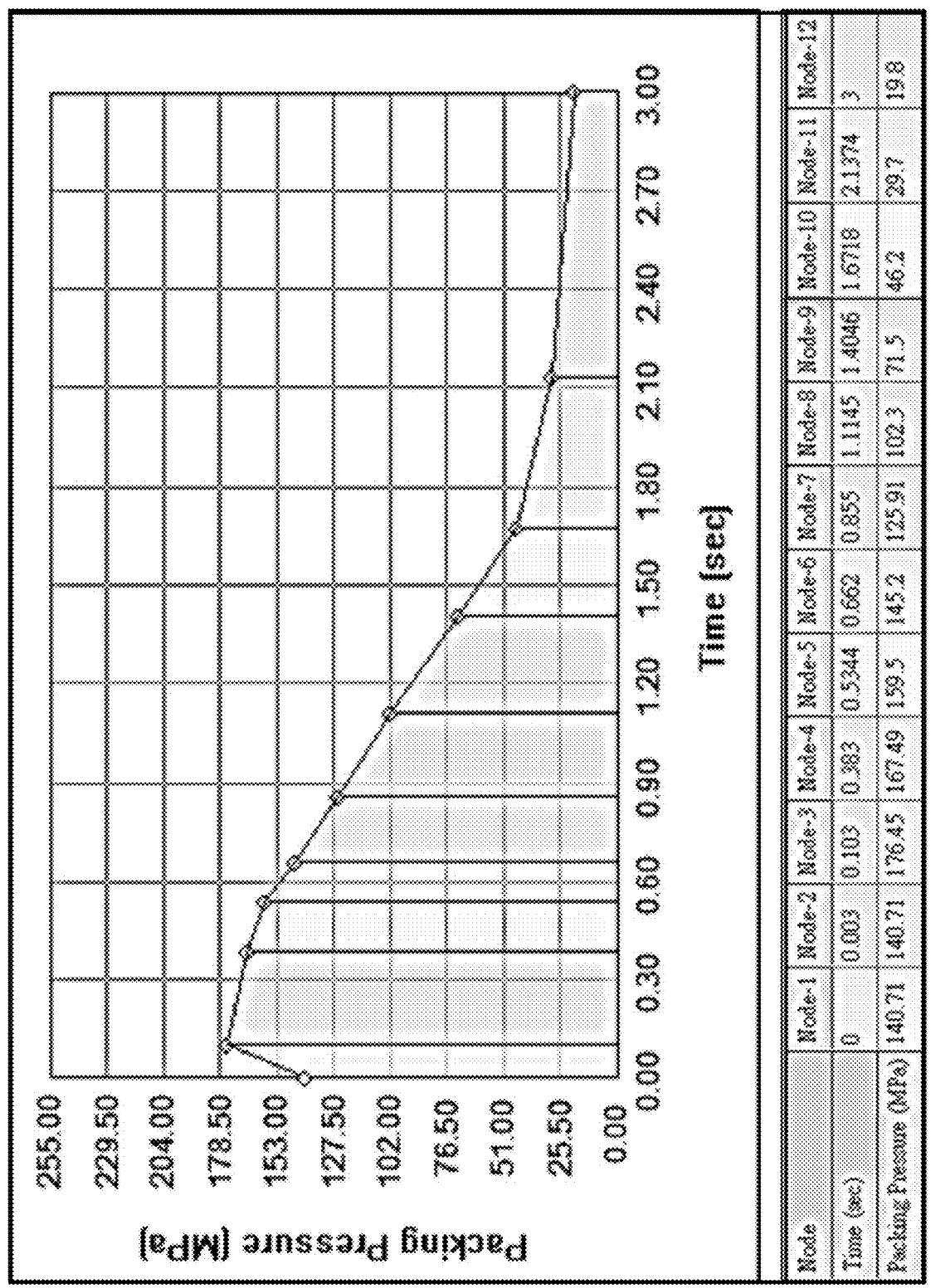
FIG. 26 is a schematic plot showing a packing pressure profile in accordance with some embodiments of the present disclosure.
Figure 27:
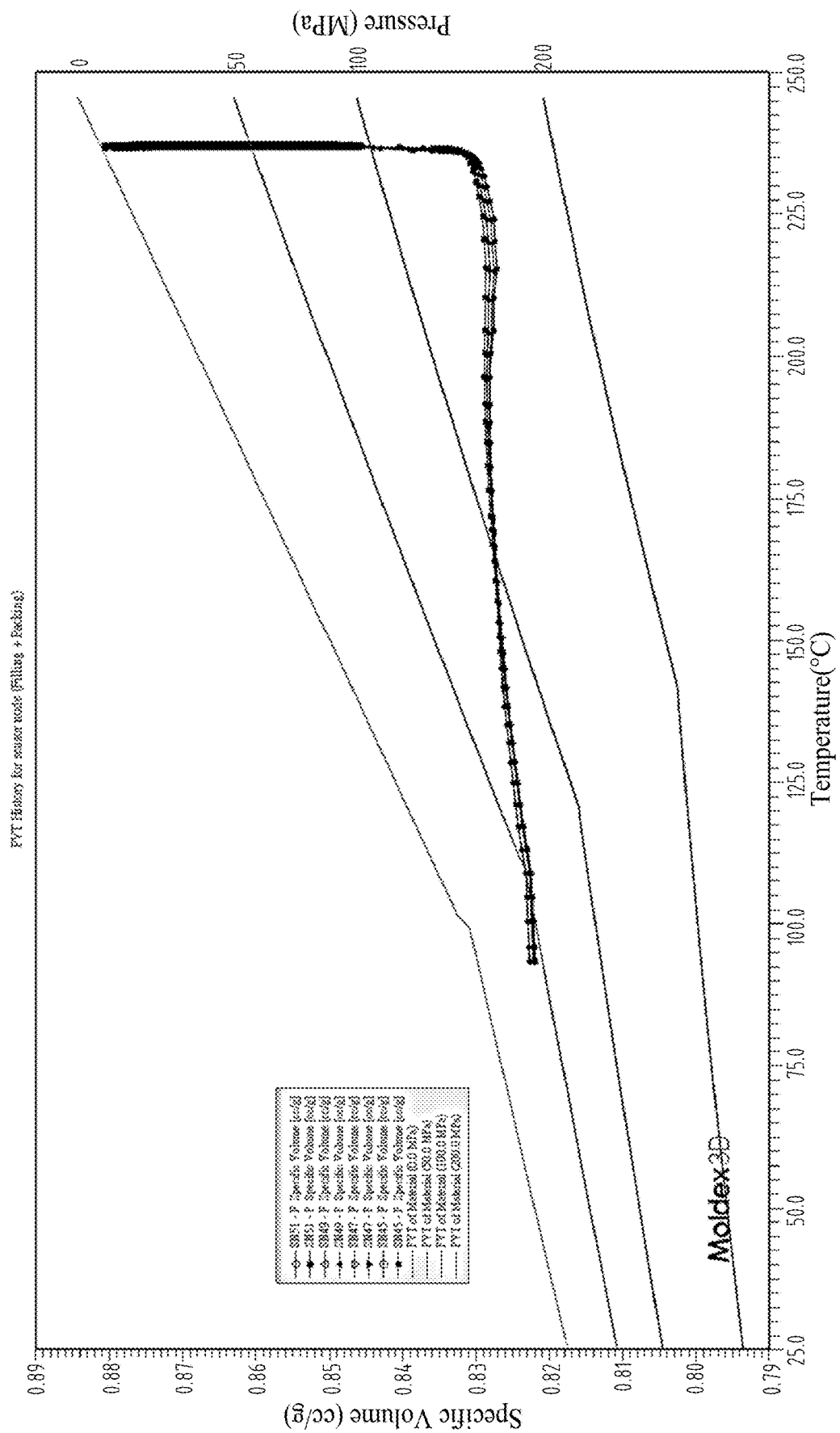
FIG. 27 is a schematic plot showing a plurality of state waveforms at different sensing sites of the molding material in the simulated domain using the updated packing pressure profile in FIG. 26 in accordance with some embodiments of the present disclosure.

FIG. 26 is a schematic plot showing a packing pressure profile in accordance with some embodiments of the present disclosure, and FIG. 27 is a schematic plot showing a plurality of state waveforms at different sensing sites of the molding material in the simulated domain 70 using the updated packing pressure profile in FIG. 26 in accordance with some embodiments of the present disclosure. In some embodiments of the present disclosure, the computing apparatus is configured to change the packing pressure profile in FIG. 24 by multiplying the packing pressures by a constant value so as to obtain the updated packing pressure profile in FIG. 26 for changing an ejection pressure of the molding product. In some embodiments of the present disclosure, the computing apparatus multiplies the packing pressures of the control nodes (except the Node-1) with a constant value (e.g., 1.1) to obtain the updated packing pressure profile in FIG. 26. Comparing FIG. 25 to FIG. 27, it is clear that the ejection pressure and specific volume at the ejection temperature $T_e$ (e.g., 99.85° C. for the present embodiment) is changed (e.g., 42.6 MPa and 0.8222 cc/g).

Figure 28:
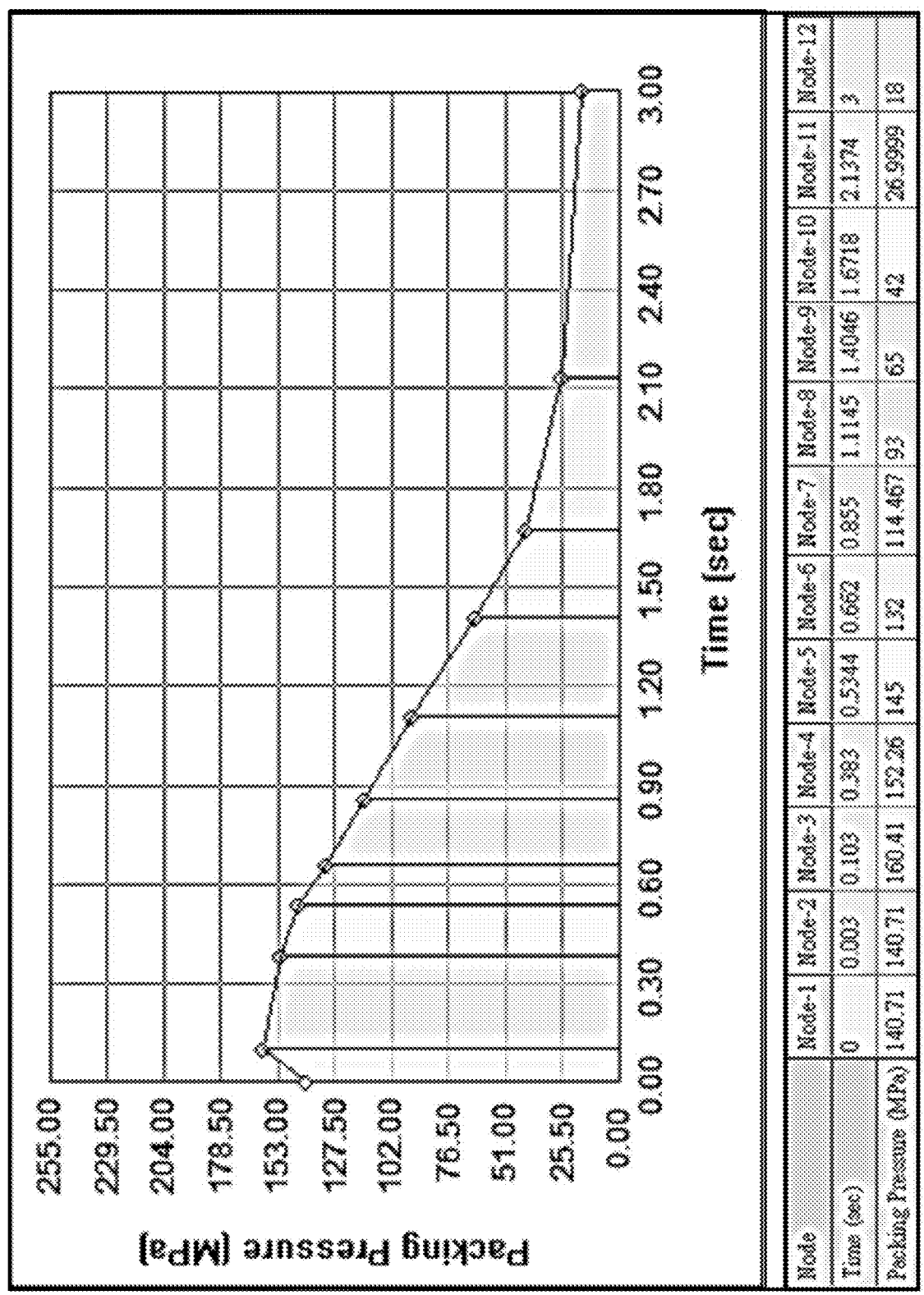
FIG. 28 is a schematic plot showing a packing pressure profile in accordance with some embodiments of the present disclosure.
Figure 29:
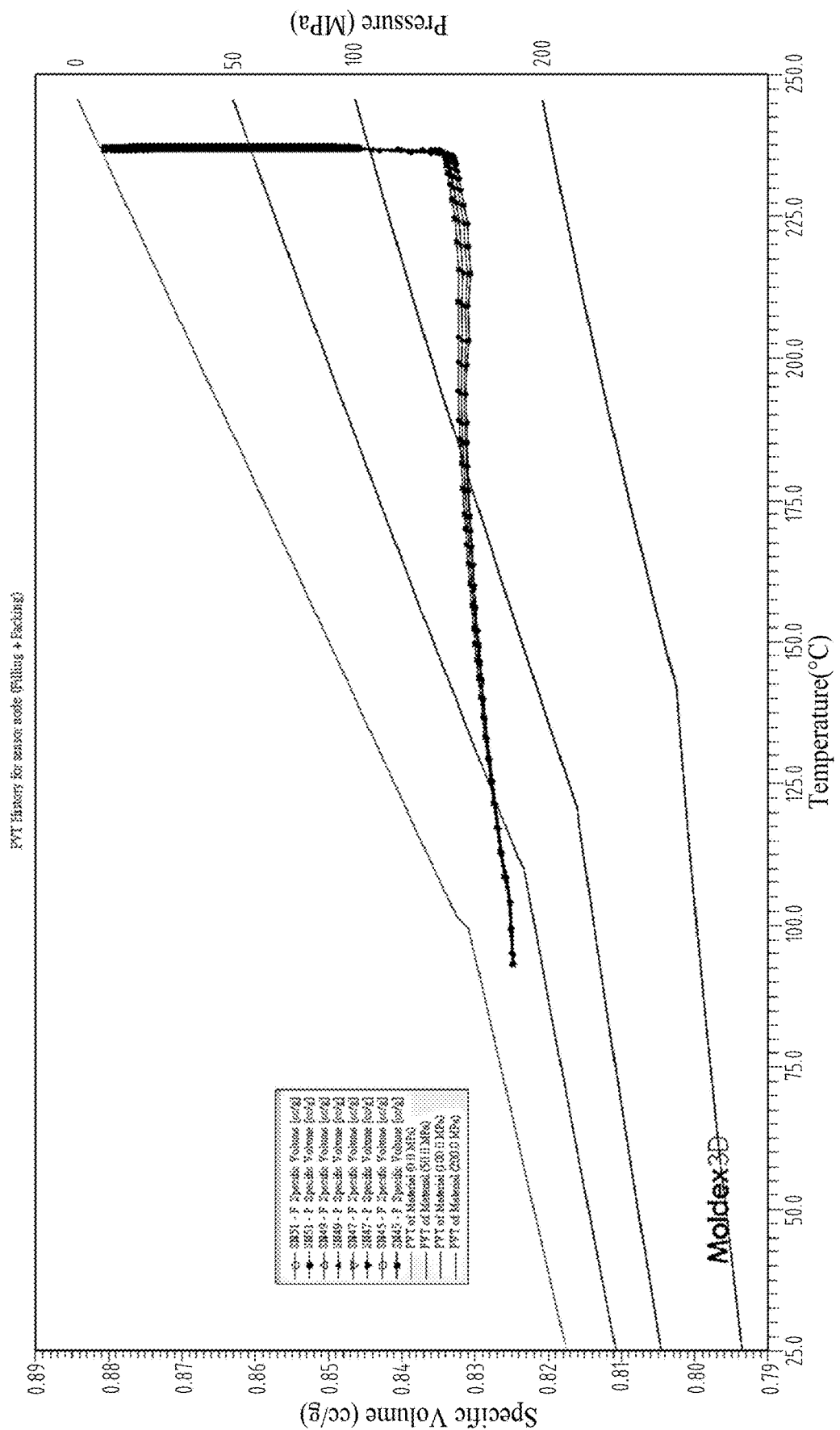
FIG. 29 is a schematic plot showing a plurality of state waveforms at different sensing sites of the molding material in the simulated domain using the updated packing pressure profile in FIG. 28 in accordance with some embodiments of the present disclosure.

FIG. 28 is a schematic plot showing a packing pressure profile in accordance with some embodiments of the present disclosure, and FIG. 29 is a schematic plot showing a plurality of state waveforms at different sensing sites of the molding material in the simulated domain 70 using the updated packing pressure profile in FIG. 28 in accordance with some embodiments of the present disclosure. The transition pressure from the filling phase to the packing phase in FIG. 28 is set (e.g., 98.89 MPa), and the corresponding initial in-mold pressure of the packing phase in FIG. 29 can be obtained accordingly (e.g., 141.1 MPa).

Figure 30:
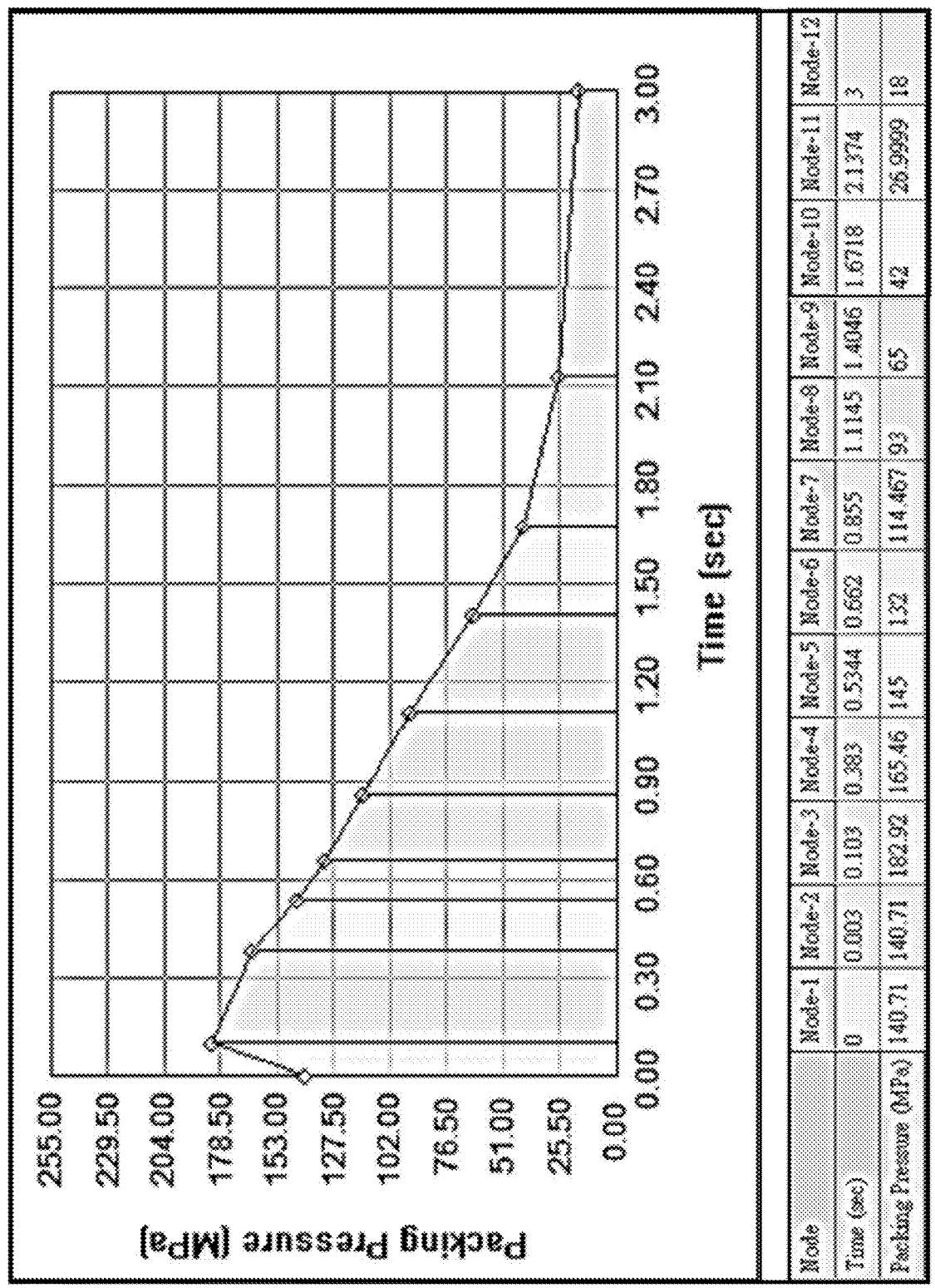
FIG. 30 is a schematic plot showing a packing pressure profile in accordance with some embodiments of the present disclosure.
Figure 31:
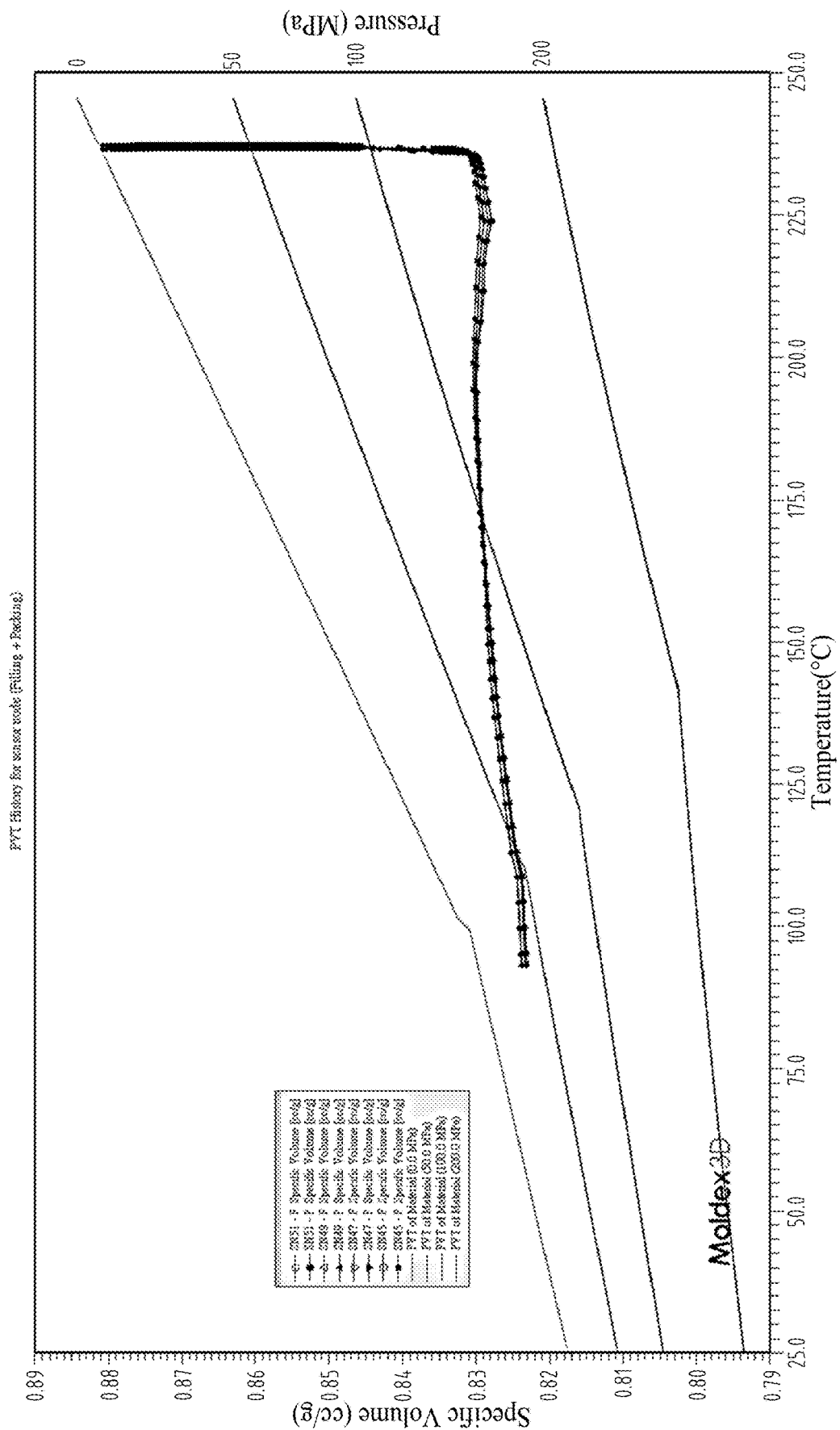
FIG. 31 is a schematic plot showing a plurality of state waveforms at different sensing sites of the molding material in the simulated domain using the updated packing pressure profile in FIG. 30 in accordance with some embodiments of the present disclosure.

FIG. 30 is a schematic plot showing a packing pressure profile in accordance with some embodiments of the present disclosure, and FIG. 31 is a schematic plot showing a plurality of state waveforms at different sensing sites of the molding material in the simulated domain 70 using the updated packing pressure profile in FIG. 30 in accordance with some embodiments of the present disclosure. In some embodiments of the present disclosure, the computing apparatus is configured to change the packing pressure profile in FIG. 28 by multiplying the packing pressures by a constant value so as to obtain the updated packing pressure profile in FIG. 30 for changing the packing pressure of the packing phase. In some embodiments of the present disclosure, the computing apparatus multiplies the packing pressures of the control nodes (Node-3 and Node-4) by a constant value to obtain the updated packing pressure profile in FIG. 30. Comparing FIG. 29 to FIG. 31, it is clear that the state waveforms are changed, e.g., the initial in-mold pressure of the isobaric phase is increased to 154.5 MPa.

Figure 32:
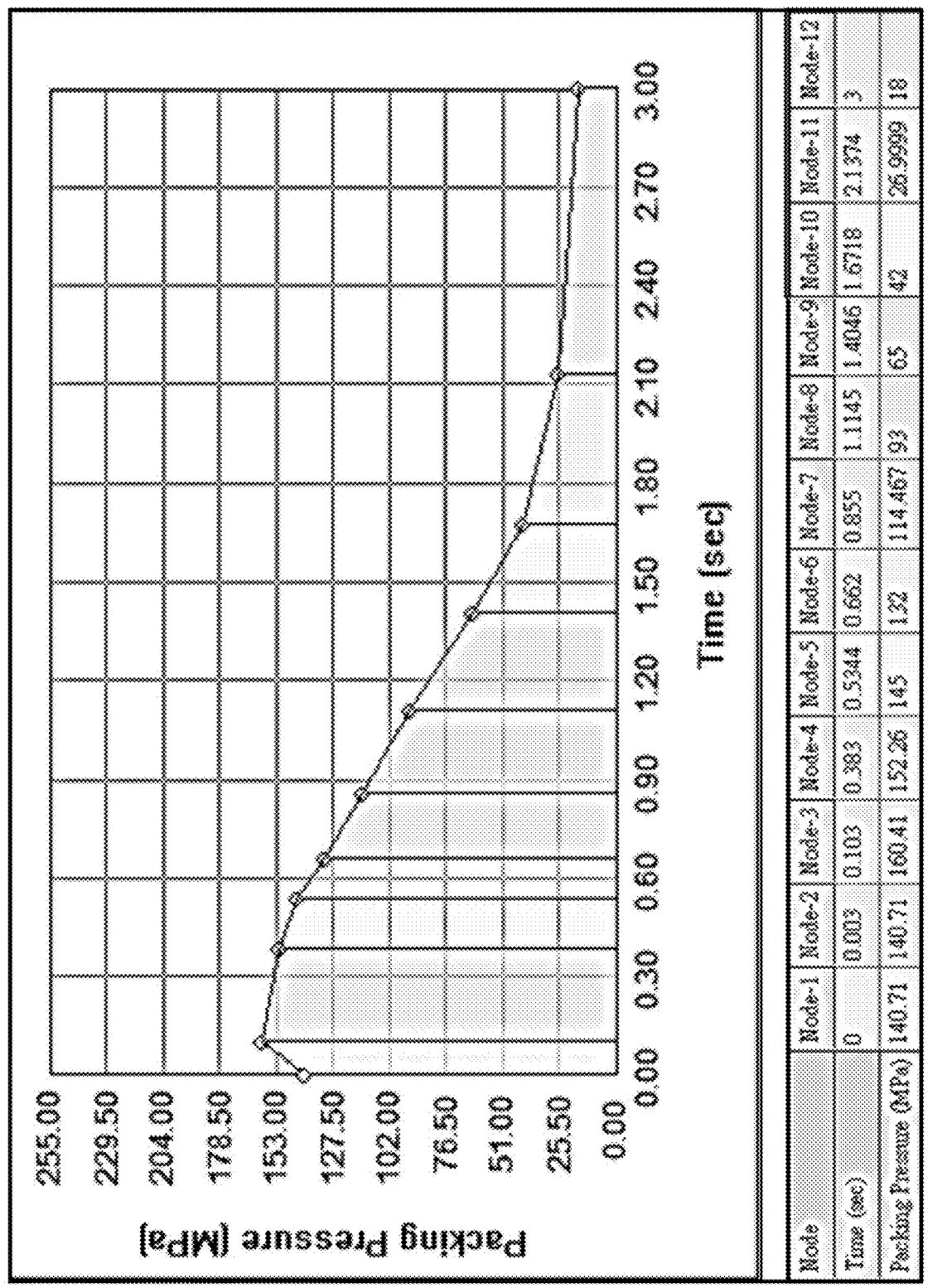
FIG. 32 is a schematic plot showing a packing pressure profile in accordance with some embodiments of the present disclosure.
Figure 33:
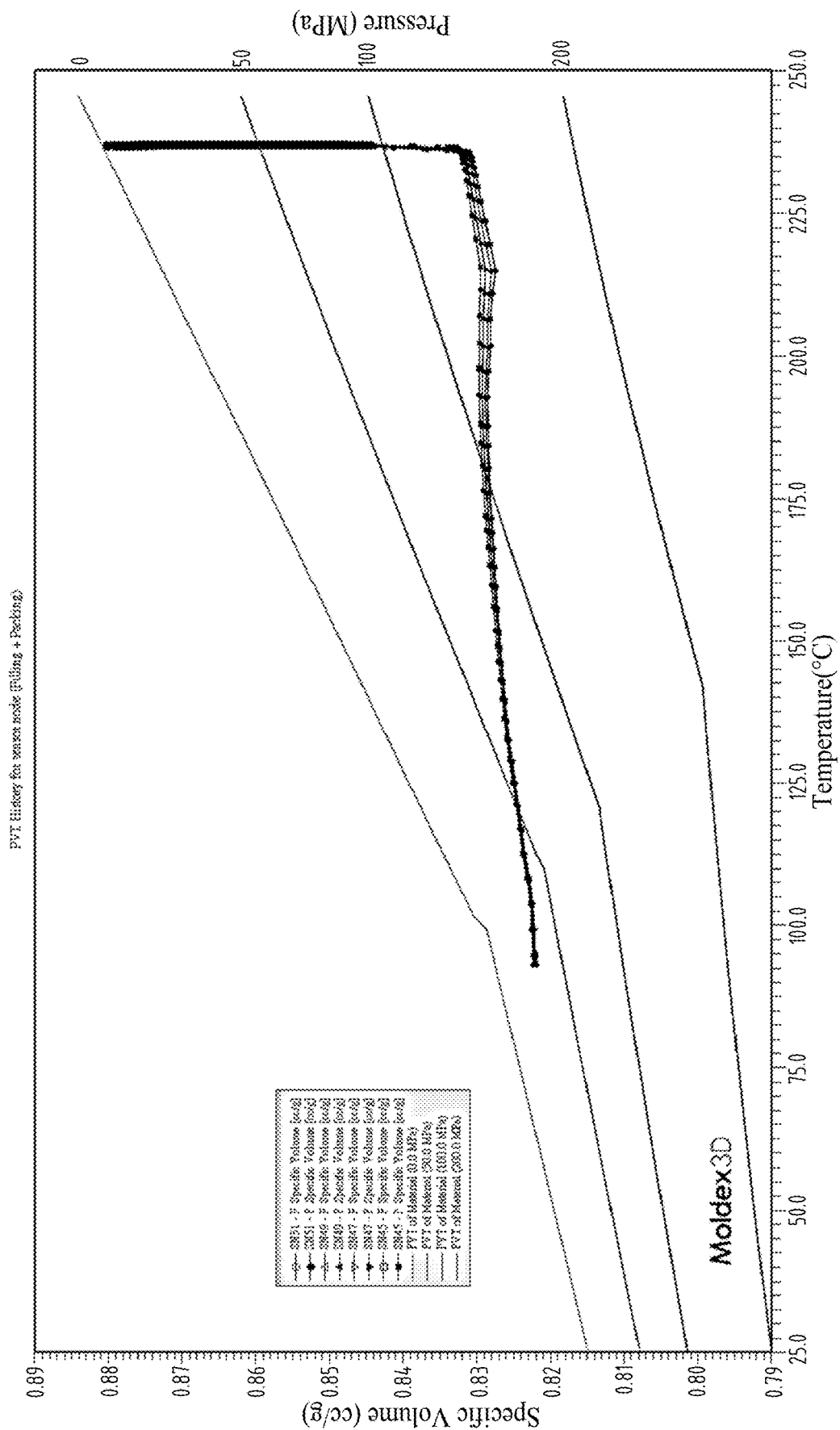
FIG. 33 is a schematic plot showing a plurality of state waveforms at different sensing sites of the molding material in the simulated domain using the updated packing pressure profile in FIG. 32 in accordance with some embodiments of the present disclosure.

FIG. 32 is a schematic plot showing a packing pressure profile in accordance with some embodiments of the present disclosure, and FIG. 33 is a schematic plot showing a plurality of state waveforms at different sensing sites of the molding material in the simulated domain 70 using the updated packing pressure profile in FIG. 32 in accordance with some embodiments of the present disclosure. The starting time of the packing phase in FIG. 32 is set (e.g., 0.383 second), and the corresponding duration of the packing phase in FIG. 33 can be obtained accordingly (e.g., about 0.28 second).

Figure 34:
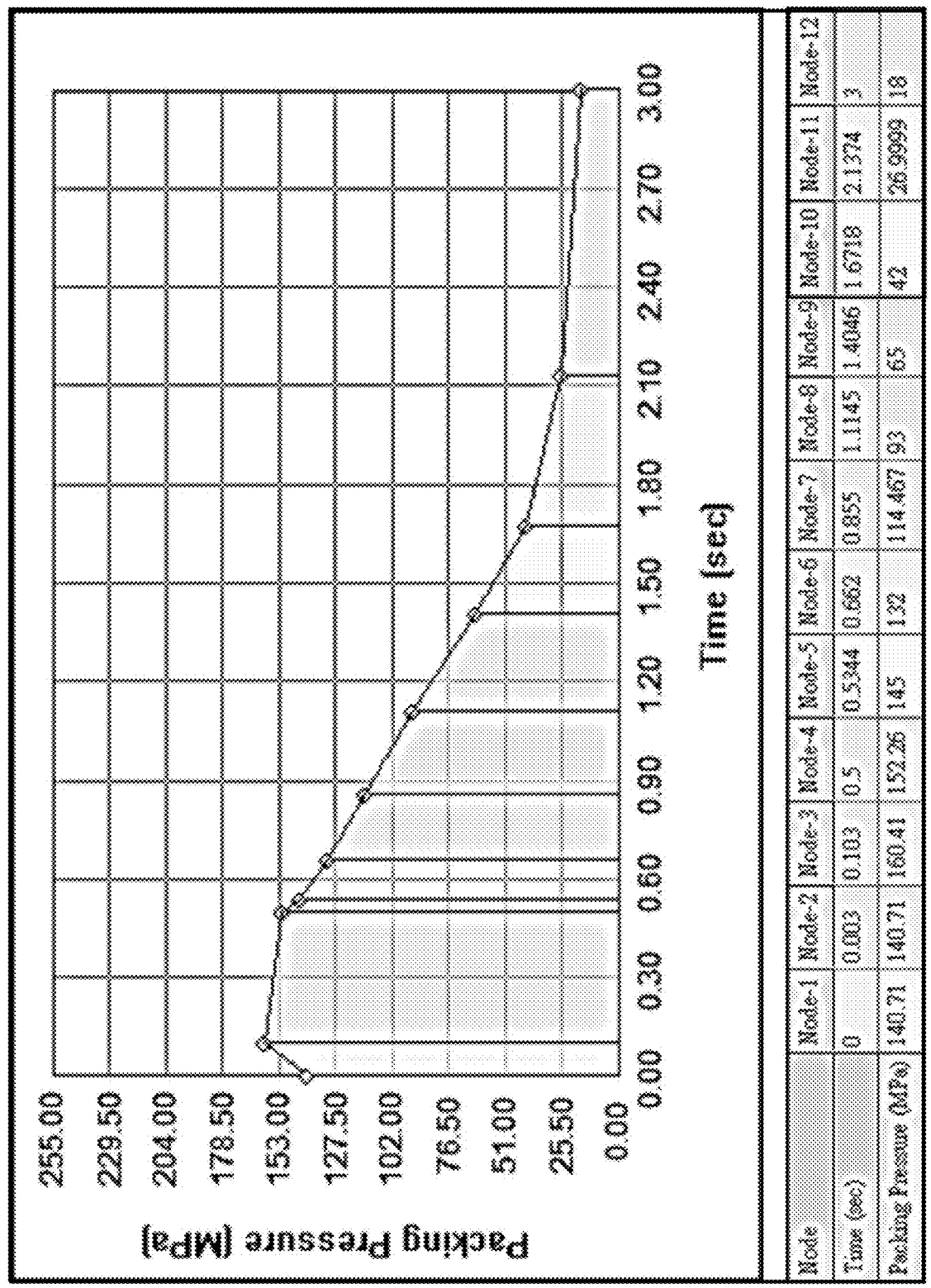
FIG. 34 is a schematic plot showing an updated packing pressure profile in accordance with some embodiments of the present disclosure.
Figure 35:
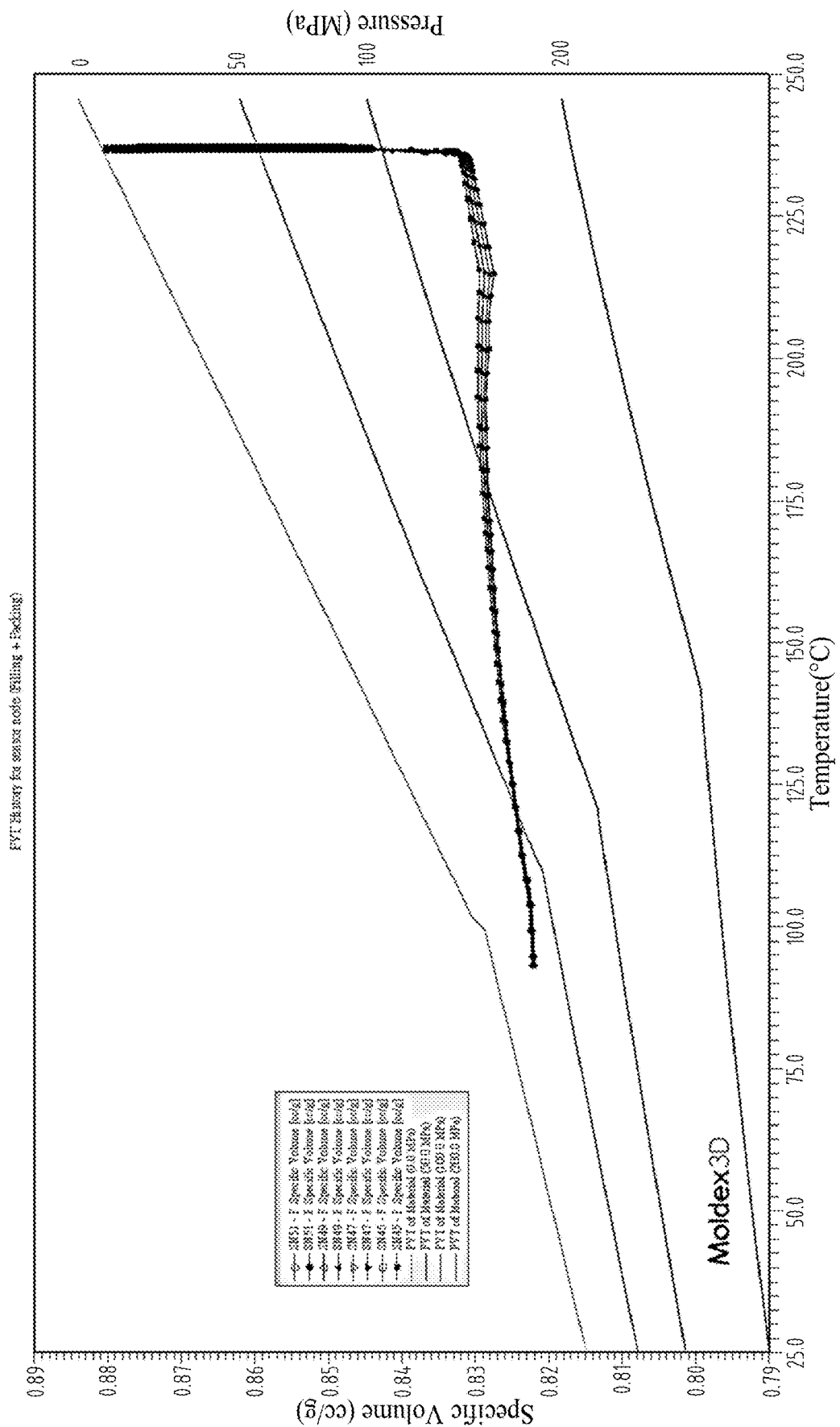
FIG. 35 is a schematic plot showing a plurality of state waveforms at different sensing sites of the molding material in the simulated domain using the updated packing pressure profile in FIG. 34 in accordance with some embodiments of the present disclosure.

FIG. 34 is a schematic plot showing an updated packing pressure profile in accordance with some embodiments of the present disclosure, and FIG. 35 is a schematic plot showing a plurality of state waveforms at different sensing sites of the molding material in the simulated domain 70 using the updated packing pressure profile in FIG. 34 in accordance with some embodiments of the present disclosure. In some embodiments of the present disclosure, the computing apparatus is configured to change the packing pressure profile in FIG. 32 by changing the starting time of the control node (Node-4) so as to form the updated packing pressure profile in FIG. 34 for changing the duration of the packing phase in FIG. 35. In some embodiments of the present disclosure, the computing apparatus changes the packing time of the control node (Node-4), e.g., 0.5 second, to obtain the updated packing pressure profile in FIG. 34. Comparing FIG. 33 to FIG. 35, it is clear that the state waveforms are changed; in particular, the duration of the isobaric phase is increased (e.g., about 0.397 second).

Figure 36:
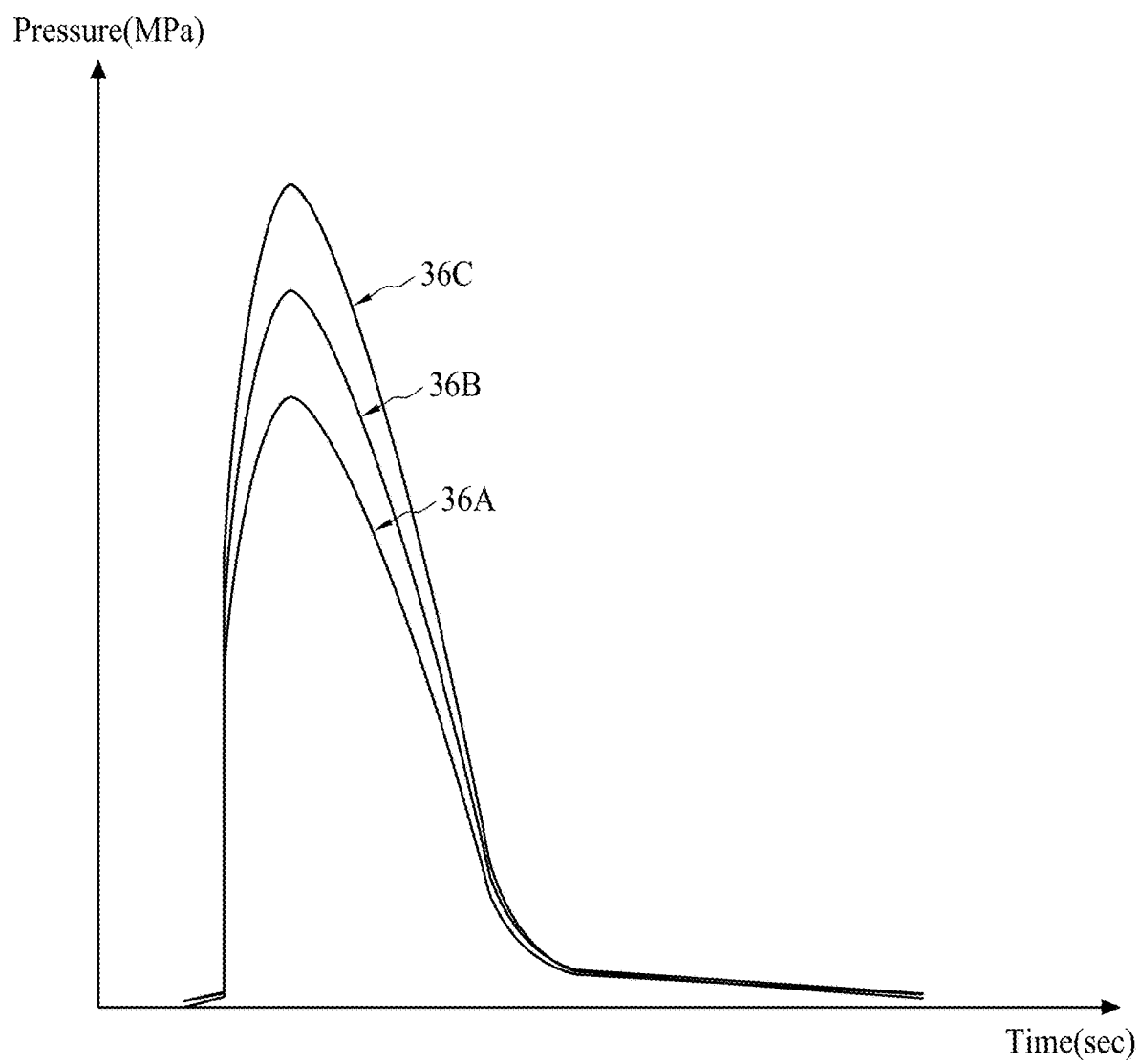
FIG. 36 is a graph showing the pressure variation during an injection molding process in accordance with some embodiments of the present disclosure.

FIG. 36 is a graph showing the pressure variation during an injection molding process. Current injection molding processes use the in-mold pressure with respect to the time to control the molding process and the quality of the molded product. The mold in such a molding system is equipped with an in-mold pressure gauge. Comparing an actually measured in-mold pressure-time waveform with an ideal waveform of the injected molding material can facilitate controlling the progress of the injection molding process. As shown in FIG. 36, an under-pressure (short shot) condition occurs when the in-mold pressure at a specific time in the waveform 36A is less than the ideal value of the ideal waveform 36B. In contrast, the in-mold pressure exceeding an ideal value of the ideal waveform 36B will cause an over-pressure condition as depicted by the waveform 36C. Both the short shot and the over-pressure conditions result in poor product quality. Obviously, merely using the pressure-time variables cannot precisely control the quality of the injection molding product.

Figure 37:
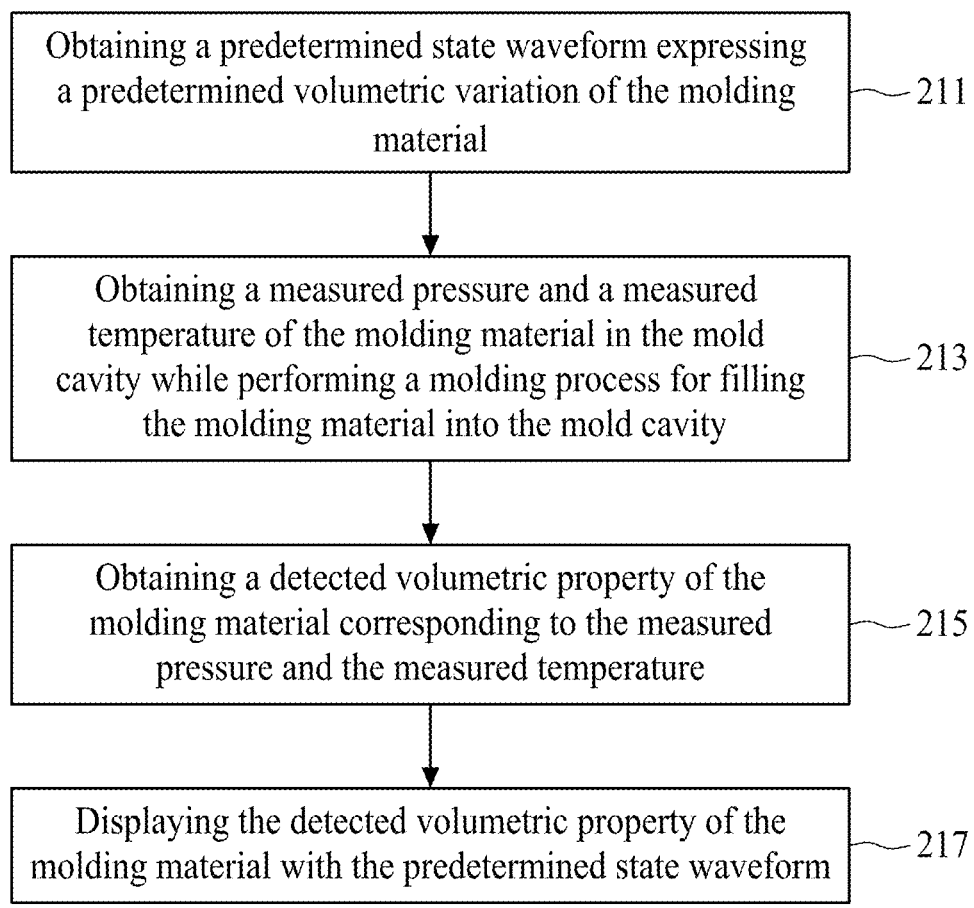
FIG. 37 is a flowchart of a method for performing an injection molding process in accordance with some embodiments of the present disclosure.

FIG. 37 is a flowchart of a method 210 for performing an injection molding process in accordance with some embodiments of the present disclosure. Referring to FIG. 37, the method 210 comprises a step 211 of obtaining a predetermined state waveform, wherein the predetermined state waveform expresses a predetermined volumetric variation of the molding material; a step 213 of obtaining a measured pressure and a measured temperature of the molding material in the mold cavity while performing a molding process for filling the molding material into the mold cavity; a step 215 of obtaining a detected volumetric property (specific volume or density) of the molding material corresponding to the measured pressure and the measured temperature; and a step 217 of displaying the detected volumetric property of the molding material with the predetermined state waveform.

Figure 38:
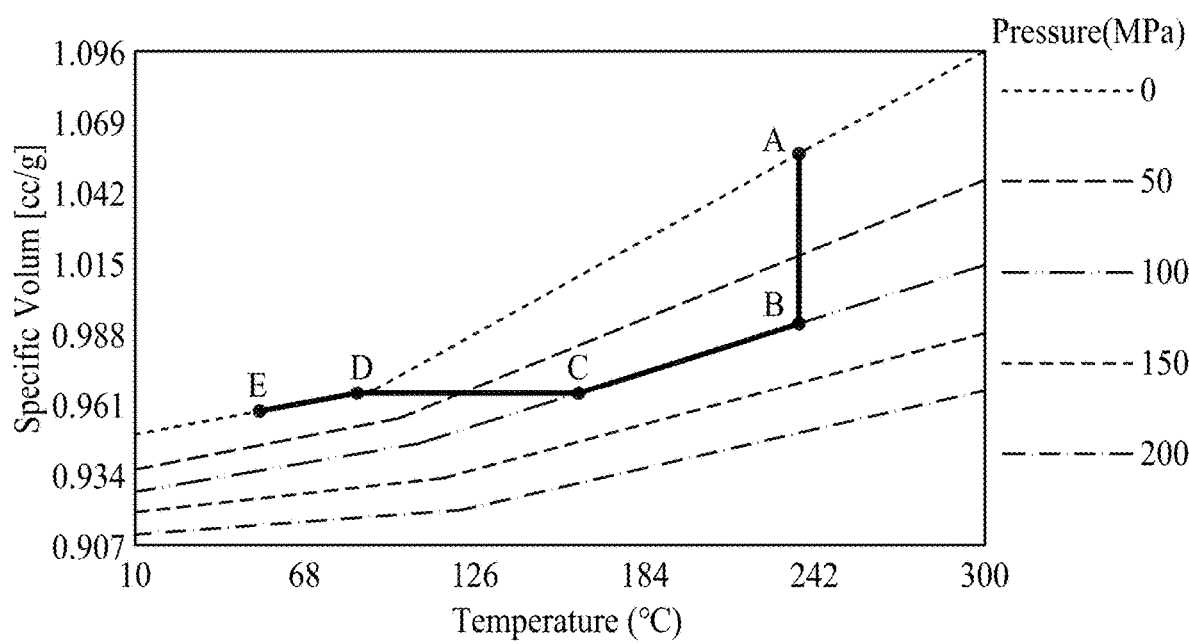
FIG. 38 shows a predetermined state waveform expressing a predetermined volumetric variation of the molding material in accordance with some embodiments of the present disclosure.

FIG. 38 shows a predetermined state waveform expressing a predetermined volumetric variation of the molding material in accordance with some embodiments of the present disclosure. In some embodiments, the predetermined state waveform obtained in the step 211 of FIG. 37 includes five nodes A, B, C, D, and E. In some embodiments, the line segment between the node A and the node B indicates increasing in-mold pressure at a fixed in-mold temperature. In some embodiments, the line segment between the node B and the node C indicates decreasing in-mold temperature at the same pressure as at the node B. In some embodiments, the line segment between the node C and the node D indicates decreases of both the in-mold temperature and the in-mold pressure at a fixed specific volume, which is the same as that at the node C, until the in-mold pressure reaches zero. In some embodiments, the line segment between the node D and the node E indicates decreasing in-mold temperature at the same pressure as at the node D, i.e., zero pressure, until the in-mold temperature has decreased to a predetermined temperature (ejection temperature). In some embodiments, the predetermined state waveform obtained in the step 211 of FIG. 37 can be any one of the state waveforms shown in FIG. 35.

Figure 39:
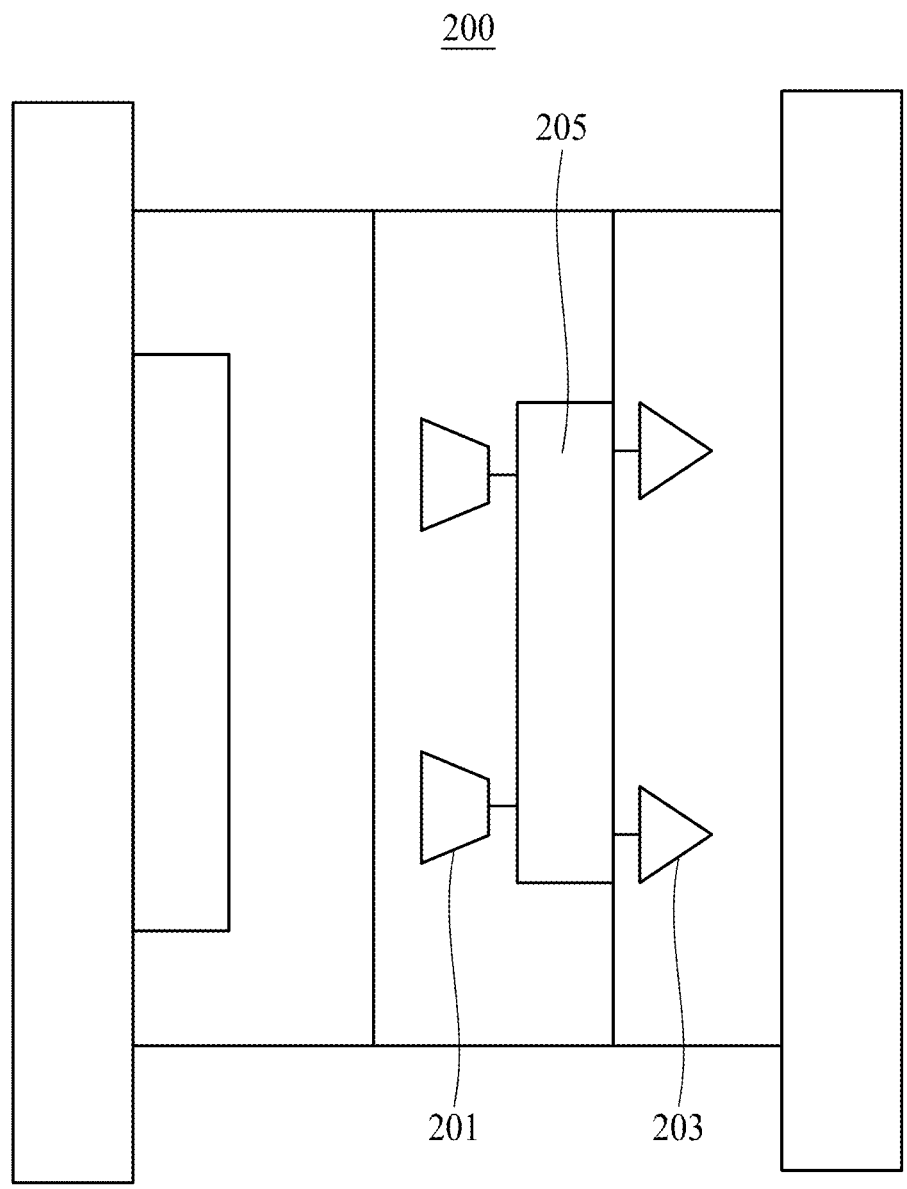
FIG. 39 is a schematic cross-sectional view showing a mold for the injection molding system in accordance with some embodiments of the present disclosure.

FIG. 39 is a schematic cross-sectional view showing a mold 200 for the injection molding system in accordance with some embodiments of the present disclosure. In some embodiments, the mold 200 can replace the mold 20 on the molding machine 10 in FIG. 1, and the mold 200 is equipped with a temperature sensor 202 and a pressure sensor 203 for measuring the in-mold temperature and the in-mold pressure, respectively, of the molding material in the mold cavity 205. In some embodiments, the measured pressure and the measured temperature obtained in the step 213 of FIG. 37 are obtained by the temperature sensor 202 and the pressure sensor 203 disposed in the mold 200 in FIG. 39.

In some embodiments, the detected volumetric property in the step 215 of FIG. 37 is obtained by a state model, for example the modified Tait model described hereinabove.

Figure 40:
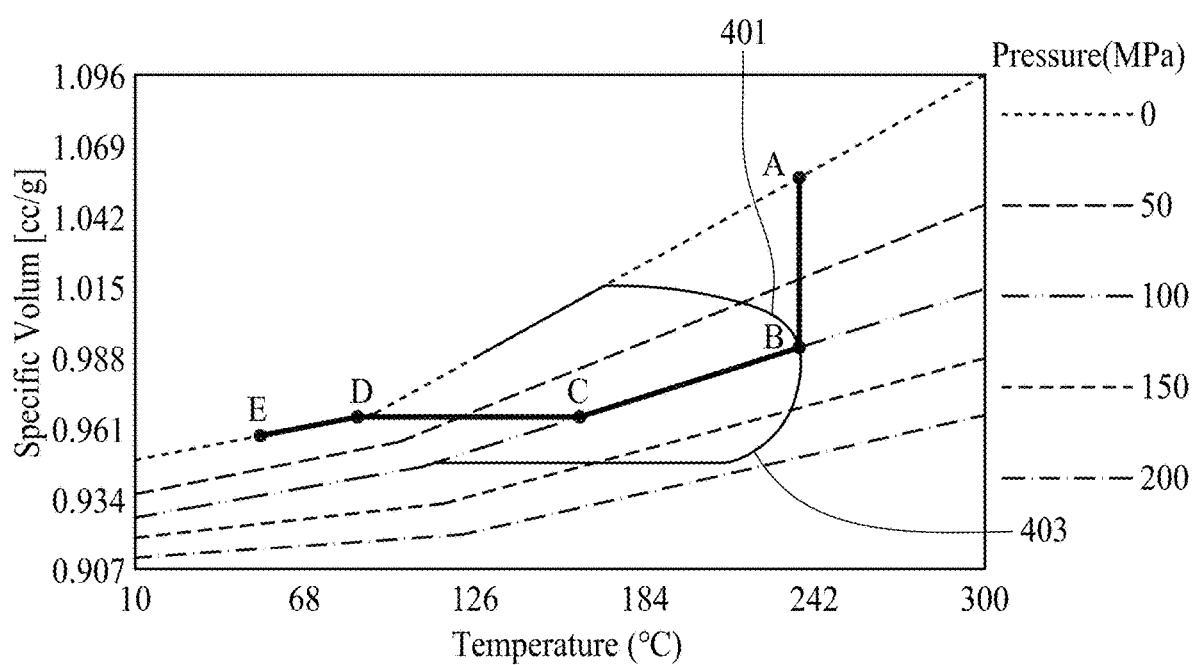
FIG. 40 is a plot showing the variation of the detected volumetric property of the molding material with respect to the predetermined state waveform in accordance with some embodiments of the present disclosure.

FIG. 40 is a plot showing the variation of the detected volumetric property of the molding material with respect to the predetermined state waveform in accordance with some embodiments of the present disclosure. In some embodiments, the plot displays two state waveforms 401, 403 (two sets of the detected volumes) of the molding material with the predetermined state waveform including five nodes A, B, C, D, E. In some embodiments, the state waveform 401, formed of a series of detected volumes, represents a molding process performed at a lower packing pressure, while the state waveform 403, formed of a series of detected volumes, represents a molding process performed at a higher packing pressure.

In some embodiments, the step 213 and the step 215 of the method 200 can be repeated to obtain a plurality of measured pressures and a plurality of measured temperatures of the molding material in the mold cavity while performing the molding process, wherein the measured pressures and the measured temperatures can be used to form a detected state waveform expressing a detected volumetric variation (the state waveforms 401, 403); subsequently, the step 217 can display the detected state waveform with the predetermined state waveform, for example, on a screen.

In some embodiments, the present disclosure may obtain a volumetric difference between the detected volumetric property of the detected state waveform and a predetermined volumetric property of the predetermined state waveform at the measured pressure and the measured temperature. In some embodiments, the volumetric difference can be obtained by comparing the detected volumetric property of the state waveform 401 (or 403) with the predetermined volumetric property of the predetermined state waveform at the measured pressure and the measured temperature.

In some embodiments of the present disclosure, the controller 17 or the computing apparatus 100 may generate an alarm signal when the volumetric difference is greater than a predetermined value. In some embodiments, the state waveform 401 represents a molding process performed at a lower packing pressure, i.e., the detected volumetric property is greater than the predetermined volume, the packing pressure of the molding machine is increased to perform the molding process again, and the state waveform 401 is expected to be shifted closer to the predetermined state waveform.

In some embodiments, the state waveform 403 represents a molding process performed at a higher packing pressure, i.e., the detected volumetric property is less than the predetermined volume, the packing pressure of the molding machine is decreased for performing the molding process again, and the state waveform 403 is expected to be shifted closer to the predetermined state waveform.

Figure 41:
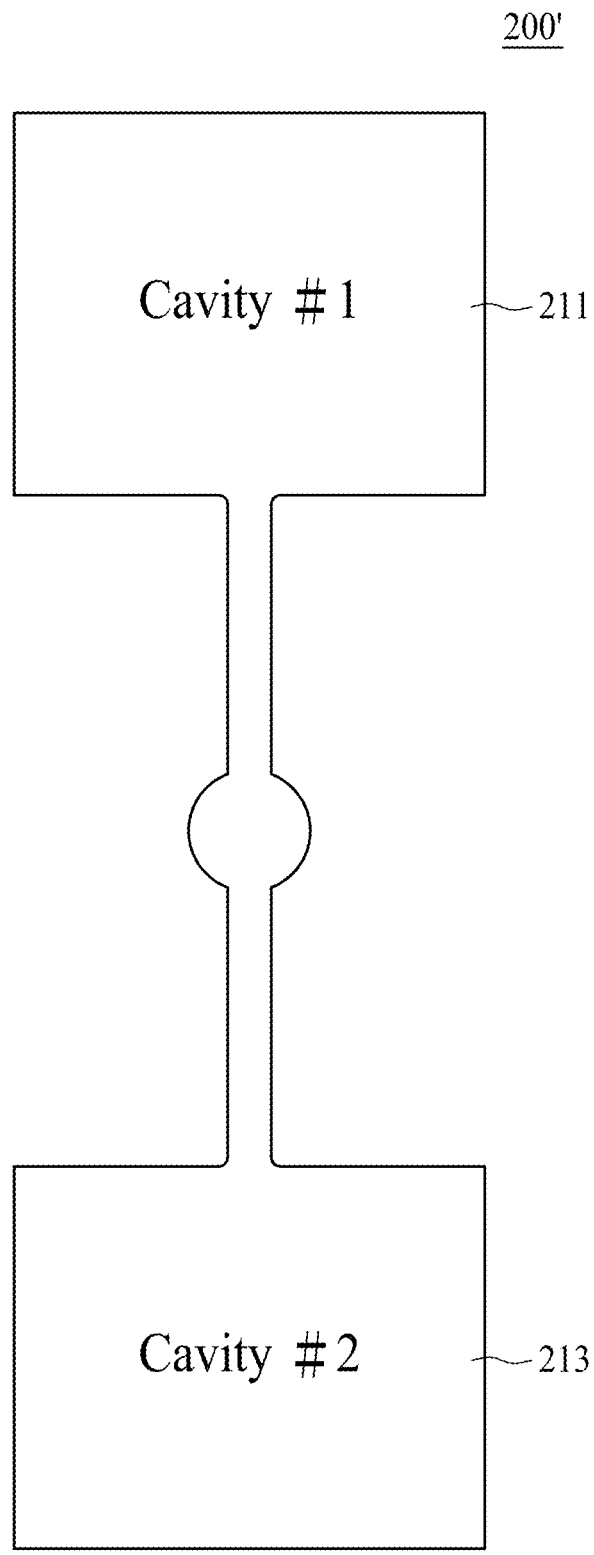
FIG. 41 is a schematic cross-sectional view showing a mold for the injection molding system in accordance with some embodiments of the present disclosure.

FIG. 41 is a schematic cross-sectional view showing a mold 200' for the injection molding system in accordance with some embodiments of the present disclosure. In some embodiments, the mold 200' can replace the mold 200 in FIG. 39 and the mold 10 in FIG. 1. In some embodiments, the mold 200' has a first mold cavity 201 and a second mold cavity 203 for being filled with the molding material from the molding machine 10.

Figure 42:
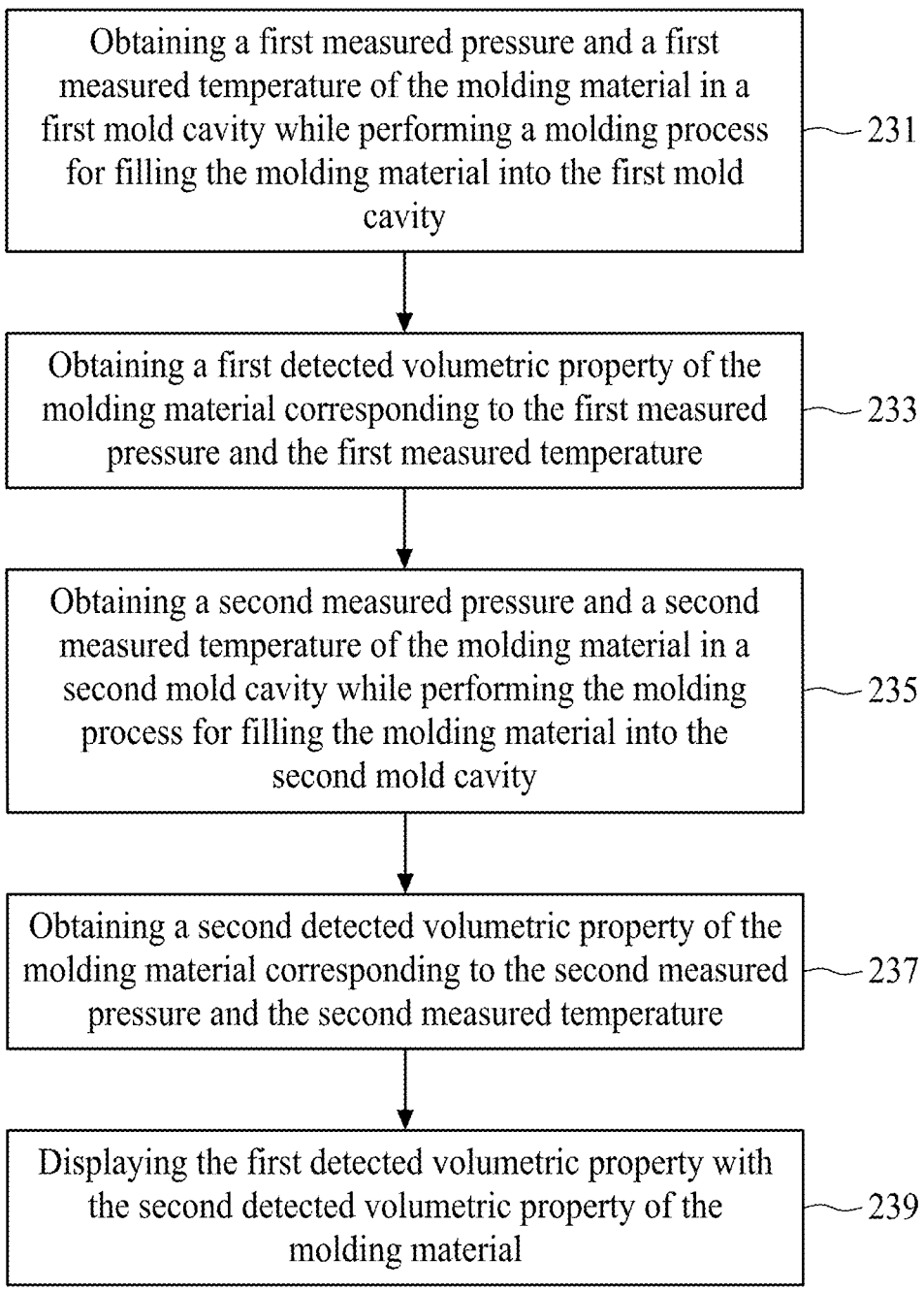
FIG. 42 is a flowchart of a method for performing an injection molding process in accordance with some embodiments of the present disclosure.

FIG. 42 is a flowchart of a method 230 for performing an injection molding process in accordance with some embodiments of the present disclosure. In some embodiments, the method 230 comprises a step 231 of obtaining a first measured pressure and a first measured temperature of the molding material in the first mold cavity while performing a molding process for filling the molding material into the first mold cavity; a step 233 of obtaining a first detected volumetric property (specific volume or density) of the molding material corresponding to the first measured pressure and the first measured temperature; a step 235 of obtaining a second measured pressure and a second measured temperature of the molding material in the second mold cavity while performing the molding process for filling the molding material into the second mold cavity; a step 237 of obtaining a second detected volumetric property of the molding material corresponding to the second measured pressure and the second measured temperature; and a step 239 of displaying the first detected volumetric property with the second detected volumetric property of the molding material.

In some embodiments, the step 233 of obtaining a first detected volumetric property of the molding material corresponding to the first measured pressure and the first measured temperature is performed using a pressure-specific volume-temperature state model; similarly, the step 237 of obtaining a second detected volumetric property of the molding material corresponding to the second measured pressure and the second measured temperature is performed using a pressure-specific volume-temperature state model, for example the modified Tait model described hereinabove.

In some embodiments, the step 231 and the step 233 of the method 300 can be repeated to obtain a plurality of first measured pressures and a plurality of first measured temperatures of the molding material in the first mold cavity while performing the molding process, wherein the first measured pressures and the first measured temperatures can be used to form a detected state waveform (Cavity #1) expressing a detected volumetric variation of the molding material in the first mold cavity. In some embodiments, the step 235 and the step 237 of the method 300 can be repeated to obtain a plurality of second measured pressures and a plurality of second measured temperatures of the molding material in the second mold cavity while performing the molding process, wherein the second measured pressures and the second measured temperatures can be used to form a second detected state waveform (Cavity #2) expressing a second volumetric variation of the molding material in the second mold cavity. Subsequently, the step 233 can display the two detected state waveforms on a screen.

Figure 43:
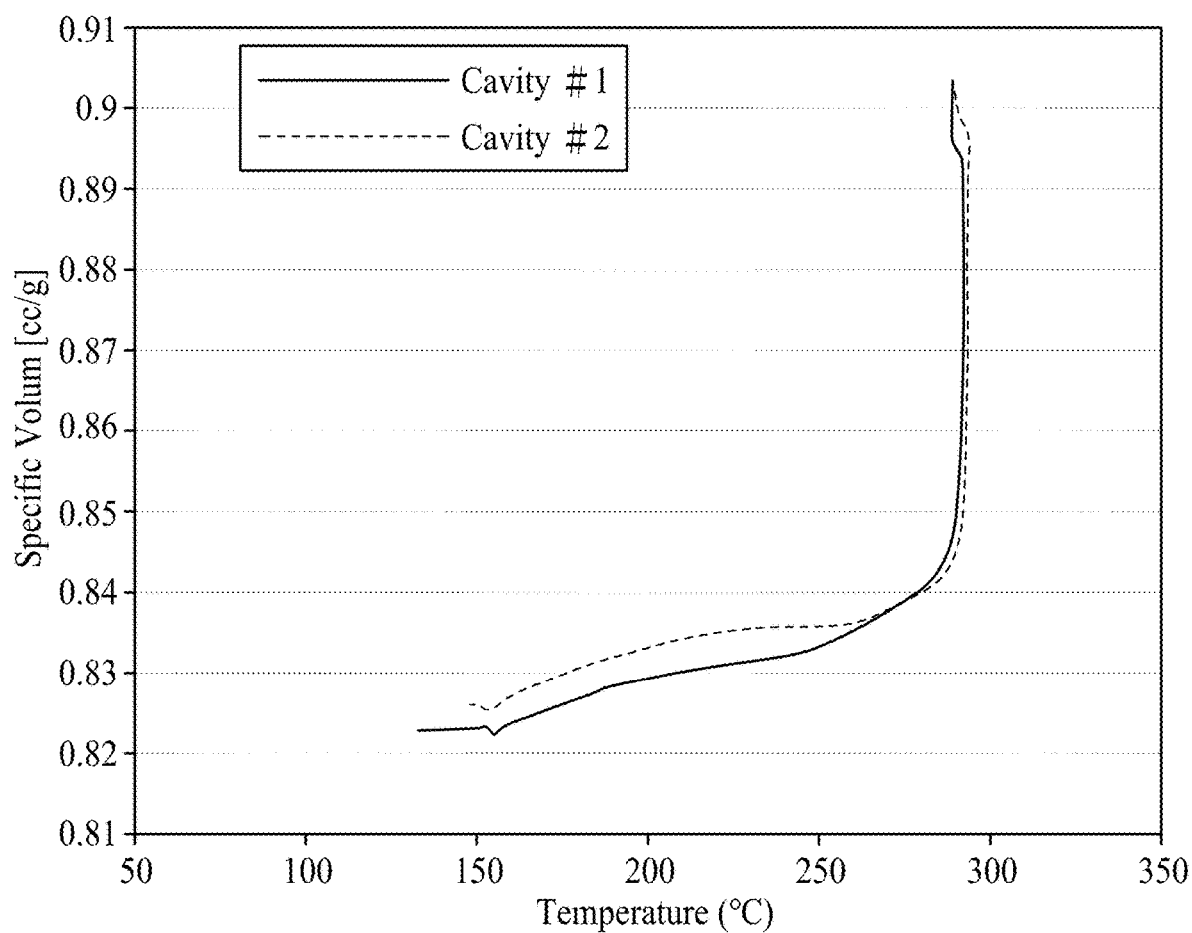
FIG. 43 is a plot showing the detected volumetric property of the molding material in accordance with some embodiments of the present disclosure.

FIG. 43 is a plot showing the detected volumetric property of the molding material in accordance with some embodiments of the present disclosure. According to some embodiments, the plot displays a state waveform for each of the first mold cavity and the second mold cavity of the molding material. In some embodiments, the state waveform (Cavity #1) for the first mold cavity is formed of a series of detected volumes (specific volume) of the molding material filling the first mold cavity, while the state waveform (Cavity #2) for the second mold cavity is formed of a series of detected volumes (specific volume) of the molding material filling the second mold cavity.

In some embodiments of the present disclosure, the method may include adjusting a packing pressure profile of the molding machine to reduce a volumetric difference between the first detected state waveform (Cavity #1) and the second detected state waveform (Cavity #2). In some embodiments, the volumetric difference between the two detected state waveforms becomes greater as the temperature decreases below 250° C., the packing pressure profile of the molding machine can be adjusted to increase the packing pressure applied to the second mold cavity as the temperature decreases below 250° C., and the second detected state waveform (Cavity #2) is expected to be shifted closer to the first detected state waveform (Cavity #1).

Figure 44:
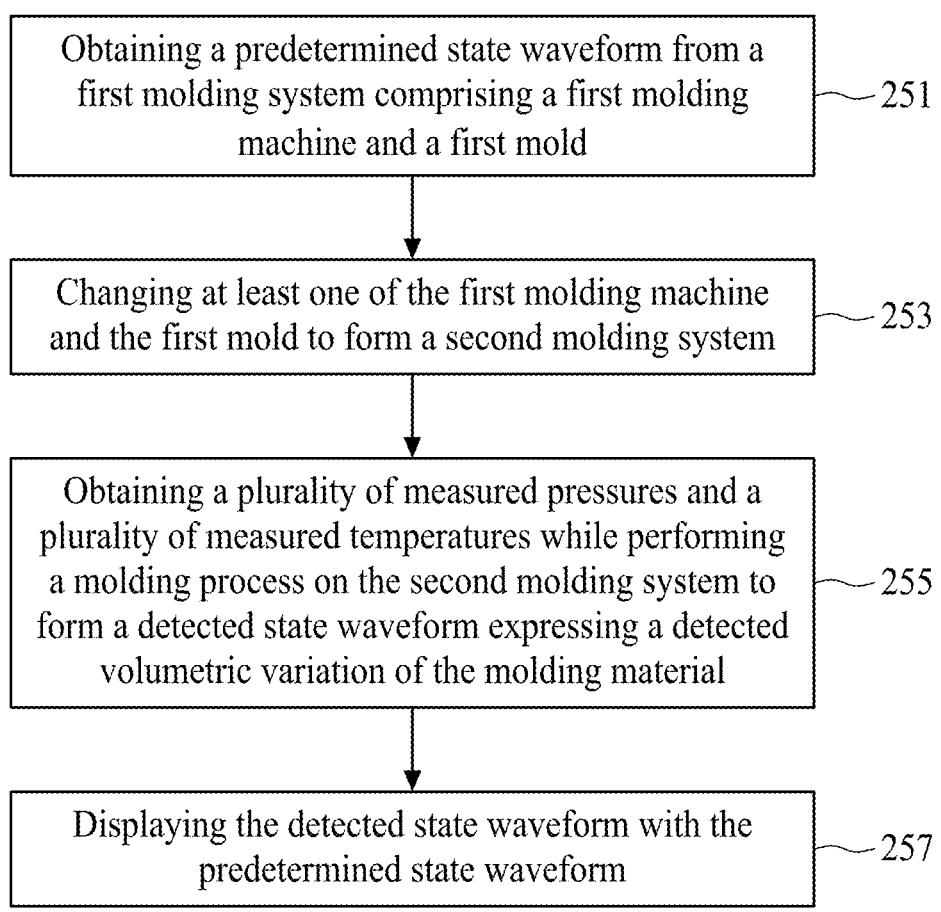
FIG. 44 is a flowchart of a method for performing an injection molding process in accordance with some embodiments of the present disclosure.

FIG. 44 is a flowchart of a method 250 for performing an injection molding process in accordance with some embodiments of the present disclosure. In some embodiments, the method 250 comprises a step 251 of obtaining a predetermined state waveform from a first molding system comprising a first molding machine and a first mold; a step 253 of changing at least one of the first molding machine and the first mold to form a second molding system; a step 255 of obtaining a plurality of measured pressures and a plurality of measured temperatures while performing a molding process on the second molding system to form a detected state waveform expressing a detected volumetric variation of the molding material; and a step 257 of displaying the detected state waveform with the predetermined state waveform.

In some embodiments, the predetermined state waveform obtained in the step 251 of FIG. 44 can be any one of the state waveforms shown in FIG. 35 for the molding system shown in FIG. 1. In some embodiments, the step 253 of changing at least one of the first molding machine and the first mold to form a second molding system is performed by replacing the mold 20 in FIG. 1 with a new mold, because the mold 20 in FIG. 1 is damaged after extensive use. In some embodiments, the step 253 of changing at least one of the first molding machine and the first mold to form a second molding system is performed by moving the mold 20 in FIG. 1 from the molding machine 10 to another molding machine (i.e., changing the molding machine 10) because the molding machine 10 needs repair or maintenance.

In some embodiments, the step 255 of obtaining a plurality of measured pressures and a plurality of measured temperatures while performing a molding process on the second molding system is performed by using the pressure sensor and the temperature sensor in the mold. In some embodiments, the measured pressures and the measured temperatures are used to obtain a plurality of detected volumes by a state model, for example the modified Tait model described hereinabove; subsequently, a series of detected volumes form a detected state waveform expressing a detected volumetric variation of the molding material.

Figure 45:
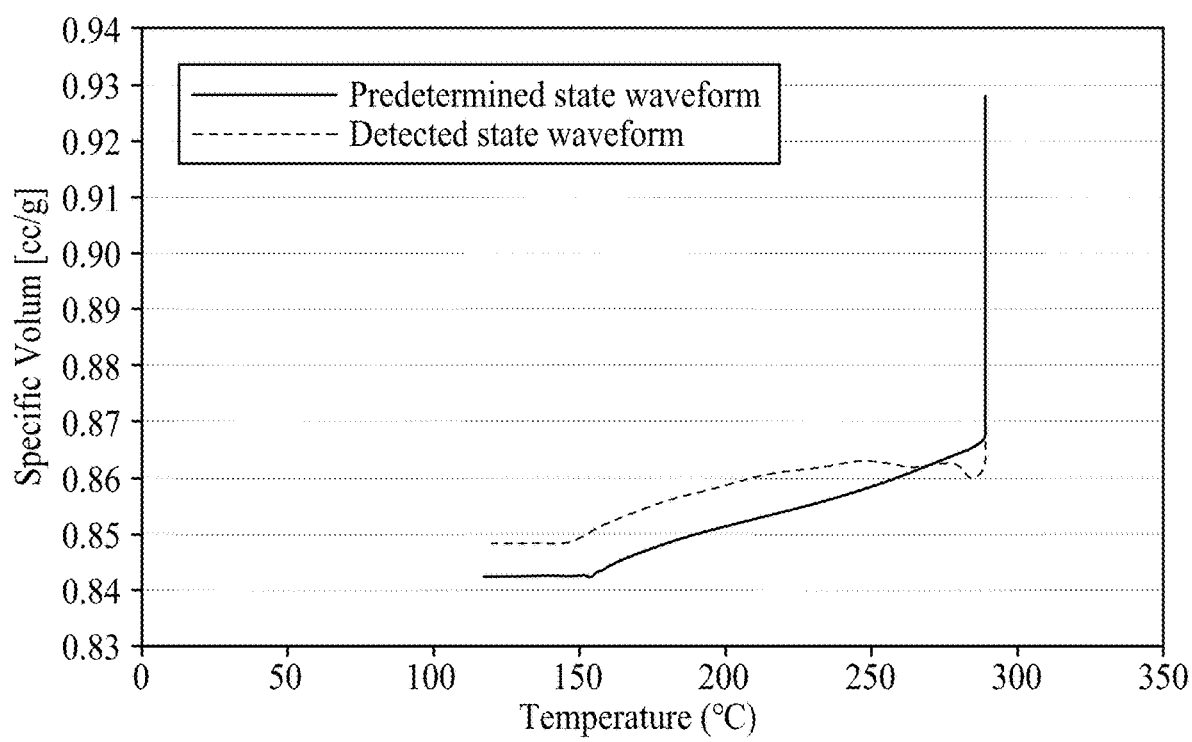
FIG. 45 is a plot displaying the detected state waveform of the molding material with respect to the predetermined state waveform in accordance with some embodiments of the present disclosure.

FIG. 45 is a plot displaying the detected state waveform of the molding material with respect to the predetermined state waveform in accordance with some embodiments of the present disclosure. In some embodiments, the volumetric difference between the detected state waveform and the predetermined state waveform becomes greater during the packing phase. Accordingly, the packing pressure profile of the molding machine can be adjusted to increase the packing pressure applied to the mold as the packing phase begins, and the detected state waveform is expected to be shifted closer to the predetermined state waveform.

The present disclosure provides a method for operating a molding system. The molding system comprises a molding machine and a mold disposed on the molding machine, wherein the mold has a mold cavity for being filled with a molding material from the molding machine. The method comprises: obtaining a predetermined state waveform expressing a predetermined volumetric variation of the molding material; obtaining a measured pressure and a measured temperature of the molding material in the mold cavity while performing a molding process for filling the molding material into the mold cavity; obtaining a detected volumetric property of the molding material corresponding to the measured pressure and the measured temperature; and displaying the detected volumetric property of the molding material with the predetermined state waveform.

The present disclosure also provides a method for operating a molding system. The molding system comprises a molding machine and a mold disposed on the molding machine, wherein the mold has a first mold cavity and a second mold cavity for being filled with a molding material from the molding machine. The method comprises: obtaining a first measured pressure and a first measured temperature of the molding material in the first mold cavity while performing a molding process for filling the molding material into the first mold cavity; obtaining a first detected volumetric property of the molding material corresponding to the first measured pressure and the first measured temperature; obtaining a second measured pressure and a second measured temperature of the molding material in the second mold cavity while performing the molding process for filling the molding material into the second mold cavity; obtaining a second detected volumetric property of the molding material corresponding to the second measured pressure and the second measured temperature; and displaying the first detected volumetric property with the second detected volumetric property of the molding material.

The present disclosure also provides a method for operating a molding system, comprising: obtaining a predetermined state waveform from a first molding system comprising a first molding machine and a first mold; changing at least one of the first molding machine and the first mold to form a second molding system; obtaining a plurality of measured pressures and a plurality of measured temperatures while performing a molding process on the second molding system to form a detected state waveform expressing a detected volumetric variation of the molding material; and displaying the detected state waveform with the predetermined state waveform.

Although the present disclosure and its advantages have been described in detail, it should be understood that various changes, substitutions and alterations can be made herein without departing from the spirit and scope of the disclosure as defined by the appended claims. For example, many of the processes discussed above can be implemented in different methodologies and replaced by other processes, or a combination thereof.

Moreover, the scope of the present application is not intended to be limited to the particular embodiments of the process, machine, manufacture, composition of matter, means, methods and steps described in the specification. As one of ordinary skill in the art will readily appreciate from the disclosure of the present disclosure, processes, machines, manufacture, compositions of matter, means, methods, or steps, presently existing or later to be developed, that perform substantially the same function or achieve substantially the same result as the corresponding embodiments described herein may be utilized according to the present disclosure. Accordingly, the appended claims are intended to include within their scope such processes, machines, manufacture, compositions of matter, means, methods, or steps.

What is claimed is:

1. A method for operating a molding system, the molding system comprising a molding machine and a mold disposed on the molding machine, the mold having a mold cavity for being filled with a molding material from the molding machine, the method comprising:
   calculating via computer aided engineering software a predetermined state waveform in response to a predetermined volumetric variation of the molding material;
   measuring a pressure and a temperature of the molding material in the mold cavity while performing a molding process for filling the molding material into the mold cavity; calculating via computer aided engineering software a detected volumetric property of the molding material in response to the measured pressure and the measured temperature;
   displaying the detected volumetric property of the molding material relative to the predetermined state waveform; and
   adjusting operation of the molding machine in response to the detected volumetric property of the molding material, wherein the step of adjusting operation of the molding machine includes adjusting a packing pressure of the molding machine in response to the detected volumetric property compared to a predetermined volumetric property of the molding material.

2. The method of claim 1, further comprising:
   measuring a plurality of pressures and a plurality of temperatures of the molding material in the mold cavity while performing the molding process and generating via computer aided engineering software a detected state waveform in response to detecting a volumetric variation of the molding material based on the plurality of measured pressures and the plurality of measured temperatures; and
   displaying the detected state waveform relative to the predetermined state waveform.

3. The method of claim 1, further comprising:
   calculating via computer aided engineering software a volumetric difference between the detected volumetric property and the predetermined volumetric property of the predetermined state waveform at the measured pressure and the measured temperature.

4. The method of claim 3, further comprising:
   generating an alarm signal when the volumetric difference is greater than a predetermined value.

5. The method of claim 3, wherein the step of adjusting the packing pressure further includes:
   increasing the packing pressure of the molding machine if the detected volumetric property is greater than the predetermined volumetric property.

6. The method of claim 3, wherein the step of adjusting the packing pressure further includes:
   decreasing the packing pressure of the molding machine if the detected volumetric property is less than the predetermined volumetric property.

7. The method of claim 1, wherein the predetermined state waveform is calculated via computer aided engineering software using properties measured from a former molding system comprising a former molding machine and a former mold, and at least one of the former molding machine and the former mold is changed to form the molding system.

8. The method of claim 1, comprising:
   calculating via computer aided engineering software the predetermined state waveform using properties measure from a former molding system comprising a former molding machine and a former mold; changing at least one of the former molding machine and the former mold to form the molding system;
   measuring a plurality of pressures and a plurality of temperatures of the molding material in the mold cavity while performing the molding process and generating via computer aided engineering software a detected state waveform in response to detecting a volumetric variation of the molding material based on the plurality of measured pressures and the plurality of measured temperatures; and
   displaying the detected state waveform relative to the predetermined state waveform, wherein the step of adjusting operation of the molding machine includes at least one of adjusting a packing pressure of the molding machine in response to the detected state waveform compared to the predetermined state waveform.

9. The method of claim 7, further comprising:
   adjusting the packing pressure of the molding machine in response to comparing the detected volumetric property with the predetermined volumetric property, wherein said adjusting step includes adjusting via computer aided engineering software a packing pressure profile of the molding machine to reduce a volumetric difference between the detected state waveform and the predetermined state waveform.

10. The method of claim 1, wherein the step of calculating the detected volumetric property of the molding material corresponding to the measured pressure and the measured temperature is performed via computer aided engineering software using a pressure-specific volume-temperature state model.

11. A method for operating a molding system, the molding system comprising a molding machine and a mold disposed on the molding machine, the mold having a first mold cavity and a second mold cavity for being filled with a molding material from the molding machine, the method comprising:
   obtaining a first measured pressure and a first measured temperature of the molding material in the first mold cavity while performing a molding process for filling the molding material into the first mold cavity; obtaining a first detected volumetric property of the molding material corresponding to the first measured pressure and the first measured temperature; obtaining a second measured pressure and a second measured temperature of the molding material in the second mold cavity while performing the molding process for filling the molding material into the second mold cavity; obtaining a second detected volumetric property of the molding material corresponding to the second measured pressure and the second measured temperature; displaying the first detected volumetric property with the second detected volumetric property of the molding material; and adjusting operation of the molding machine in response to the first and second detected volumetric properties of the molding material, wherein the step of adjusting operation of the molding machine includes adjusting a packing pressure of the molding machine in response to the first detected volumetric property compared to the second detected volumetric property of the molding material.

12. The method of claim 11, wherein the step of adjusting operation of the molding machine further includes:
   adjusting via computer aided engineering software a packing pressure profile of the molding machine to reduce a volumetric difference between the first detected state waveform and the second detected state waveform.

13. The method of claim 11, wherein the step of calculating the first detected volumetric property of the molding material corresponding to the first measured pressure and the first measured temperature is performed using a pressure-specific volume-temperature state model.

14. A method for operating a molding system, comprising the steps of:
    calculating via computer aided engineering software a predetermined state waveform from a first molding system comprising a first molding machine and a first mold;
    changing at least one of the first molding machine and the first mold to form a second molding system;
    measuring a plurality of pressures and a plurality of temperatures while performing a molding process on the second molding system and generating via computer aided engineering software a detected state waveform expressing a detected volumetric variation of the molding material;
    displaying the detected state waveform relative to the predetermined state waveform; and
    adjusting operation of the second molding system in response to the detected volumetric variation of the molding material, wherein the step of adjusting operation of the second molding system includes adjusting a packing pressure of a second molding machine in the second molding system in response to the detected state waveform for the second molding system compared to the predetermined state waveform expressing a volumetric property of the molding material in the first molding system.

15. The method of claim 14, further comprising:
    adjusting the packing pressure of the molding machine in response to comparing the detected volumetric property with the predetermined volumetric property, wherein said adjusting step includes adjusting via computer aided engineering software a packing pressure profile of the second molding machine to reduce a volumetric difference between the detected state waveform and the predetermined state waveform.

16. The method of claim 14, wherein the step of calculating the detected volumetric property of the molding material corresponding to the measured pressure and the measured temperature is performed via computer aided engineering software using a pressure-specific volume-temperature state model.

* * * * *